United States Patent
Harb et al.

(10) Patent No.: US 12,218,968 B1
(45) Date of Patent: Feb. 4, 2025

(54) METHODS AND TECHNIQUES FOR REAL-TIME DETECTION OF INFECTED IoT DEVICES

(71) Applicant: Board of Regents, The University of Texas System, Austin, TX (US)

(72) Inventors: Elias Bou Harb, San Antonio, TX (US); Morteza Safaei Pour, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 467 days.

(21) Appl. No.: 17/717,474

(22) Filed: Apr. 11, 2022

Related U.S. Application Data

(60) Provisional application No. 63/173,928, filed on Apr. 12, 2021.

(51) Int. Cl.
   *H04L 9/40* (2022.01)

(52) U.S. Cl.
   CPC ................................. *H04L 63/145* (2013.01)

(58) Field of Classification Search
   None
   See application file for complete search history.

(56) References Cited

U.S. PATENT DOCUMENTS

| | | | | |
|---|---|---|---|---|
| 10,742,674 | B1 * | 8/2020 | McLinden | H04L 63/1458 |
| 2005/0050353 | A1 * | 3/2005 | Thiele | H04L 63/1416 |
| | | | | 713/188 |
| 2008/0313734 | A1 * | 12/2008 | Rozenberg | H04L 63/145 |
| | | | | 726/22 |
| 2014/0059678 | A1 * | 2/2014 | Parker | H04W 12/088 |
| | | | | 726/22 |
| 2020/0322368 | A1 * | 10/2020 | Cohen | G06F 18/23 |
| 2021/0258791 | A1 * | 8/2021 | Jochem Sanz | H04W 12/66 |
| 2022/0191221 | A1 * | 6/2022 | Devaraj | H04L 63/1416 |
| 2022/0272110 | A1 * | 8/2022 | Agrawal | H04L 63/1425 |

OTHER PUBLICATIONS

Shaikh et al., A Machine Learning Model for Classifying Unsolicited IoT Devices by Observing Network Telescopes, Aug. 30, 2018, IEEE, 2018 14th International Wireless Communications & Mobile Computing Conference (IWCMC) (Year: 2018).*

(Continued)

*Primary Examiner* — Khang Do
(74) *Attorney, Agent, or Firm* — Smith, Gambrell & Russell, LLP; Gregory J. Kirsch

(57) ABSTRACT

A method and system for detecting and analyzing internet traffic from Internet of Things (IoT) devices is presented. A network telescope is employed to collect unsolicited data packets. The data packets are analyzed to determine whether they arise from a misconfigured device or from a malicious device (darknet sanitization) or from some other source. Traffic from misconfigured devices is filtered out. The data packets from malicious devices are analyzed and a classification model is trained to classify the data packets into originating from an IoT or from a non-IoT device. The classifier is then validated on a separate set of data. The data packets originating from malicious IoT devices are further analyzed by such techniques a clustering (e.g. agglomerative hierarchical clustering), geo-location analysis, methods of attack, and coordination of attacks.

20 Claims, 25 Drawing Sheets

(56) References Cited

OTHER PUBLICATIONS

E. Bou-Harb et al.; "Multidimensional investigation of source port 0 probing"; Digital Investigation, 11:S114-S123, 2014.
M. Pour et al.; "Stochastic modeling, analysis and investigation of iot-generated internet scanning activities"; IEEE Networking Letters, 2(3):159-163, 2020.
M. Pour et al.; "On data-driven curation, learning, and analysis for inferring evolving internet-of-things (iot) botnets in the wild"; Computers & Security, 91:101707, 2020.
M. Pour et al.; "Data-driven curation, learning and analysis for inferring evolving iot botnets in the wild"; In Proceedings of the 14th International Conference on Availability, Reliability and Security, pp. 1-10, 2019.
A. Mangino et al.; "Internet-scale insecurity of consumer internet of things: An empirical measurements perspective"; ACM Transactions on Management Information Systems (TMIS), 11(4):1-24, 2020.
M. Pour et al.; "Theoretic derivations of scan detection operating on darknet traffic"; Computer Communications, 147:111-121, 2019.
M. Safaei Pour et al.; "Implications of theoretic derivations on empirical passive measurements for effective cyber threat intelligence generation"; 2018 IEEE International Conference on Communications (ICC), pp. 1-7. IEEE, 2018.
E. Bou-Harb et al.; "A systematic approach for detecting and clustering distributed cyber scanning"; Computer Networks 57 (18) (2013) 3826-3839.
E. Bou-Harb et al.; "Behavioral analytics for inferring large-scale orchestrated probing events"; 2014 IEEE Conference on Computer Communications Workshops (Infocom Wkshps), 2014, pp. 506-511. doi:10.1109/INFCOMW.2014.6849283.
M. S. Pour et al.; "Comprehending the iot cyber threat landscape: A data dimensionality reduction technique to infer and characterize internet-scale iot probing campaigns"; Digital Investigation 28 (2019) S40-S49.
S. Torabi et al.; "Inferring, characterizing, and investigating internet-scale malicious iot device activities: A network telescope perspective"; 2018 48th Annual IEEE/IFIP International Conference on Dependable Systems and Networks (DSN), 2018, pp. 562-573.
F. Shaikh et al.; "Internet of malicious things: Correlating active and passive measurements for inferring and characterizing internet-scale unsolicited iot devices"; IEEE Communications Magazine 56 (9) (2018) 170-177.
E. Bou-Harb et al.; "A novel cyber security capability: Inferring internet-scale infections by correlating malware and probing activities"; Computer Networks 94 (2016) 327-343.
A. Dainotti et al.; "Analysis of a /0 stealth scan from a botnet"; IEEE/ACM Transactions on Networking (TON) 23 (2) (2015) 341-354.
T. D. Nguyen et al.; "Diot: A crowdsourced self-learning approach for detecting compromised iot devices"; arXiv preprint arXiv:1804.07474.
V. Thangavelu et al.; "Deft: A distributed iot fingerprinting technique"; IEEE Internet of Things Journal.
A. J. Pinheiro et al.; "Identifying iot devices and events based on packet length from encrypted traffic"; Computer Communications 144 (2019) 8-17.
S. Siby et al.; "Iotscanner: Detecting privacy threats in iot neighborhoods"; Proceedings of the 3rd ACM International Workshop on IoT Privacy, Trust, and Security, IoTPTS '17, ACM, New York, NY, USA, 2017, pp. 23-30. doi:10:1145/3055245:3055253. URL http://doi.acm.org/10.1145/3055245.3055253.
G. Acar et al.; "Web-based attacks to discover and control local iot devices"; Proceedings of the 2018 Workshop on IoT Security and Privacy, ACM, 2018, pp. 29-35.
S. Araki et al.; "Subspace clustering for interpretable botnet traffic analysis"; ICC 2019-2019 IEEE International Conference on Communications (ICC), IEEE, 2019, pp. 1-6.
S. Ozawa et al.; "A study of iot malware activities using association rule learning for darknet sensor data"; International Journal of Information Security (2019) 1-10.
R. Agrawal et al.; "Mining association rules between sets of items in large databases"; ACM Sigmod Record, vol. 22, ACM, 1993, pp. 207-216.

\* cited by examiner

600

Algorithm 1 Network Telescope Sanitization Algorithm

Input: Darknet Flows, *DarkFlows*
Output: Flag, *MiscFlag*, indicating that the respective flow is originating from a misconfigured source
for *DarkFlows* do
   $MiscFlag \leftarrow 0$
   $i \leftarrow DarkFlows.getUniqueSources()$
   Amalgamate $DarkFlows_i$ originating from a specific source $s_i$
   Update $s_i(D_i)$
   Compute $P_{misc}(D_i), P_{mal}(D_i)$
   if $P_{misc}(D_i) > P_{mal}(D_i)$ then
     $MiscFlag \leftarrow 1$
   end if
end for

FIG. 6

METHODS AND TECHNIQUES FOR REAL-TIME DETECTION OF INFECTED IoT DEVICES

CROSS-REFERENCE TO RELATED APPLICATION

The present patent application claims the benefit of U.S. Provisional Patent Application No. 63/173,928, filed on 12 Apr. 2021, which is incorporated by reference in its entirety.

STATEMENT REGARDING FEDERALLY SPONSORED RESEARCH

This invention was made with government support under grants #1907821 and #1917117 awarded by the U.S. National Science Foundation (NSF) Office of Advanced Cyberinfrastructure (OAC). The government has certain rights in the invention.

BACKGROUND OF THE INVENTION

The Internet-of-Things (IoT) paradigm is no longer just a concept. It has indeed touched and infiltrated various facets of contemporary life. The number and types of deployed IoT devices in households, organizations, critical infrastructure, and cities have increased with rampant speed. Meanwhile, the security posture of these devices has not keep abreast with their applicability and they have undoubtedly not received enough security attention dealing with their design, manufacturing, and provisioning by vendors, policymakers, and consumers, all resulting in disastrous consequences. As a result, the IoT paradigm continues to attract malicious actors' attention, through targeted exploitations by evolving malware. While the operational security communities continue to lay down efforts for IoT security monitoring and response, several challenges hinder such endeavors.

With the escalating adoption of the Internet-of-Things (IoT) paradigm in critical infrastructure, smart homes, transportation, and numerous other realms, an increasing number of devices are becoming directly Internet-facing. Although IoT devices deployed behind a Network Address Translation (NAT) gateway might be less vulnerable to Internet-enabled attacks, a plethora of such devices are directly connected to the Internet and/or employ port-forwarding for simplified provisioning and management. Unfortunately, such devices often lack basic security protocols and measures, rendering them easy targets for exploitation and hence recruitment within coordinated IoT botnets. Additionally, there exist several inherent IoT factors such as their heterogeneous nature and limited processing resources which further complicate addressing necessary security requirements. At the same time, subpar attention is being paid to IoT security aspects by their manufacturers and users, on top of an overwhelming lack of maturity of IoT-specific update procedures for patch management.

Indeed, IoT security has been an emerging area of focus after Mirai infected more than 200,000 devices to conduct debilitating Distributed Denial of Service (DDOS) attacks in late 2016, demonstrating the sheer malicious capabilities by way of exploiting IoT devices. Thereafter, botnets consisting of IoT devices have consistently been evolving, incorporating new devices and services. Hence, the IoT botnet environment has expanded to include several more players who ultimately compete for control over insecure IoT devices by means of newly-exposed vulnerabilities. In June 2019, the Echobot campaign was identified as operating "in the wild" Derived from Mirai's source code, Echobot has compromised millions of IoT nodes. Exploiting more than 20 unique (software and firmware) IoT-centric vulnerabilities, the campaign has infected devices across more than 10 diverse vendors. Indeed, this IoT threat phenomena will undoubtedly continue to display highly dynamic behavior as malicious actors attempt to propagate and exploit a higher number of devices, making the inference, attribution, and assessment of compromised IoT devices and their coordinated illicit activities significantly challenging.

Despite efforts to mitigate the ever-increasing IoT security issues, challenges exist due to the heterogeneity of IoT devices and the emergence of anti-honeypot techniques to avoid discovery. Moreover, acquiring IoT-centric empirical data to be curated and analyzed for maliciousness is problematic, given the large-scale deployments of such devices in Internet-wide realms. While network telescope (darknet) traffic (i.e., Internet-scale traffic targeting routable yet unused IP addresses) has proven to be a reliable and effective source for generating insights related to Internet-wide maliciousness, its exploration for addressing IoT security issues is still in its infancy. Broadly, a major challenge related to the inference of IoT maliciousness through the analysis of network telescope traffic is the lack of sound data-driven artifacts which can be analyzed to confirm that the perceived one-way traffic is in fact originating from IoT devices and not from typical machines. Further, successful darknet-driven methodologies should accommodate the evolving nature of IoT botnets, leveraging their empirical specifications as perceived by the (somehow limited) vantage point of the network telescope.

Correlating darknet-inferred IP addresses with databases such as others have done has proven to be a successful use-case for classifying IoT-centric data and Internet-scale exploitations. IP crawlers, active scanning, and banner grabbing may be used to collect and index open ports and available services on billions of Internet-facing IoT devices. While this strategy provides large-scale device information, the limited scope of services reachable by these scanners makes them incapable for identifying the complete Internet-wide set of active IoT devices. Such generated probes and active measurements are typically filtered by firewalls. Additionally, upon infection, IoT malware tends to block ports, modify banner information and disable common outward facing services (i.e., Telnet, CWMP, ADB, etc.). When the aforementioned events occur, the indexing of IoT devices is significantly impeded.

Having noted this, a number of darknet-related technical challenges exist which further hinder IoT-centric fingerprinting efforts. Indeed, perceived packets on the network telescope (that have been generated by IoT bots) solely resemble scan activities (i.e., do not include payload information and are unidirectional), which limits the amount of available data to analyze. Furthermore, only a small portion of unsolicited IoT-generated traffic actually targets deployed network telescopes, rendering time-based analysis nontrivial and complicates the process of extracting effective and robust features to infer orchestration behaviors of compromised IoT devices.

Motivated by the aforementioned limitations coupled with the lack of thorough measurement-based studies on the insecurity of the IoT paradigm at large, a need arises for techniques and systems that provide for real-time detection of infected IoT devices.

SUMMARY OF THE INVENTION

Aspects of the disclosure relate to systems, methods and techniques for real-time detection of infected IoT devices.

In an embodiment, the system may comprise a network telescope, for capturing data packets sent from internet-connected devices and for probing such devices for additional information, and a computer system for processing and analyzing the information and communicating the results to a user. For example, a network telescope may capture a first set and a second set of unsolicited data packets sent by a first set of devices and may further probe the devices for additional information. The computer system may identify a first subset of the first set of unsolicited data packets which originate from misconfigured devices of the first set of devices. The computer system may also filter out the first subset of the first set of unsolicited data packets which originate from misconfigured devices from the first set of unsolicited data packets and further identify a second subset of the first set of unsolicited data packets as originating from malicious devices of the first set of devices. The computer system may then train a machine learning model to classify the malicious devices as IoT devices or non-IoT devices. The computer system may then identify a first subset of the second set of unsolicited data packets which originate from misconfigured devices of the first set of devices, filter out the first subset of the second set of unsolicited data packets which originate from the misconfigured devices from the second set of unsolicited data packets. The computer system may identify the second subset of the second set of unsolicited data packets as originating from malicious devices and apply the trained machine learning model to classify the malicious devices as IoT devices or non-IoT devices. The computer system may further extract features of the IoT devices to identify compromised IoT devices and may also further analyze the compromised IoT devices and a method used to compromise the IoT devices to generate an analysis associated with the compromised IoT devices and the method used to compromise the IoT devices, and communicate to a user the generated analysis.

In an embodiment, the method may comprise capturing, at a network telescope, data packets sent from internet-connected devices and for probing such devices for additional information. The method may further comprise, processing and analyzing, at a computer system, the information and communicating the results to a user. For example, the method may capture, at a network telescope, a first set and a second set of unsolicited data packets sent by a first set of devices and may further probe the devices for additional information. The method may identify a first subset of the first set of unsolicited data packets which originate from misconfigured devices of the first set of devices. The method may also, at the computer system, also filter out the first subset of the first set of unsolicited data packets which originate from misconfigured devices from the first set of unsolicited data packets and further identify a second subset of the first set of unsolicited data packets as originating from malicious devices of the first set of devices. The method may then include training a machine learning model to classify the malicious devices as IoT devices or non-IoT devices. The method may then, at the computer system, identify a first subset of the second set of unsolicited data packets which originate from misconfigured devices of the first set of devices, filter out the first subset of the second set of unsolicited data packets which originate from the misconfigured devices from the second set of unsolicited data packets. The method may identify, at the computer system, the second subset of the second set of unsolicited data packets as originating from malicious devices and apply the trained machine learning model to classify the malicious devices as IoT devices or non-IoT devices. The method may further, at the computer system, extract features of the IoT devices to identify compromised IoT devices and may also further analyze the compromised IoT devices and a method used to compromise the IoT devices to generate an analysis associated with the compromised IoT devices and the method used to compromise the IoT devices, and communicate to a user the generated analysis.

The machine learning model may comprise at least one of a random forest model, a convolutional neural network, or a multi-window convolutional neural network. The analysis of compromised IoT devices may comprise clustering of the IoT devices by at least one of k-means clustering, density based clustering, or agglomerative, hierarchical clustering. Probing for additional information may comprise probing the devices for at least one of an open port, an application banner, a banner response, a banner identification, a banner-based identification of a device, a scanning module, a probing rate, a location of an IP address of a device, and an IP header field.

Identifying unsolicited data packets which originate from misconfigured devices may comprise counting the number of unsolicited data packets which arrive from an IP address within a predefined duration. Then a device at the IP address may be defined as a malicious device, if the number of data packets sent from the IP address within the predefined duration is greater than or equal to a predefined threshold. If the number of data packets sent from the IP address within the predefined duration is less than the predefined threshold, then the device at that IP address may be defined as a misconfigured device. The predefined duration may be 300 seconds and the predefined threshold may be 64. Identifying unsolicited data packets which originate from misconfigured devices may further comprise calculating a probability that a misconfigured device would send the predefined threshold of unsolicited data packets to the network telescope within the predefined duration.

Training the machine learning model may further comprise accessing at least one of a database of IoT devices, a database of keywords related to IoT devices, a database of key characters related to IoT devices, a database of known compromised IoT devices and a database of known methods of compromising an IoT device.

Analyzing the compromised IoT devices and a method used to compromise the IoT devices may comprise analyzing at least one of a targeted port, a header, a banner field, an IP address, an inter-packet arrival time, and a location. Analyzing the compromised IoT devices and the methods used to compromise the IoT devices may further comprise calculating, based on a set number of sequential data packets from a compromised IoT device, a probability density function of a frequency of appearance of a port of a compromised IoT device or of a port in the method used to compromise an IoT device and further calculating an address repetition ratio based on the total number of data packets sent by a compromised IoT device or sent by the method used to compromise an IoT device divided by a number of unique destination IP addresses

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

FIG. 6 illustrates the network telescope sanitization algorithm in pseudo-code.

Figure 1:
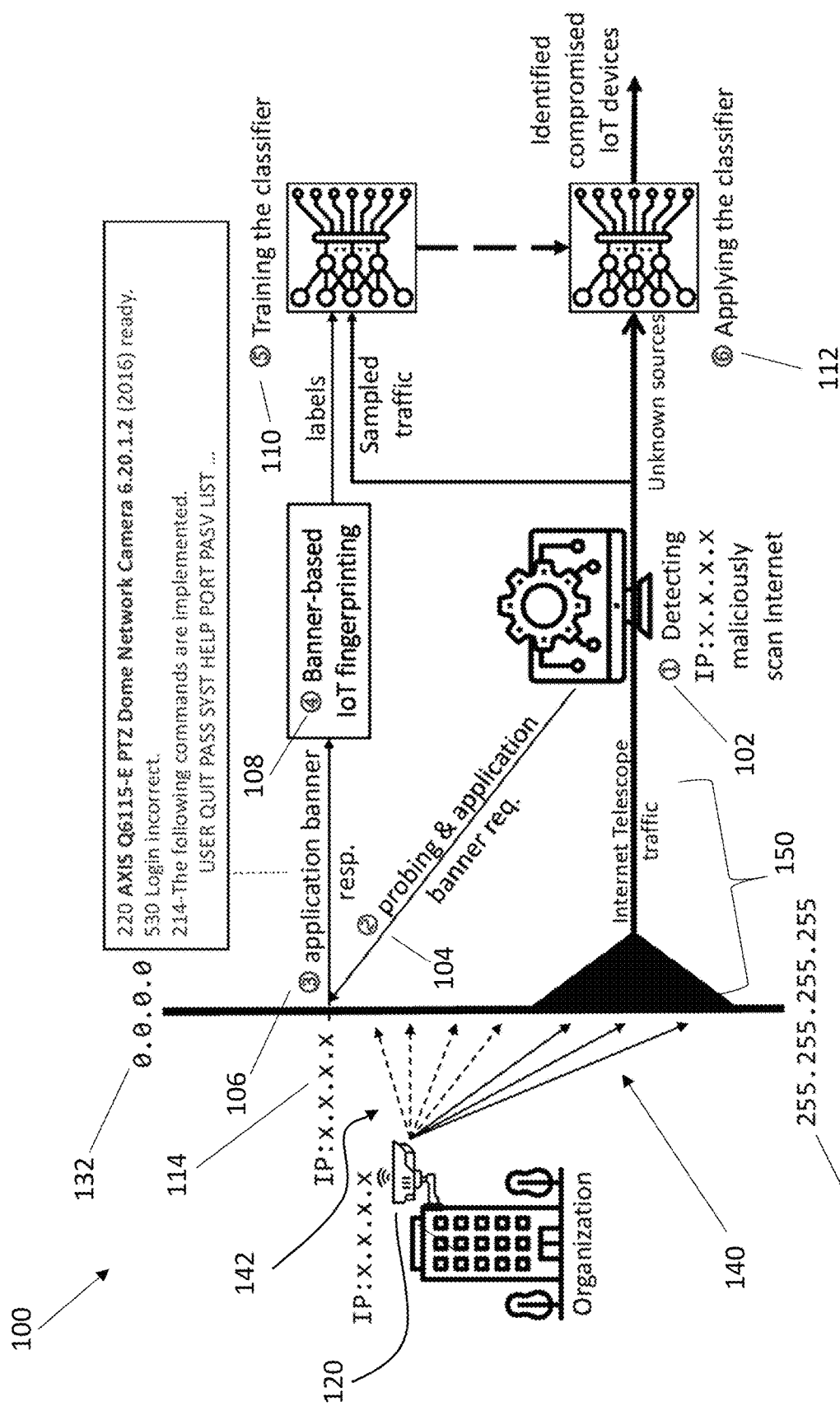
FIG. 1 illustrates the methodology of the detection system.

Other features of the present embodiments will be apparent from the Detailed Description that follows.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical, and structural changes may be made to the embodiments without departing from the spirit and scope of the present teachings. The following detailed description is therefore not to be taken in a limiting sense, and the scope of the present disclosure is defined by the appended claims and their equivalents.

The present disclosure relates to methods and techniques for real-time detection of infected IoT devices.

First and foremost, patch management is more difficult in the IoT context than conventional systems, given the heterogeneous nature of the IoT devices and their far-from-optimal update mechanisms. In many cases, organizations deploying such IoT devices might not be aware of the exact details of the IoT models, which renders their management quite difficult especially in realms with significant amount of deployed devices (i.e., health and transportation sectors). Further, a large number of IoT devices are not yet compatible with central management systems for monitoring and management. Therefore, the chances that an IoT device becomes infected and goes unnoticed is quite high.

Second, for continuous and proactive monitoring of the cyber security posture, threat intelligence and security service providers typically require access to the organizations' network traffic and systems' data. This is achieved either by installing special agents/software or setting up hardware to curate and analyze the required data, while processing it on-site or using a cloud-based capability. Nevertheless, organizations are most often reluctant to even share their basic internal information for privacy and liability concerns. This situation has induced the broad lack of available real-world data (including IoT-centric empirical data) to utilize for identifying compromised devices. Additionally, with the IoT paradigm being deployed at an Internet-scale perspective, having microscopic data access is impractical and would definitely not scale well.

Third, the objective of IoT device fingerprinting (i.e., identification) by analyzing network traffic continues to be an open research problem. Along this line of thought, the capability to infer compromised devices is even more challenging, given the increasing sophistication of IoT-malware which executes various actions (i.e., killing running services or altering device characteristics) to avoid being flagged by detection and monitoring systems as well as by competing IoT botnets.

Given the aforementioned challenges, coupled with the lack of IoT-centric Cyber Threat Intelligence (CTI) capabilities which would aid the operational security community in identifying and responding to Internet-wide compromised IoT devices, in this disclosure, the following contributions are made:

1) Exploited IoT (eX-IoT) is introduced as a first-of-a-kind operational, real-time CTI feed, operating on streaming Internet-scale network telescope data, for fingerprinting (and notifying about) compromised IoT devices deployed in Internet-wide realms. eX-IoT is advantageous as it provides a macroscopic visibility of deployed IoT devices, independent of the host organization. Indeed, while other scan-based threat detection capabilities exist, eX-IoT complements them by innovating scientific and engineering methods to specifically address the IoT insecurity problem.

2) eX-IoT has been designed both in terms of its dynamically-updating machine learning methodology to keep track of newly discovered IoT devices in the wild, and its computing architecture, from the data source to the indexing (and augmentation) of the generated threat intelligence. The operation of an initial exemplary deployment of eX-IoT is reported, while evaluating it against other CTI feeds in terms of various metrics including latency, accuracy and coverage.

3) eX-IoT is made available to the security community for ingestion through an authenticated RESTful API and a streamlined front-end platform. eX-IoT is also developed to monitor certain IP spaces of interest and to automatically respond to IoT exploitations through email notifications. eX-IoT's initial results are validated by collaboration with US and international operators.

Related Works

The first review topic focuses on efforts pertaining to compromised IoT device fingerprinting. The second review topic summarizes available operational cyber security capabilities for monitoring cyberspace to highlight the need for tools and platforms which are IoT-centric.

Fingerprinting Compromised IoT Devices

Honeypots. The first line of research leverages IoT-specific honeypots to gain CTI into IoT maliciousness. However, often, the vantage size is extremely narrow and limited to a small set of mimicked devices, firmware versions, and services which hinders the completeness and the quality of the results to be employed for operational security. In addition, sophisticated IoT malware and attackers execute reconnaissance and discovery tactics to avoid honeypots Internet telescope and edge. Another line of research relies on Internet telescope (darknet) or similar passively collected edge network traffic to identify infected IP addresses. However, additional steps are required to identify IoT-specific characteristics. Some studies relied on the unique identifier in the received packets (TCP seq==dst IP) to attribute them to Mirai infected devices. Similarly, Mirai-related infections were identified following an attempt to eradicate them from the hosting network where notification-based remediation efforts were successfully tested. However, not every malware will carry such a profound signature as Mirai. Indeed, works that leverage malware-specific signatures are not generic enough, rendering them impotent to fingerprint devices infected by emerging malware.

An alternative technique relies on correlating a list of identified malicious IP addresses with fingerprinted devices through the application of banner grabbing using Shodan. or actively scanning set of IP addresses to retrieve available service banners. Banners contain text information that needs to be processed to characterize the type and model of the device. Acknowledging the variety of IoT devices in the wild, various learning techniques have emerged to accomplish the classification objective.

Nevertheless, several challenges related to banner-based IoT fingerprinting techniques exist, including (i) the fact that modern malware close ports and services with the intention to avoid reinfection by competing malware and to conceal their identity from Internet scanners. (ii) That IoT devices may reside behind a border firewall/NAT where accessing such devices becomes restricted and (iii) the fact that some vendors avoid hard-coding device information in clear text which makes banner analysis almost impossible. In the context of eX-IoT, passive Internet traffic was combined with active application banners while feeding the output to a machine learning model to address these IoT fingerprinting challenges, especially for devices where their banners are not available.

ISP level and Internet transit. Some studies leveraged Internet backbone and transit traffic to identify botnet activities and related compromised hosts and devices. These proposed detection methods often require intensive computation due to the high volume of curated traffic (benign and malicious) and they generally might possess lower accuracy in contrast to leveraging passive measurement techniques.

Internal network traffic. This line of research is based on analyzing internal network traffic. A network-based anomaly detection technique has been proposed by one group that employs deep autoencoders to discover abnormal network traffic generated from compromised IoT devices, while another group introduced IoT-Keeper, a lightweight anomaly detection system at edge gateways. Though noteworthy, these techniques require special software and hardware to curate such data, in addition to possessing a small-scale, microscopic perspective of IoT maliciousness. In contrast, eX-IoT CTI's feed leverages Internet telescope traffic which is a "pure" source of unsolicited/malicious activities while providing a global view towards compromised IoT devices.

Operational Cyber Security Capabilities

Although the operational security communities continue to develop capabilities for monitoring cyberspace, tools which are IoT-centric remain at its infancy. Shodan was among the first search engine for constantly monitoring cyberspace to index all Internet-facing end-hosts. The engine allows users to find specific types of devices and services (webcams, routers, servers, etc.) connected to the Internet. Following closely the same objective, the University of Michigan developed, based upon the open source tools Zmap and Zgrab, forked many Internet- and security-based studies. Shodan, Censys and ZoomEye are examples used by organizations to monitor their IP space for publicly accessible services and vulnerabilities related to them. However, actual infections are not visible to their vantage points and thus they do not cover or report about infected (IoT) devices. Dshield, in contrast, provides amalgamated statistics about the daily activity of each targeted ports based on IDS crowd-sourcing and reports provided by entities and individuals. GreyNoise provides general lists of Internet-wide scanners; however, its implementation and modus operandi are obscure and the engine does not provide IoT-specific CTI.

Thus, it is intuitive to note that eX-IoT will be among the first to focus on the Internet-scale IoT cyber threat landscape by devising integrated scientific and data engineering methodologies while pinpointing and sharing relevant CTI, in near real-time, on hundreds of thousands of newly infected IoT devices, this developed capability is postulated to contribute toward a better IoT hygiene while aiding security operators and hosting organizations with their (IoT) security triad endeavors.

Methodology and Architecture

The rationale of eX-IoT is to possess an Internet-scale visibility of deployed IoT devices. To this end, it leverages passive network telescope traffic. A network telescope is set of routable, allocated yet unused IP addresses. Such IPs passively collect incoming packets without sending any replies; they have also not been assigned to any machine (with a legitimate service) and therefore there is no reason for Internet nodes to send packets towards these IPs. Therefore, all the incoming packets are either (i) Internet-wide scans, (ii) backscatters from DDOS attacks, and (iii) results of machine/network malfunctioning. Therefore, Internet telescope data provides a clean, unsolicited dataset (no traffic with legitimate intention) of Internet-scale malicious activities. Compromised IoT devices are often constantly scanning the Internet to discover more vulnerable devices and during this procedure, they inevitably send a packet to Internet telescopes. Following the filtering of backscatter packets based on their flags and other header fields, an employed Threshold Random Walk (TRW) scan detector algorithm identifies scan activities. Since there is no purpose that an IoT device (e.g. IP camera or webcam) would perform Internet scanning as part of its normal operation, this would be a strong indicator of its compromise.

The methodology at the core of eX-IoT is illustrated in FIG. 1. The eX-IoT system 100 is depicted in schematic format in FIG. 1. An IoT device 120 sends out data packets 140, 142 to various internet addresses 114. These IP addresses fall between the lowest IP address 132 (0.0.0.0)

and the highest IP address 134 (255.255.255.255). An internet telescope 150 captures or receives some of the data packets 140. Other data packets 142 are sent to other IP addresses and are not detected by the network telescope 140. At a detection step 102, the internet telescope 150 detects the scanning packets 140 sent by a possibly compromised IoT device 120. Following the detection step 102 of capturing the data packets 140, the eX-IoT system 100 probes the IoT devices 120 for open ports and application banners at probing step 104. The application banners are returned at banner response step 106 and are checked against a database of IoT devices 108 to generate labels (IoT vs non-IoT). The label for IP address x.x.x.x 114 along with the traffic samples originated from the IP address x.x.x.x 114 will be used to train (update) the machine learning classifier 110. Finally, the trained classifier 110 is applied on newly incoming scan traffic to predict their label at step 112. In an embodiment, it is possible to train a random forest classifier to predict the label (IoT vs non-IoT) of sources that are generating scans towards the network telescope 150. Each sample in the training and test datasets consists of fields extracted from the received packets with a corresponding label. The output of the machine learning classifier is one of the binary classes: IoT or non-IoT. Note that the model can adaptively learn the behavior and implementation differences of IoT-specific malware families and evolving IoT botnets. The effect of these differences is indeed reflected in their generated scanning packets and can be observed in various features such as scan packet inter-arrival times, and the set of targeted ports (and corresponding assigned weights to each). Readers that are interested in the inner modus operandi of the employed machine learning methods are kindly referred to the "Annotate" and "Update Classifier" subsections herein as well as to other in-depth studies.

Figure 2:
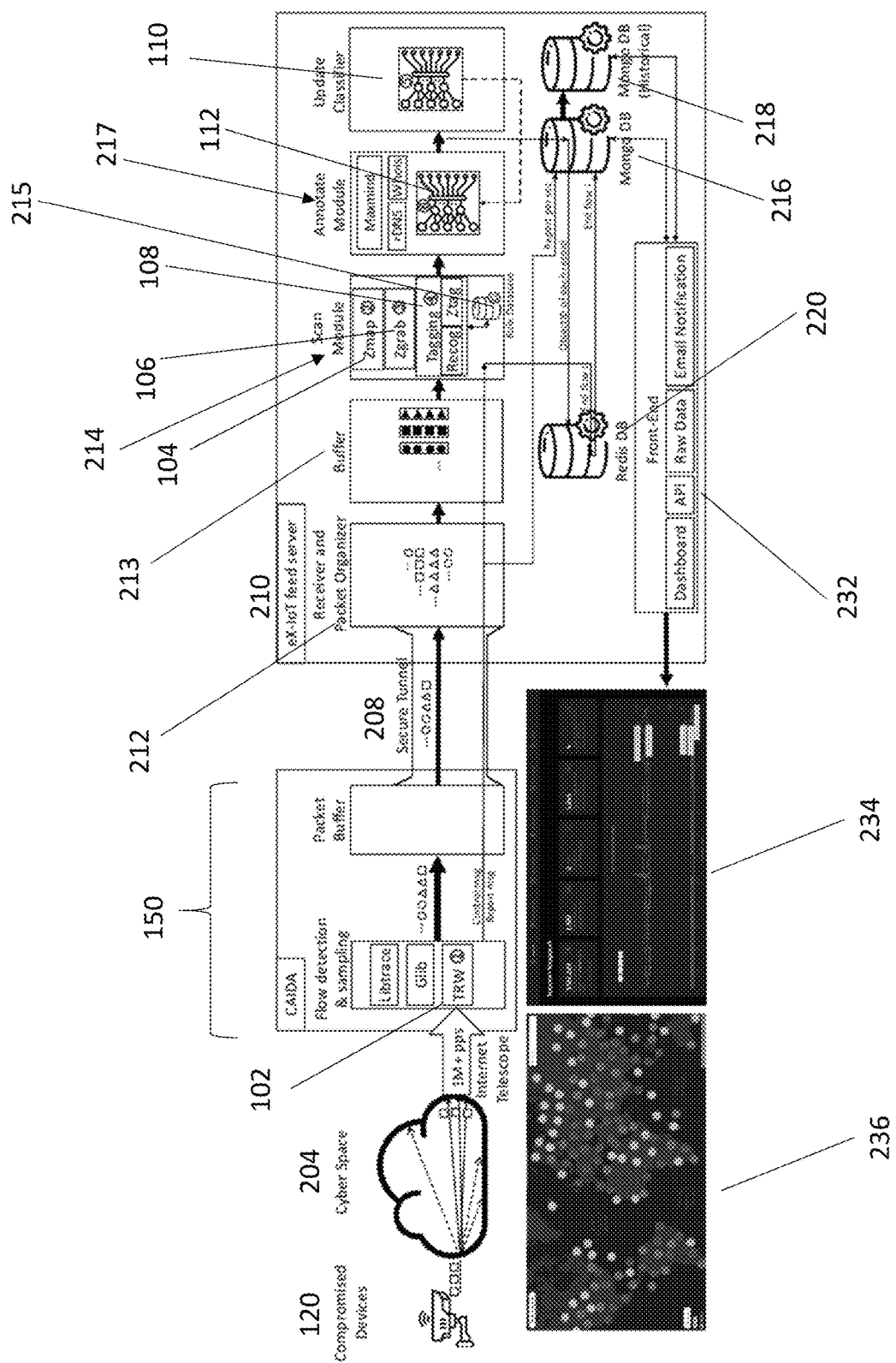
FIG. 2 illustrates the architecture of the eX-IoT.

The overall data engineering architecture of eX-IoT is demonstrated in FIG. 2. The numbers highlight the implementation/usage of the same steps as in FIG. 1. A /8 Internet telescope 150 (16 M+IP addresses) from the Center for Applied Internet Data Analysis (CAIDA) was leveraged. The passive traffic collected by CAIDA's Internet telescope 150 consists of approximately 150 GB/hour which is on average more than 1 M packets per second (with ascending trend). The data is collected hourly, compressed and stored using OpenStack Swift. Access to data is provided through a cluster located at UCSD. Due to the agreement policy and the high volume of data, transferring the entire data stream and processing it locally in real-time is infeasible. Therefore, the flow detection and packet sampling stages are executed on the assigned cluster at CAIDA. The analyzed sampled batch of packets are then sent to the local eX-IoT server 210 through an established secure tunnel 208 for further processing. The processing pipeline is divided into several distinct modules and run separately to achieve high level of parallel processing, high throughput and low latency for real-time stream processing. Besides, eX-IoT depends on three distinct databases; (i) A MongoDB database 216 to store the latest threat information related to compromised IoT devices, (ii) Another historical MongoDB database 218 to store information of compromised devices with a lapsing two-week period, (iii) A Redis in-memory database 220 to store records (OBjectIDs) of MongoDB instances related to compromised devices that are still active; and to use for fast and low-overhead update of the devices coupled with their malicious activities.

A compromised device 120 sends out packets through cyberspace 204 to identify and co-opt other IoT devices. A network telescope 150, at, for instance, CAIDA, detects these packets 102 and stores them. The information on these packets is sent via secure tunnel 208, to another server 210 where the analysis portion of eX-IoT resides. The receiver and packet organizer module 212 may receive and organize the packets before sending them on to the scan module 214. The scan module 214 may perform the steps of probing the application banners 104, finding the banner response 106, and identifying the banners or performing banner-based IoT fingerprinting 108. A binary classifier may then be trained (or updated) 110 to label incoming packets as belonging either to an IoT device or to a non-IoT device. The classifier may then be used on additional incoming packets in the annotation module 112. As needed, these systems may access the MongoDB 216, the historical MongoDB 218, or the Redis DB 220. The results may be output to a front-end user interface 232. An exemplary front-end user interface 232 may present the user with data in a GUI 234 which may include a map 236 of infected devices.

Flow detection and packet sampling. This module may be developed in C++ and utilize the Libtrace packet handling library to achieve real-time processing. The program constantly checks for newly added data sources (hourly), decompresses and analyzes every single packet. Packets that are not backscatter-related (e.g., packets with only TCP ACK flag set, ICMP packet with unreachable code set, etc.) are considered as potentially scan packets. For packets which pass this step, their state is kept in a GLib Hashtable with the source IP address as the key. The state for source IP x consists of a {start timestamp, timestamp of latest arrived packet from x, number of packets from x, IsScanner}.

A threshold random walk (TRW)-based scan detector may then be used. The system/program considers a source x as a scanner if it receives at least, for instance, 100 packets without expiration (inter-arrival time between consecutive packets from x should be less than or equal to a threshold time, such as 300 seconds). Also, the duration should not be less than another threshold (e.g. 1 minute) to find and exclude flows that are result of network misconfigurations. Upon detection of a source IP address x as a scanner, the IsScanner attribute for x is set, and the number of received packets is reset to zero to start packet sampling. Subsequently, a full list of field values (fields may comprise IP, TCP, UDP, ICMP headers, timestamp, packet and header length amongst others) from x is generated for the next threshold (e.g. 200) packets and sent to the next module. The module seizes after the threshold number of samples is acquired.

For the next batch of incoming packets from x, the program ignores the packets and updates the latest timestamp for x. At the end of a time period, for instance, one hour, and before starting to process a new set of data, if the latest timestamp for x is more than the time period ago, the sca flow expires flow, and it is concluded that the scan has ended. The system may send a message that the flow generated by x has ended. Another task of this module is to provide packet-level reports frequently, for instance every second, including total processed packets, number of TCP, ICMP, UDP, number of newly detected scan flows, and number of packets that target specific ports. On average in an example configuration, this module may spend close to 20 minutes to analyze one hour's worth of data.

The output is sent to a specific local port using, for instance, Socat. Therefore, if any network communication is disrupted, the flow detection and sampling module will go idle until the next stage can reconnect to that port and be ready to receive the data. Thus, no data will be lost due to network failures.

TABLE 1

| supported ports and protocols | |
|---|---|
| Ports | 80, 22, 443, 21, 23, 8291, 554, 8080, 7547, 8888, 5555, 81, 631, 8081, 8443, 9000, 8888, 2323, 85, 88, 8082, 445, 8088, 4567, 82, 7000, 83, 84, 8181, 5357, 1900, 8083, 8089, 8090, 110, 143, 993, 995, 20000, 502, 102, 47808, 1911, 5060, 5000, 60001 |
| Protocols | HTTP(s), TELNET, SMTP(s), IMAP(s), POP3(s), SSH, FTP, CWMP, SMB, MODBUS, BACNET, FOX, SIP, RSTP, SSL/TSL, DNP3 |

Receiver. This module may establish and maintain the secure communication as well as analyze the control and report messages. If the secure communication is disrupted for any reason, this module will retry to establish a new SSH tunnel and connect to the specific local port on the CAIDA cluster. The receiver may then send the report messages to the MongoDB 216.

Packet Organizer. This packet organizer module 212 may receive all the sampled packets from different sources, organize them based on their source IP address and arrival time, pack them and dispatch them to the scan module 214. This way, the packet organizer module 212 ignores the sources that do not contain enough samples to be used for applying the model or for updating the classifier. These are typically sources that have been erroneously identified as scanners and may be the results of node malfunction on the Internet (which usually send out bursts of a small number of packets for a very short period). The output of this module is in a JSON format piped to buffer.

Buffer. The buffer 213 may comprise an in-memory large FIFO storage (e.g. 15 GB) to curb the effect of mismatched processing delays among the modules especially due to the rising volumes of data which is sent out from the CAIDA cluster network telescope 150. In an embodiment, an mbuffer implementation may be leveraged for this purpose.

Scan Module. The scan module 214 performs buffering of a batch of identified scanners. In an example, the scan module 214 may perform batch processing for a number (e.g. 100 k) of records or for a time, such as 60 minutes. The scan module 214 may run Zmap for target ports (e.g. 50 ports) with a certain rate (e.g. 5K pps rate), followed by running Zgrab for several protocols (e.g. 16 protocols). Table 1 enumerates the supported ports and protocols in an example, initial deployment of the system. These ports/protocols are known empirically to be the most responsive, but other ports or protocols could be easily added using updated measurements from emerging threats.

The scan module 212 also may prepare an updated database of application banner fingerprints 215 (e.g. a rule database) based on, for instance, Recog and Ztag and may apply it on returned banners using, for instance, Beautifulsoup and regex to add information regarding their vendor, type, model and firmware version. This information may also be used as labels in the update classifier module. Recog may be selected as an example since it is an open source repository, where individuals contribute actively to add new rules. The scan module 212 also dumps unknown banners that contain rules such as the "[a-z]+[-]?[a-z!]*[0-9]+[-]?[-]?[a-z0-9]" regex rule for inferring device-related information in text to a log file for further inspection and for generating rules for new devices that are not yet covered by the mentioned public resources. Meanwhile, the returned banners are added to the records in JSON format. Besides, upon receiving an END_FLOW message for a source IP x, the module 212 may retrieve the ObjectID of that specific infected IoT device 120 from the Redis database 220 (which contains a list of active infected devices) and may use that for updating the status of the device in the MongoDB 216. Searching the MongoDB 216 based on returned ObjectID is less expensive than finding the latest record for that IP address among all records in the database.

Annotate Module. The annotate module 217 may first pre-process traffic for each identified scanner 120 and then may apply the latest updated classifier to the network flow to identify if the flow has been generated by an infected IoT device or not. The preprocessing step may comprise (i) calculating inter-arrival times, processing the TCP options field and then normalizing every field using MinMax and subtracting it from the mean value of the training dataset; (A final list of exemplary fields are summarized in Table 2) (ii) Min, first-Quantile, Median, third-Quantile and Max values for each field over all sequence of packets from each source are calculated which is a tuple of size, for example, of 24×5=120 that may be considered as the final feature set to be fed into the machine learning model 110 for training and classification. The output of the classifier is the predicted label and a value between 0 and 1 which is the prediction score.

TABLE 2

| List of extracted fields from incoming packets | |
|---|---|
| General | Protocol ({TCP, UDP, ICMP}), Dst port, Total length, TCP offset, TCP data length, Inter-arrival time |
| IP header | Type of Service, Identification, TTL, Src IP, Dst IP |
| TCP header | Src Port, Sequence, ACK Sequence, Reserved, Flags, Window Size, Urgent Pointer |
| TCP Options | WSCALE, MSS, TIMESTAMP (Binary), NOP (Binary), SACK-permitted (Binary), SACK (Binary) |

In the next step, the annotation module 217 looks up every identified IP address in various databases including MaxMind dataset, IP WHOIS, and reverse DNS. The results comprise geo-location data (e.g. country, state, city, latitude and longitude coordinates), hosted ISP, Autonomous system (ASN), domain address, business sector, resided organization and registered emails related to the hosting entity. In addition, the results of packet-level fingerprinting of an IoT malware's scanning module (e.g., Mirai) and Internet scanning tools (ZMap, MASSCAN, Unicorn, Nmap) is appended. Additionally, a list of targeted ports and their distribution, scanning rates and address repetition ratio (e.g.

ratio of the number of all packets to the number of unique targets) for each flow is estimated. Besides, scanners are labeled as benign if their rDNS records contain domains that can be attributed to legitimate security companies and research institutions such as University of Michigan, Shodan, Censys, Rapid, etc.

Update Classifier. Traffic that has the original labels (from the tagging step in the scan module 214) may be passed to this module 110. The flow pre-processing step is exactly the same as the explained step in the annotation module 112. The model, which may be updated every 24 hours, may use data samples during a past time period (e.g. 14 days) to make sure that the model is always updated based on the latest information and can comprehend the patterns related to emerging IoT malware. Available data may be split into training and testing datasets (e.g. training/testing at 20%/80%, though other ratios may be used as may k-fold cross-validation or other validation methods) and a classifier model (e.g. a Random Forest from the sklearn package which maximizes the ROC-AUC metric) is selected. In the example noted the Random Forest model may be selected and run over many (e.g. 1000) iterations over a set of tuned hyperparameters. Other models may also be used as detailed elsewhere in this disclosure. All the trained models may be augmented with a training timestamp and stored in a directory to make the results easily reproducible. In preliminary tests, various classifier models were tried. The exemplary performance of Random Forrest (RF), Support Vector Machine (SVM) and Gaussian Naive Bayes (GNB) over a wide-range of hyper parameters may be compared. The exemplary results based on ROC-AUC and F1 score prompted leveraging the Random Forrest model for an initial, exemplary implementation of the eX-IoT system/program.

Exposing Data (User Interfaces)

To provide a fast and reliable way of accessing both the raw data and the generated CTI, eX-IoT exposes its data to the operational security communities and researchers in several ways: a web-based interface for data analysis and data visualizations, a RESTful API for programmatic access, raw bulk data and email notifications 232.

Web Interface. eX-IoT's web Interface is a hub for data visualizations and raw data searches. It may comprise 4 parts: (1) an Internet snapshot that provides high-level real-time data, (2) an interactive map 236 of all data points in, for example, the past week, (3) a dashboard 234 with data visualizations and the ability to examine specific database fields and (4) a raw database query builder.

Programmatic Access. eX-IoT's REST API 232 may easily filter data and extract the data from the database in an ingestible format. The API may return data encoded as JSON objects for ease of interpretation or integration by third-party applications.

Raw Data. In some cases, bulk historical data may be required and thus eX-IoT can provide this to security operators/researchers, practitioners and government authorities for research/training purposes or for cyber situational awareness.

Email Notification. Two mechanisms for email notification are considered. First, organizations and users can set alarms for their IP block and instantly receive notification through their provided email address. In the second mechanism, eX-IoT feed will notify organizations and ISPs who host infected IoT devices by the list of organization's email address available in their WHOIS record.

Initial Exemplary Operation and Evaluation

To report on the exemplary operation, analysis, and shortcomings of eX-IoT, the model was first executed for two weeks to make sure it had enough data points for training purposes. In an embodiment, all steps were consistently completed on an Intel Xeon W-2145 (16 cores at 3.70 GHz) processors, 128 GB of DDR4 memory, and RAID 1+0 with an Intel 850 Pro 1 TB SSD drives. The cluster at CAIDA was running an Intel processor (Skylake, IBRS) with 8 cores at 2.20 GHz and 32 GB of RAM.

Initial CTI Validation

While this embodiment of eX-IoT operated for a short period of time, an effort was made to validate the generated CTI in terms of the exploited IoT devices. Ideally, email notification capabilities would be used to contact each entity in which eX-IoT has identified a compromised hosted IoT device. Nevertheless, for initial, exemplary validation purposes and to obtain quite a comprehensive and a convincing response rate, two alternative approaches were utilized. First, a US-based entity, namely, Bad Packets was contacted. Bad Packets deploys and operates large-scale honeypots (including IoT-specific honeypots) distributed across many network providers and spread across multiple countries. CTI from Bad Packets was used to correlate eX-IoT's CTI feed related to US-based IoT exploitations. Second, CSIRT in Czech Republic was contacted and cross validated eX-IoT's IoT exploitations that are specific to Czech Republic with the CSIRT's scanners' database. For both approaches, data from the week extending from March 14th to Mar. 18, 2021 was used. Broadly, close to 70% of eX-IoT's detected IoT exploitations from both sources, were able to be validated with the CSIRT in Czech validating close to 83% of the country-based IoT exploitations. Several factors could have affected the validation accuracy, including, the limited/different vantage points used by those sources, the time frame of the conducted validation, the fact that IoT malware continue to avoid honey-pots, and eX-IoT's false positives in terms of misclassifying a scanning source to be an IoT device (rather than a generic scanning host, though the learning approach has previously demonstrated high accuracy). Nevertheless, the initial validation results are believed to be motivating and work can continue with local, federal and international collaborators to fine-tune it.

Evaluation

Although there exists no similar feed which solely and exclusively focuses on compromised IoT devices, eX-IoT was further evaluated based on a well-defined set of metrics in contrast to two other scan-based feeds, namely Dshield (one of the high volume public feeds) and GreyNoise (commercial threat intelligence that tags the records with "Mirai" and "Mirai variant"). In a subsequent section there is more elaboration on such metrics and on the corresponding evaluation.

TABLE 3

Volumetric comparison of scan-based CTI feeds

| | eX-IoT | GreyNoise | DShield |
|---|---|---|---|
| All | 757,289 | 215,350 | 214,390 |
| IoT-specific | 145,989 | 20,557 | N/A |

Volume is the rate of a feed, which quantifies the amount of data appearing in a feed on, for example, a daily basis. Table 3 reports the average number of new daily records in the evaluated feeds over a week period. GreyNoise, on average, reported around 215,350 records and classified 85,330 as being malicious, 126,018 as unknown and 4,002 as benign. GreyNoise also tagged 20,557 records with "Mirai" and "Mirai variants". DShield reported 214,390 records in general without any information about IoT exploits. In this example, eX-IoT in general may identify close to 4 times as many threats as do these other two feeds. Further, regarding the number of infected IoT devices, eX-IoT detects about 7 times more compared to GreyNoise.

Another metric is the differential contribution of one feed with respect to another. That is the number of indicators which appear in the first feed that are not in the second feed over the same measurement time; $\text{Diff}_{A,B}=|A\backslash B|/|A|$. $\text{Diff}_{A,B}=1$ indicates that the two feeds have no elements in common, while $\text{Diff}_{A,B}=0$ indicates that every indicator in A also appears in B. It is a measure to characterize how many additional indicators a feed offers relative to one or more other feeds. Respectively, normalized intersection is defined as $1-\text{Diff}_{A,B}$. Similarly to differential contribution, exclusive contribution is defined as the contribution of a feed with respect to a set of other feeds which is the proportion of indicators unique to a feed; $\text{Uniq}_{A,B}=|A\backslash \cup_{B\neq A}|/|A|$. To this end, the set of newly infected devices from eX-IoT during the 9th of December 2020 was considered which contained 134,782 unique IP addresses. The IP addresses are contrasted with GreyNoise and DShield, where GreyNoise was found to contain information about 28,338 of the IP addresses. (Of the 28,338 IP addresses in GreyNoise's historical database, 12,282 of them have been updated in the same time period, and 10,460 tagged with "Mirai" and "Mirai variants"). Further, these results were matched with the DShield feeds from the same time period which lead to 8,559 common records. Subsequently, the differential contribution, normalized intersection and exclusive contribution of eX-IoT with respect to these statistics were calculated. The results in Table 4 below show the significant contribution of eX-IoT compared with the other CTI feeds (more particularly, in the compromised IoT-context) where typically devices execute scanning in low rates. First, DShield does not provide information about the IoT/non-IoT type of these scanners, and GreyNoise tagged 10,640 of 134,782 as "Mirai" and "Mirai variants" which confirms the lack of IoT-specific focus in the existing threat feeds. Second, the differential contribution is close to 1 which confirms the high contribution level of eX-IoT feed over the other feeds. The maximum value for the normalized intersection only reached 0.21. In other words, in this example, 78.9% of IoT infections flew under the GreyNoise radar without being detected. Finally, about 76% of eX-IoT output are unique and the records are not indexed in other feeds.

TABLE 4

Metrics of eX-IoT in contrast to GreyNoise and DShield. The feeds are compared with 134,783 IoT records from eX-IoT.

| | GreyNoise | GreyNoise (Mirai) | DShield |
|---|---|---|---|
| # of indicators | 28,338 | 10,640 | 8,559 |
| $\text{Diff}_{A,B}$ | 0.78974 | 0.92105 | 0.93649 |
| Normalized Intersection | 0.21025 | 0.07894 | 0.06350 |
| $|A \cap (\cup_{B \neq A})|$ | | 31,563 | |
| $\text{Uniq}_{A,B}$ | | 0.76582 | |

Latency related to a feed is the elapsed time between an instance's first appearance in any feed and its appearance in the feed in question. Latency characterizes how rapidly new threats are included in a feed. To this end, by leveraging, for example, Zmap, an time delimited (e.g. 3-hour) Internet-wide scanning may be executed for a particular port and rate. For instance, port 80 with a rate of 1000 pps on Dec. 9, 2020 at 7:30:00 was scanned for three hours. It then indeed appeared in eX-IoT as "Desktop (non-IoT)" and tool as "Zmap" at 12:42:04 of the same day, which means that it took 5 hours and 12 minutes from the time that scan started to appear in the feed. The main contributor of this delay is CAIDA's role in collecting, compressing and storing to prepare hourly pcap files which takes approximately 3.5 hours. The detected start time and end time for this test scan in eX-IoT is recorded as 7:30:24 and 17:48:59 which respectively have erroneously 24 seconds and 13 minutes difference. Comparing with other feeds, the IP did not appear in DShield, while the record was added to the GreyNoise feed with close to 10 hours of latency since the beginning of the scan and the tool was incorrectly identified as "Nmap".

The accuracy in this context is equivalent to precision of a feed which is the percentage of indicators in the eX-IoT that are correctly labeled as IoT. The coverage is equivalent to recall in information retrieval contexts and defined as the proportion of the correctly labeled IoT devices contained in the feed. Accordingly, here accuracy and coverage with respect to the assigned labels as IoT are considered, not the accuracy and coverage for all scan feeds. Therefore, the labels in the eX-IoT are compared with the labels derived directly from the returned banners. All the records on the 7th, 8th and 9th of December 2020 that had the true label (IoT/non-IoT) based on their banners were checked and used as the ground truth to evaluate eX-IoT. The analysis led to accuracy (precision) of 94.63% and a coverage of (recall) 77.21%.

A snapshot of compromised IoT devices was reported. All the discovered compromised IoT devices that were active during the 7th-9th of December 2020 were selected. Although it is not possible to remove the effect of dynamic IP allocation and IP churn on the reported statistics, three days were selected as a trade-off between the completeness of the view and the IP churn effect. eX-IoT generated CTI related to 488,570 instances belonging to 405,875 unique IP addresses. Therefore, only 82,695 (≈16%) have redundant IP addresses. Based on Table 5, China (43.46%), India (10.32%), Brazil (8.48%), Iran (5.51%) and Mexico (3.52%) are the top 5 countries which host infected IoT devices. Further, the top ASN included 4134 (21.28%), 4837 (16.45%), 9829 (5.38%), 27699 (4.96%) and 58244 (3.30%). By identifying the type of the hosting organizations, the existence of compromised IoT devices in Education (649), Manufacturing (240), Government (184), Banking (80) and Medical (79), although proportionally small, is quite alarming. Top targeted ports by the infected IoT devices were 23 [TELNET] (43.25%), 8080 [HTTP alt] (37.40%), 80 [HTTP] (37.16%), 81 [HTTP alt] (13.10%) and 5555 [ADB] (12.92%). Details about the top hosted ISPs and continents, and infected vendors are also provided in Table 5.

TABLE 5

Report on Top-5 characteristics of global IoT infection on the 7$^{th}$, 8$^{th}$, and 9$^{th}$ of Dec. 2020 time period.

| Country | Continent | ASN | ISP | Critical Sector | Vendor | Target Ports |
|---|---|---|---|---|---|---|
| China (43.46%) | Asia (73.31%) | 4134 (21.28%) | China Telecom [CN] (21.16%) | Education (649) | MikroTik (11583) | 23 (43.25%) |
| India (10.32%) | S. America (10.82%) | 4837 (16.45%) | Unicom Liaoning [CN] (16.23%) | Manufacturing (240) | Aposonic (1809) | 8080 (37.40%) |
| Brazil (8.48%) | Europe (8.62%) | 9829 (5.38%) | Vivo [BR] (5.38%) | Government (184) | Foscam (1206) | 80 (37.16%) |
| Iran (5.51%) | N. America (5.57%) | 27699 (4.96%) | BSNL [IN] (5.31%) | Banking (80) | ZTE (709) | 81 (13.10%) |
| Mexico (3.52%) | Africa (4.10%) | 58244 (3.30%) | Axtel [MX] (3.03%) | Medical (79) | Hikvision (638) | 5555 (12.92%) |

ASN = Autonomous system number

Gathering fine-grained details about compromised IoT devices (e.g., type, vendor, model, and firmware version) remains challenging. Empirical analysis reveals that less than 10% of the infected hosts return application banners and approximately 3% of them contain textual information which enables an outside observer to determine their detailed information. Further, eX-IoT was tested during a short period of initial deployment and needs to be assessed in the long run to gain insights regarding the challenges and opportunities in gaining a more rounded understanding of the IoT security posture.

A novel darknet-specific, formal sanitization model is described that systematically identifies and filters out misconfiguration traffic to permit the storage and processing of network telescope 150 data. The proposed darknet sanitization model does not rely on arbitrary cut-off thresholds, but instead provides likelihood models to distinguish between misconfiguration and other forms of darknet traffic, independent from the nature of the traffic sources. As a result, the proposed model neatly captures the natural behavior of darknet-targeted misconfiguration traffic.

Figure 3:
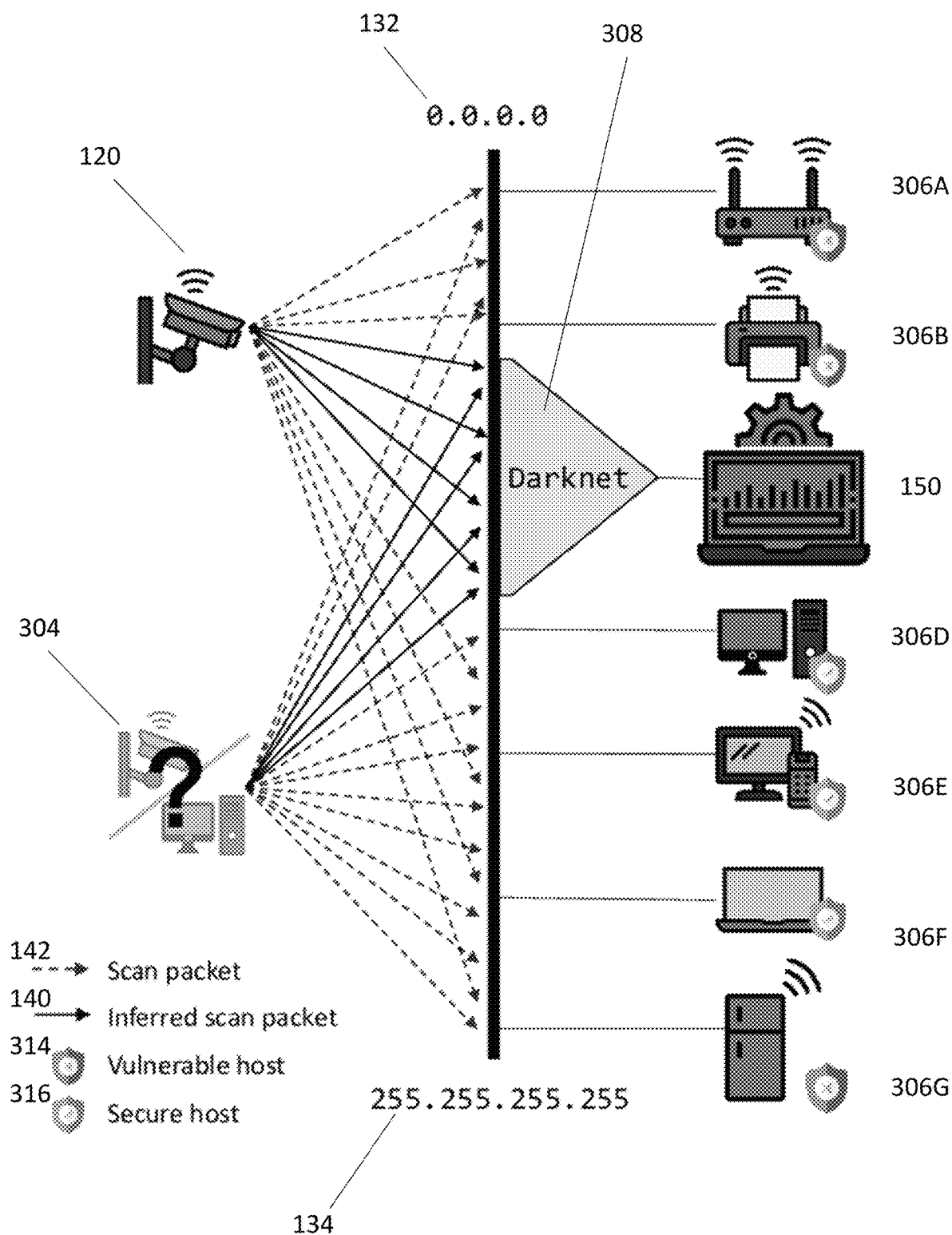
FIG. 3 illustrates an IoT-centric fingerprinting method.

An IoT-centric fingerprinting approach rooted in deep learning and active measurements methodologies to infer Internet-scale compromised IoT devices by exclusively operating on network telescope 150 data is also presented. The addressed problem herein is illustrated in FIG. 3. Using more than 3 TB of recent darknet data, the outcome of such a proposed approach exposes more than 400,000 compromised IoT devices from very well-known vendors. The results highlight that more than 75% of all the inferred IoT bots do not match the typical Mirai signature, concurring the evolving nature of this threat phenomena and highlighting the added-value of the proposed methodology.

FIG. 3 illustrates the fingerprint approach. Many devices 306A, 306B, ... 306G are connected to the internet with an IP address assigned from a low number 132 (e.g. 0.0.0.0) to a high number 134 (255.255.255.255). Some devices are well protected, such as devices 306D, 306E, and 306F in the figure, which are denoted with a secure host 316 icon. Other devices such as 306A (a router), 306B (a printer), and 306G (a refrigerator) lack such protections and are open and exposed and are denoted as such by the vulnerable host icon 314. These devices are merely examples, but other devices connected to the internet are readily apparent to those skilled in the art, including, web cameras, smart phones, smart appliances, baby monitors, and others. One device 150 is assigned a group of IP addresses and receives incoming packets. A malicious actor has a hijacked or compromised a device 120 (in this example a web-connected camera) or devices (e.g. 304, which indicates another web camera, but one directly controlled remotely by a malicious user). These devices 120, 304 send scan packets 142 to a large set of possible IP addresses. Those scan packets 140 which are sent to the network telescope 150 are read, but nothing is returned. These IP addresses are referred to as the darknet 308 because few actual users are assigned IP addresses in this range. The device may be called a network telescope 150 because, in an analogy with a telescope, it sees incoming light (data packets) but does not send out messages itself. The assumption is that a normal appliance like a camera 120 has no valid reason for sending out packets to a whole group of IP addresses. The compromised/hijacked device 120 may have been infected with malware which causes it to seek out other, not yet infected devices, so that it can infect them also. A device 304 may also be controlled more directly by a malicious user to seek out vulnerabilities in other devices (306A-306G). Information about the infected devices can be harvested and analyzed and is called an IoT-centric fingerprinting approach. Techniques such as deep learning may be applied to analyze the measurements of the network telescope 150.

Figure 4:
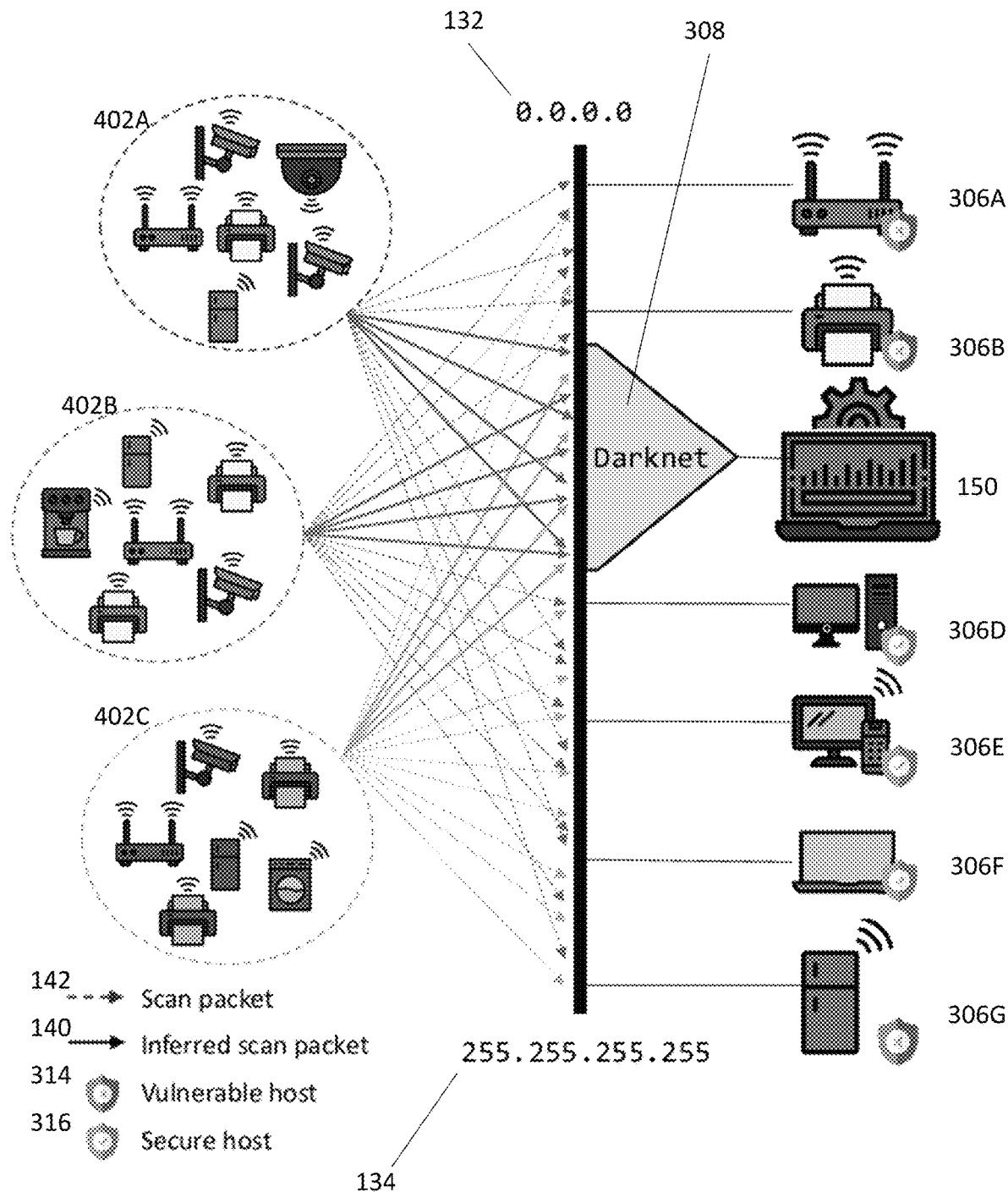
FIG. 4 illustrates an IoT-specific botnet method.

An IoT-specific botnet inference methodology is further described and is based upon effective and lightweight (darknet) data-driven features and hierarchical agglomerative clustering. The addressed problem herein is shown in FIG. 4. The results from instrumenting such an approach uncover more than 300 "in the wild" IoT botnets, where close to 25 campaigns contain over 1,000 exploited, well-coordinated IoT bots. Moreover, IoT botnet-specific traits are investigated, including scanning modules, probing rates and their geo-distributions. While the results shed light on previously documented IoT botnets that were found to still be active, the outcome also uncovers new IoT botnets such as those possessing cryptojacking capabilities (which were shown to be coordinated by the same "player" due to the usage of the same key) and those that were inferred to be targeting industrial control systems.

FIG. 4 illustrates another approach to determining whether an IoT device has been infected or not. In this instance, an IoT botnet or group of botnets has infected various groups of devices (402A, 402B, and 402C). These groups of infected devices 402A, 402B, and 402C send out scan packets 142 to a group of devices (306A-306G, 150) connected to the internet. One of these devices a network telescope 150, which receives incoming packets 140. These packets are known as inferred scan packets 140.

Related Work

In this section, three topics central to the contemporary IoT security landscape are reviewed. The first focuses on network telescopes as a powerful mechanism to capture IoT-specific, illicit network traffic. The second summarizes efforts pertaining to IoT device fingerprinting.

Network telescopes and IoT Security. A network telescope 150 (i.e., darknet), is a set of routable, allocated, yet unused IP addresses 308 deployed in order to passively observe incoming Internet-scale traffic. Since these IP addresses are not associated with any services, traffic targeting them is unsolicited. Such traffic originates from infected devices 120, 304 scanning the Internet space, victims of Denial of Service (DOS) attacks, or misconfiguration caused by hardware/software errors or improper routing. Network telescopes are reliable sources for investigating large-scale, Internet-wide activities, which is supported by recent examples of successful applications including studies on probing activities and DDOS attacks. In the context of assessing the maliciousness of IoT devices through network telescopes, recently researchers have conducted large-scale correlations between passive measurements and IoT-relevant information to investigate and disclose malicious activities associated with more than 26,000 IoT devices, including those within critical infrastructure. Leveraging a large-scale network telescope 150, the authors categorized the ports and services targeted by scans within the network telescope 150, attributing them to infected IoT devices and identifying active threats (i.e, IoT devices launching brute-force SSH attacks). Similarly, by correlating active measurements with collected network telescope data, other researchers examined nearly 14,000 compromised IoT devices and extracted malicious signatures for mitigation in IoT hosting environments. Further investigation of the collected network traffic revealed that nearly 20% of the identified IoT devices were related to DDOS attacks. Moreover, by means of applying filters to network telescope data in order to discern Mirai-relevant traffic, IoT-related information was gathered pertaining to roughly 1.2 million Mirai-infected IP addresses during 8 months. Their work revealed crucial details of the Mirai malware's attack vectors, such as targeted ports (TCP/Telnet:23 and TCP/Telnet: 2323). Furthermore, after correlating their results with Censys scans, the authors fingerprinted the device types of Mirai-infected bots-confirming the IoT-centric composition of the botnet. In a related study, researchers collected network traffic across a 300,000 IP darknet space to conduct empirical studies focusing on IoT malware cleanup efforts and remediation rates in a medium-sized Internet Service Provider (ISP). Combining network traffic received within their darknet with malware binaries retrieved from an IoT-based honeypot and IP addresses retrieved from Internet scanners Censys and Nmap, the authors tracked the success (and failure) of remediation efforts, reporting device reinfection rates.

While such contributions are noteworthy, several shortcomings exist. First, previous works rely on a specific IoT malware signature (e.g., the Mirai-specific signature of tcpSeq==dstIP). Not every IoT bot will follow such an easily identifiable signature, preventing comprehensive identification of Internet-scale botnets "in the wild". In fact, these measurements have revealed that less than 25% of all the inferred IoT bots match the Mirai-specific signature. Second, the majority of these related works solely depend on databases gathered by Internet scanning services (e.g., Censys and Shodan), which might not be able to accurately identify every infected IoT device at a global scale. Upon infection, it was discovered that the Mirai malware closed a number of ports and services on newly exploited IoT bots to prevent infection by competing malware. As a result of such territorial nature, Internet search engines are unable to discover a large portion of infected devices due to the similarities between their discovery methods and malware scanning trends. In contrast, a novel approach is outlined, with the aim of creating a more comprehensive view of the aforesaid IoT bot populations. This approach synergistically leverages passive, darknet-centric assessments coupled with active, Internet-scale measurements and machine/deep learning techniques.

IoT device fingerprinting. Previous works that propose IoT inference methods rely on text information retrieved from service banners, gathered by active measurements (e.g., port scanning and banner grabbing), or provided by Internet scanning services. For example, one group leveraged predefined text rules from Censys to fingerprint consumer IoT devices, designing an ensemble of four supervised classifiers on UPnP and DNS responses, HTTP data banners, and network-layer information. Alternatively, several research efforts have elected to attempt IoT device fingerprinting by solely observing network traffic. For instance, others have postulated that because IoT devices regularly exchange data with servers managed by their manufacturers, IoT device type and vendor can be fingerprinted by observing the exchanged flow-level network traffic between devices and servers. After discovering nearly 200 candidate servers accessed by 26 devices across 15 vendors, their methodology successfully identified IoT devices connected across the University of Southern California (USC). In another work, a localized lab environment to extract TCP packet features from a variety of IoT devices, including baby monitors, IP cameras, and printers was explored. Extracted features were employed to train a supervised learning algorithm in order to distinguish between IoT devices and non-IoT. Moreover, leveraged network traffic generated by IoT devices during their setup process for capturing device-specific traits was investigated. A number of automatic requests and updates were collected and subsequently mapped as signatures, detailing the device type by way of random forest classification. Improving upon anomaly detection premised on device types a machine learning algorithm has recently been implemented which discriminates between the corresponding classes of devices, but exhibited remarkable performance with detection rate 95.6%. Similarly, a machine learning-based methodology was developed capable of fingerprinting distributed devices. This disclosure overcomes previous limitations hindering centralized approaches by offering a scalable and dynamic methodology.

Algorithms for distinguishing between IoT and non-IoT devices based upon packet specifications were developed. The mean and standard deviation of the packet length were combined with the number of bytes transmitted by each device in one-second time intervals to accurately profile devices. Further, devices in a local network were detected by passively intercepting and recording wireless signals. Extracting the encapsulated MAC addresses from investigated flows allowed for IoT device identification. In an alternative approach, a web script was implemented to identify the presence of IoT devices running local HTTP servers. Once identified, IoT vulnerabilities are disclosed, specifically the unauthorized accessing of such IoT devices through DNS rebinding.

A shortcoming of the aforementioned approaches is that their scope is limited to local IoT networks. Therefore, they do not present an Internet-wide perspective; hence, their proposed approaches are not applicable on one-way scan flows arriving at network telescopes. In contrast, a large-scale network telescope 150 is leveraged to collect Internet-wide network traffic, followed by the deployment of a strict rule set used to fingerprint hosts that respond with banners when probed. Additionally, learning techniques are devised to identify unreachable infected hosts and predict their device types using innovative features extracted from sequences of TCP SYN packets arriving at the network telescope 150.

IoT botnet analysis. The discovery and analysis of IoT-centric botnets reveal crucial cyber threat intelligence relating to the discovery of malware attack vectors and disclose possible vulnerabilities or intrusion points within globally-deployed IoT devices. Within the context of botnet analysis through tailored honeypots, several malware families have been inferred by constructing a honeypot to analyze attacks against Telnet services. Dubbed as IoTPOT, the honeypot was specifically tailored to mimic the CPU architectures of various IoT devices, while learning how to respond to command interactions. Furthermore, the IoT-centric Scalable high-Interaction Honeypot (SIPHON) was designed which demonstrated effectiveness to attract a tremendous amount of malicious IoT botnet-generated traffic (ranging from 50,000 to 600,000 attempted TCP connections) through a combination of worldwide wormholes and a small number of deployed IoT devices. The deployed SIPHON honeypot recorded hundreds of brute-force password attacks and retrieved credential dictionaries used for these attacks. Moreover, other researchers reported on a large number of exploited IoT protocols, based on an in-depth analysis of network traffic from IoT-centric honeypots and network telescopes.

While such works provide crucial IoT-centric botnet analysis, given the copious amounts of IoT hardware in the wild and their accompanying heterogeneity, it is of note that honeypot-based methodologies frequently fail at mimicking the entirety of IoT device and firmware vulnerabilities. However, capturing such characteristics are essential to characterizing and attributing large-scale IoT botnets. Additionally, the vantage points of honeypots are typically quite small, hindering their effectiveness in tracking Internet-scale IoT botnets as well as accurately estimating their population size.

Rather than deploying honeypots, alternative works attempted to identify compromised IoT devices (bots) in local networks. For example, a novel, host-based intrusion detection system (IDS) has been proposed that monitors a device's typical behaviors through analyzing its network traffic using autoencoders. The IDS creates a snapshot of what the device is expected to be communicating, and will subsequently raise an alarm if any deviations or anomalies are detected. To evaluate the effectiveness of the proposed IDS, nine commercial IoT devices were deployed in a controlled environment to generate benign traffic. These devices were then infected with two very notorious IoT malwares, Mirai and BASHLITE, and tested the IDS capabilities for identifying the newly corrupted traffic flows.

Further, an autonomous self-learning distributed system for detecting compromised IoT devices has been presented, leveraging federated learning technique to aggregate IoT device fingerprints. These fingerprints are then clustered and categorized based on device type and models. Next, a K-Nearest Neighbors classifier identified abnormal network traffic to discover compromised IoT devices. Evaluated on 30 different devices and selected Mirai malware for the real-world case study, ultimately, the methodology achieved a 94% detection rate and 257 ms average detection time.

Alternatively, other literature considers a macroscopic approach for generic botnet analysis by aggregating information from various sources. To this end, a system for correlating aggregated IDS log files with extracted features from network flows to detect botnet activities has been proposed. The system assumed that hosts infected with the same malware behave in a similar manner and that bot-generated flows captured within the IDS logs will share many of the same characteristics. Subsequently, they were clustered in a two-stage, high dimensional classifier for identifying botnet campaigns. The evaluation results on a university campus reveal a botnet detection rate of 99.6%. Similarly, BoTShark was proposed, primarily using deep learning models such as autoencoders and convolutional neural networks relying on captured netflows to efficiently detect malicious traffic. With a true positive rate of 0.91 and a false positive rate of 0.13, BoTShark successfully detected malicious traffic signatures of botnet campaigns.

Additionally, different works attempted to identify and characterize IoT botnets through passively collecting one-way network traffic. Others have proposed a methodology that not only detected bots, but classified their primary behaviors and characteristics. Utilizing a two-step subspace clustering method to cluster botnets and clarify partial characteristics (such as low-size flows or high TCP-SYN packet rates), the methodology was evaluated on two real-world datasets, collected by upstream, backbone ISPs. Similarly, IoT botnet characteristics have been studied by way of analyzing their scan activities. The associated rule learning has been applied on network telescope features such as destination ports, ToS, and TCP window sizes to discover the activities of bots that were infected with well-known malware. Another group reported interesting observations on the evolution of IoT botnet characteristics before and after the release of the Mirai's source code.

In contrast, other works specifically focused on a single IoT botnet family to retrieve relevant attack vectors and behavior, such as the Mirai botnet. Another example includes a comprehensive investigation related to the Hajime IoT botnet, revealing crucial insights such as Hajime's atypical infrastructure. This IoT botnet deviates from typical command and control infrastructures that rely on bots to communicate with infected servers to receive orders and relies instead on peer to peer connections between bots and utilizing the BitTorrent protocol to transfer payloads. To summarize such contributions, Table 6 provides a brief classification of recent selected works using different dimensions.

TABLE 6

Summary of selected recent botnet detection literature

| Employed Data Type | Botnet Class | Methodology and Evaluation |
|---|---|---|
| Honeyfarm/Network Telescope | IoT | Passive measurement and analysis of real-world IoT honeyfarm traffic. |
| Two-way Traffic | IoT | Training on normal behavior using autoencoders. Evaluated on 9 IoT devices in a lab environment tested with Mirai and Bashlite. |
| Two-way Traffic | IoT | Federated learning. Evaluated on 30 IoT devices in a lab environment tested with Mirai. |
| NetFlow/Aggregated IDS log | Generic | Correlation and two-step clustering. Evaluated on real-world dataset. |
| NetFlow | Generic | Autoencoder/CNN. Evaluated on combined botnet traffic ISCX. |
| xFlow | Generic | Two-step Subspace Clustering. Tested on real-world ISP traffic and MAWI. |
| Network Telescope | Generic | Association rule mining evaluated on real-world/16 network telescope. |
| Network Telescope/Censys/ Passive DNS/Telnet Honeypots/Malware binaries | Mirai | Mirai signature tested on/10 network telescope. |
| Active Scanning/Root DNS backscatter traffic | Hajime | Bug in P2P infrastructure while observing the effect on samples of all queries to the D-root DNS root server. |

The aforementioned research and analyses present significant and important analysis of IoT botnets; however, a number of limitations prevent them from offering a generic, Internet-wide perspective of global IoT botnet populations. Target-specific studies designed to investigate a singular IoT botnet take advantage of known botnet infrastructure or signatures, and in turn cannot be replicated or generalized to study other IoT botnets. Furthermore, the vantage point offered by the honeypots, results in limited exposure when compared with one offered by a network telescope. To this end, in this disclosure, a purely passive methodology is developed to not only identify Internet-scale compromised IoT devices, but also to infer ongoing IoT botnets by capturing their orchestrated artifacts.

Proposed Methodology

Figure 5:
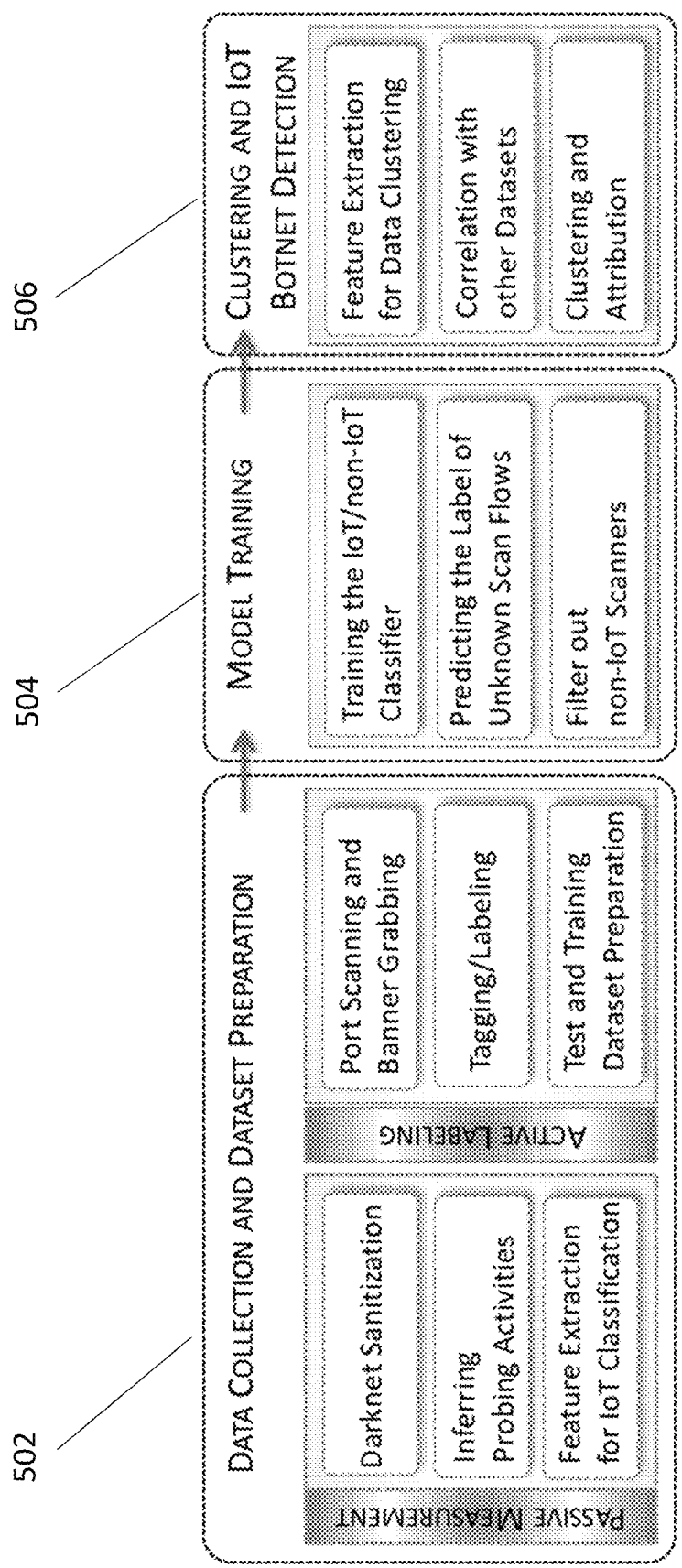
FIG. 5 illustrates the components of the method.

This section details the proposed approach as depicted in FIG. 5. Its core components include (i) data collection and dataset preparation (502), which introduces the darknet sanitization probabilistic model to filter out misconfiguration traffic along with the inference of Internet-scale probing activities and labeling their sources; (ii) the systematic evaluation of state-of-the-art machine learning and deep learning classifiers for fingerprinting compromised IoT devices (504); and (iii) the feature engineering process coupled with executing hierarchical agglomerative clustering to infer and report on IoT botnets (506). These steps are detailed in subsequent sections of this disclosure.

Network Telescope Sanitization Model

As previously noted, network telescopes 150, most commonly known as darknets 308, constitute a set of allocated and routable, yet unused, IP addresses. Since these addresses do not operate legitimate services, any traffic targeting them is considered unsolicited. From a deployment perspective, network telescopes are commonly distributed on specific Internet IP subspaces operated by Internet Service Providers (ISPs), educational entities and corporate backbone networks. Darknet IP addresses 308 are, by nature, indistinguishable from other routable addresses, rendering them an effective technique to amalgamate Internet-wide, one-way unsolicited network traffic.

Although network telescope 150 (darknet) data predominantly consists of malicious packets originating from probes, backscattered packets from victims of DDOS attacks, and malware propagation attempts, it also contains misconfiguration traffic. These latter non-malicious packets frequently result from network, routing, hardware, or software faults that were erroneously directed towards a darknet. Such traffic might also be an artifact of improper configurations during dark-net deployment. Misconfiguration traffic impedes the proper functioning of cyber threat intelligence algorithms operating on darknet data, which often yields numerous undesirable false positives and false negatives and thereby wastes valuable storage resources. Given the lack of formalism in addressing this problem, the objective herein is to elaborate on a probabilistic model that is specifically tailored towards the preprocessing of darknet data by way of fingerprinting, and in turn, filtering out embedded misconfiguration traffic.

In brief, the model formulates and computes the probability metrics of misconfigured traffic, while capturing the behavioral perspective of misconfiguration flows as they target the darknet space. Regarding the natural tendencies associated with typical network flows, the model initially estimates the rarity of hosts attempting to access the destination address. Secondly, the scope of access is considered, accounting for the number of distinct darknet IP addresses that a specific remote source has accessed, preserving the unique characteristics of the misconfiguration flow. Subsequently, the joint probability is formulated, computed, and compared. If the probability of the source generating a misconfiguration flow is higher than that of the source being malicious (or unsolicited), then that particular source is deemed to be generating misconfiguration traffic, flagged, and the corresponding flows are filtered out. In the following, the notions of both rareness and scope of access are detailed.

Let $D=\{d_1, d_2, d_3, \ldots\}$ represent the set of darknet IP addresses, with $D_i$ being a subset of those accessed by source $s_i$. First, the model captures how unusual these accessed destinations are. The underlying idea in doing so stems from the fact that misconfigured sources target destinations seldom called upon by others. Thus, the model estimates the distribution of a darknet IP $d_i$ as being accessed by such a source as $$P_{misc}(d_i) = \frac{n_s(d_i)}{\sum_{\forall d_j \in D} n_s(d_i)} \qquad \text{Equation 1}$$

where $n_s(d_i)$ is the number of sources that have accessed $d_i$. A malicious darknet source, in contrast, will target a given destination at random. Typically, defining a suitable probability distribution to exemplify the randomness of a malicious source taking aim at a specific darknet destination is quite tedious; therefore, a simplistic assumption is often applied to resolve this potential headache. In this context, it has been demonstrated that sources probe their darknet targets following a Gaussian distribution. By adopting that assumption, one can model the probability of a darknet destination being accessed by a malicious source as $$P_{mal}(d_i) = \frac{1}{\sigma\sqrt{2\pi}} e^{-(x-\mu)^2/2\sigma^2}$$

where $\sigma$ is the standard deviation, $\mu$ is the mean, $\sigma^2$ is the variance, and x is the location of the darknet destination following the aforementioned distribution. Recall that not only does the model capture how unusual the accessed destinations are, but it also considers the number of darknet destinations accessed by a particular source, which is subsequently described. Given a set of $D_i$ darknet destinations accessed by a specific source $s_i$, the model ultimately measures two probability distributions, namely, $P_{misc}(D_i)$ and $P_{mal}(D_i)$; the former being the probability that $D_i$ has been generated by a misconfigured source and the latter originating from that with a malicious intent towards darknet $D_i$. For example, if the darknet addresses accessed by $S_1$ are $D_1 = \{d_{i1}, d_{i2}, d_{i3}\}$, $P(D_1)$ equates to the probability of $s_1$ accessing the specific combination of addresses $\{d_{i1}, d_{i2}, d_{i3}\}$ given three targeted destinations, multiplied by the probability of $S_1$ accessing any three destinations. In turn, $P(D_1)$ can be generalized as $$P(D_i) = P(D_i = \{d_{i1}, d_{i2}, \ldots, d_{in}\} | |D_i| = n) \times P(|D_i| = n) \qquad \text{Equation 2}$$

For both a misconfigured and malicious source, the first term of equation (2) can be modeled as $$P(D_i = \{d_{i1}, d_{i2}, \ldots, d_{in}\} | |D_i|) = \frac{1}{K} \prod_{\forall d_j \in D_i} P(d_i)$$

where K, acting as a normalization constant and solely being used as a means of summing the probabilities to 1, could be defined as $$K = \frac{|D|!}{n!(|D|-n)!} \times \frac{1}{|D|^n}.$$

K is a standard normalization constant often employed in Bayesian probability. Moreover, n encompasses all sources in the data, whereas $|D|$ represents the darknet IP space. Consequently, the likelihood that a source will target a certain number of darknet destinations (i.e., the second term of equation (2)) depends upon whether it is malicious or misconfigured. Characteristically, misconfigured sources access one or few destinations while those with malicious intent target a larger pool. Accordingly, such distributions are modelled as $$P_{misc}(|D_i|) = \frac{1}{(e-1)|D|!} \qquad \text{Equation 4}$$

$$P_{mal}(|D_i|) = \frac{1}{|D|} \qquad \text{Equation 5}$$

where the term $(e-1)$ in equation (4) ensures the distribution's summation equals 1. Equation (4) guarantees a significant decrease in the probability as the number of targeted destinations increases. In contrast, equation (5) captures that of a random number of darknet addresses being accessed by a malicious source. Thereby, via plugging in of equations (4) and (5) into (3), respectively, the probability can be represented of a source being either misconfigured or malicious, given a set of darknet destination addresses, as $$P_{misc}(D_i) = \frac{1}{K(e-1)|D|!} \prod_{\forall d_j \in D_i} P_{misc}(d_i) \qquad \text{Equation 6}$$

$$P_{mal}(D_i) = \frac{1}{K|D|} \prod_{\forall d_j \in D_i} P_{mal}(d_i) \qquad \text{Equation 7}$$

Equations (6) and (7) provide two distinct likelihood models to distinguish between misconfiguration and malicious, darknet-bound traffic, which enables their simplified and systematic post-processing. Furthermore, as the proposed model generalizes and formalizes the concepts of misconfiguration and malicious darknet traffic, it does not make any assumptions regarding the nature of the sources from which the given types of traffic are originating. Thus, the method deems a source and its corresponding flows as misconfiguration traffic if $\ln[P_{misc}(D_i)] - \ln[P_{mal}(D_i)] > 0$. To effectively employ the proposed network telescope sanitization model, pseudo-code is presented of an exemplary network telescope sanitization algorithm 600 in FIG. 6, which provides a simplistic yet effective mechanism to flag misconfigured sources.

Data Collection and Dataset Preparation

This section summarizes the methodology used to infer probing activities captured at a network telescope 150. The proposed mechanisms for feature engineering and active measurements are also detailed, in order to fingerprint IoT devices through data-driven learning.

Inferring Probing Activities

After employing the aforementioned pre-processing steps to sanitize misconfiguration traffic, the aim is to dissect the malicious traffic in order to extract probing flows as perceived by a network telescope 150 as indicators of exploitation. This is achieved through a Threshold Random Walk (TRW)-based probing detection algorithm. The TRW algorithm searches for subsequent packets from the same source IP address for a duration of, for example, 300 seconds. If the time-based threshold is exceeded without receiving a packet, the given counter is reset. If the threshold is held and the duration has not expired, the counter is incremented. If the counter reaches a threshold of, for example, 64, the flow is deemed as a probing event.

Feature Extraction for IoT Classification

Following the amalgamation of packets into flows, the first t consecutive packets are extracted from each probing event. Given that the majority of the observed scanning traffic are TCP SYN scans, the applicable features reside in the TCP and IP header fields (i.e., ToS, Total Length, Identification, TTL, Dst IP Address, srcPort, dstPort, TCP SEQ, TCP ACK SEQ, TCP offset, TCP DATA Length, TCP Reserve, TCP Flags, TCP Win, TCP URP, TCP options, Packet Inter-arrival Time). Overall, along with the inter-arrival time of the consecutive packets within a flow, a number of features, for example d=17, are gathered for each packet. In turn, the data samples for each scanner IP address would consist of a t×d matrix. To elaborate on the model's training procedure, the labeling process is subsequently detailed.

Port Scanning and Banner Grabbing

In order to annotate decidedly accurate labels for the training dataset, it was imperative to perform the procedure herein described upon detection of a scan activity to circumvent any potential complications due to the dynamic reallocation of the associated device's IP address (through DHCP, for instance). To accomplish this, an exemplary scanning tool, such as gigabit open-source Internet scanning tool ZMap, may be utilized in tandem with an exemplary high-speed application scanner, such as ZGrab, to provide the comprehensive results necessary for guaranteeing the versatility of this classification task. Specifically, in an embodiment, ZMap may be used to probe number of the ports of the probing sources' IP addresses (e.g. probing 45 ports) that were found to be active. The port list may be selected based on reports by, for example, ZoomEye during a one-month analysis of returned banners, chosen to cover most of the default ports of various devices in order to maximize the number of captured banners. Furthermore, via, for example, ZGrab, banner fields and application handshakes were obtained from various protocols such as HTTP(s), CWMP, TELNET, SMTP(s), IMAP(s), POP3(s), SSH, FTP, SMB, DNP3, MODBUS, BACNET, FOX, Siemens S7 and SSL certificates. Additionally, two custom scanning modules were designed and developed which may be used to extract RTSP and SIP banners.

Tagging and Labeling

To label discovered IoT devices, a comprehensive list of keywords related to major Internet-facing IoT devices and vendors was amalgamated. As previously noted, these are typically the devices that are most targeted by IoT botnets. This list may comprise devices provided by, for example, Nmap along with results from others such as, for example, ZoomEye Internet Scanner and ZTag, Censys's tagging module. Although it is unrealistic to claim that all IoT products were covered from every manufacturer and vendor, information from various sources was carefully leveraged and focused on widely deployed Internet devices. In addition, a parsing algorithm was implemented which extracts useful keywords from banners and SSL certificates such as the combination of letters, digits, "-" and "_" signs, which typically represent device models to enrich the list of devices. Devices running multi-purpose operating systems (Oss) as non-IoT may be further considered, which may be identified using keywords such as "Win64", "Ubuntu", "Microsoft IIS" and "CentOS", etc. Other specialized devices may be deemed as IoT where their OS types were indicated as being "embedded", "RouterOS", "FritzOS" etc. For example, "TD-W8960N" is a sample keyword in the database related to a TP-LINK router that is marked as IoT. The prepared database consists of 3,286 patterns related to 1,121 vendors in this example. Given that not all scanning events are illicit in nature (e.g., academic institutions conducting research) such entities will incorporate information into their banners. Thereby, banners are leveraged, coupled with, for example, a list from Greynoise, to filter out these benign scanners.

Model Training for Fingerprinting Compromised IoT Devices

A learning approach for the extraction of embedded features within unsolicited scan flows is described for the training of a binary classifier which distinguishes between traffic originating from both malicious IoT and non-IoT devices. The underlying methodology is based upon determining similarities in network traffic that are exclusively associated with IoT devices and their corresponding IoT malware in order to fingerprint flows originating from them. Additionally, it is known that IoT products manufactured by the same vendor possess a uniform, low-level architecture such as sharing a similar network card, operating system, etc., and happen to share the same TCP/IP stack information, including but not limited to TTL value and initial TCP window size, thus permitting the fingerprinting of IP addresses that Internet scanning services (i.e., Shodan) may have overlooked or could not identify.

To select a suitable and sound learning technique, the performance of five models was compared and contrasted to permit the classification of compromised IoT devices in order to distinguish them from compromised, multi-purpose hosts. The first three are based on Convolutional Neural Network (CNN) deep learning models. Deep learning is an emerging branch of machine learning that use multiple layers of neural networks, backpropagation, and error correction to automatically learn features (i.e., representations) from a given data input. CNN is a state-of-the-art deep learning algorithm that uses dynamic kernels along a given data input to automatically extracts (i.e., pools) features. To this end, a two-dimensional CNN (2D-CNN), a one-dimensional CNN (1D-CNN) and a multi-window one-dimensional CNN (MW-1D-CNN) were all assessed in addition to two "shallow" learning methods rooted in Random Forest (RF) models.

Figure 7:
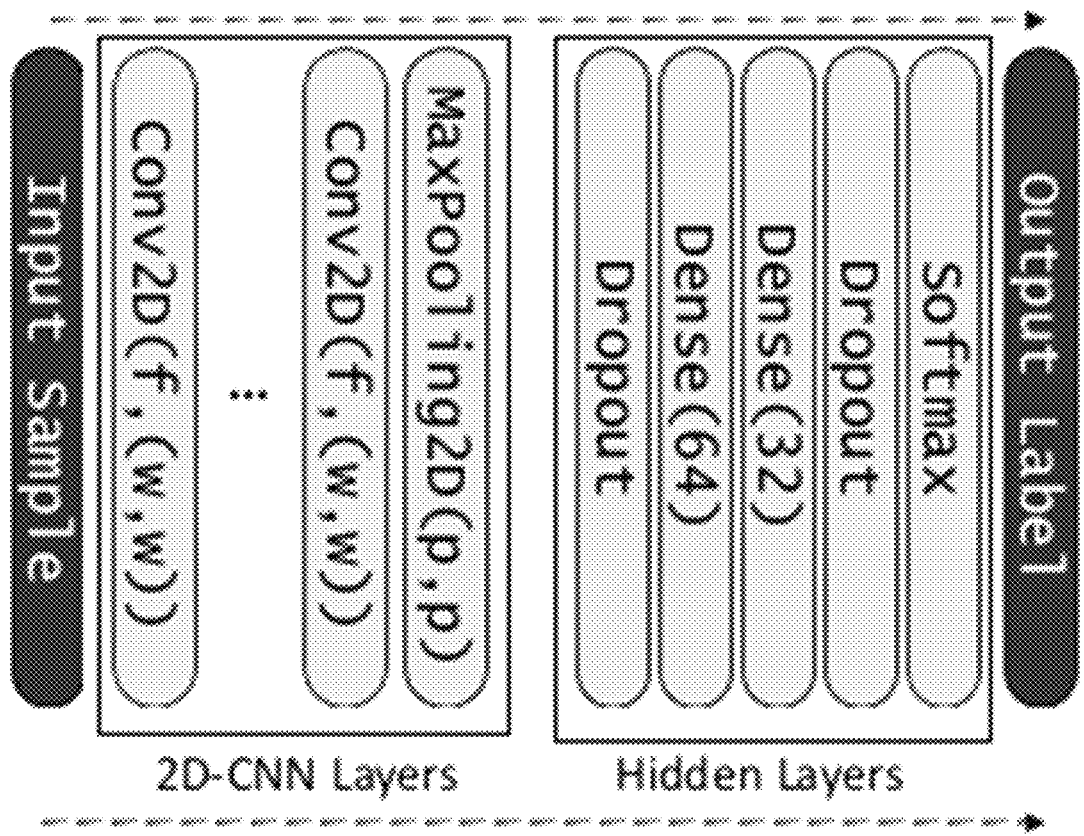
FIG. 7 illustrates a 2D-CNN model.
Figure 8:
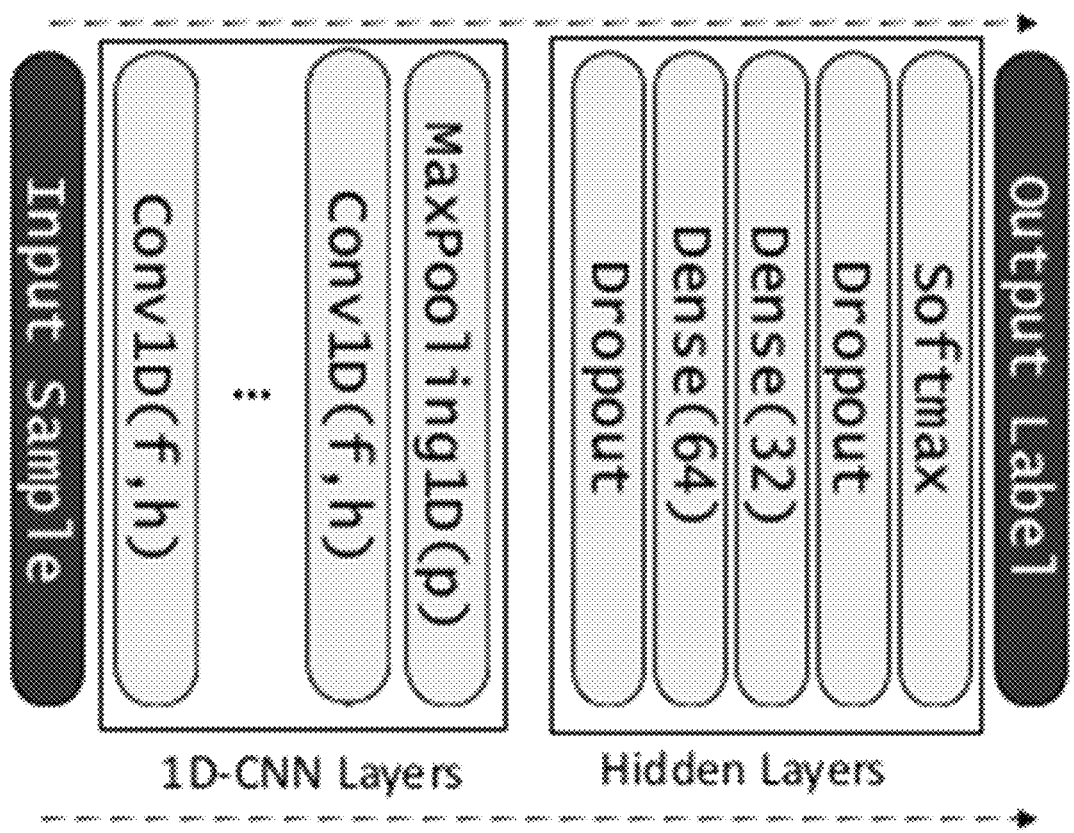
FIG. 8 illustrates a 1D-CNN model.
Figure 9:
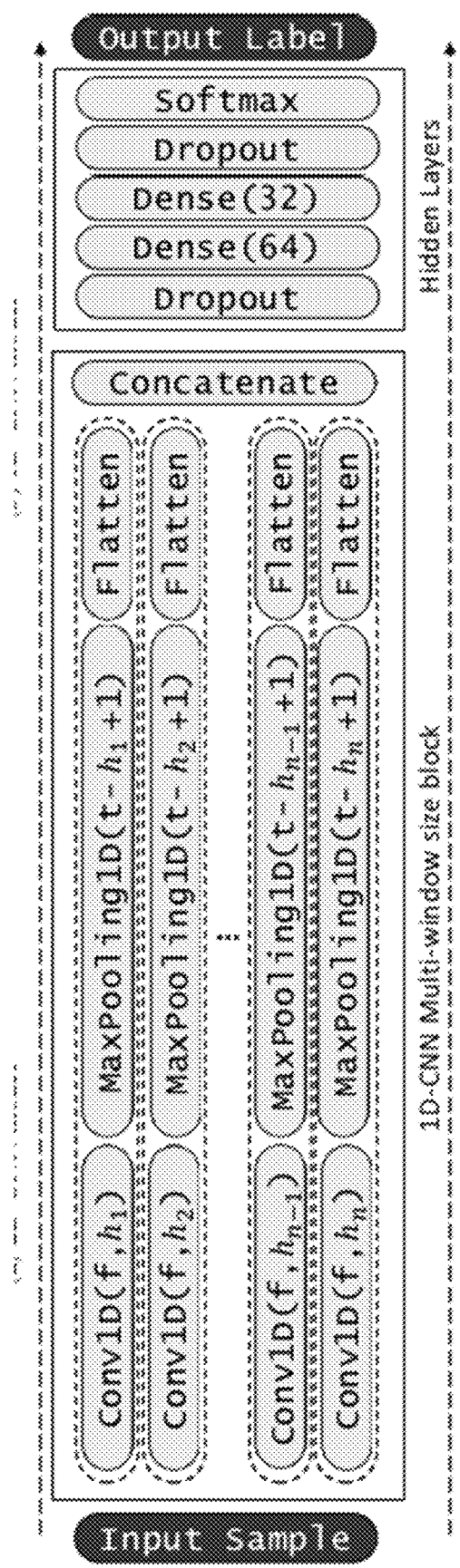
FIG. 9 illustrates a 1D-CNN multi-window model.

The discussion below is best understood in reference to FIGS. 7-9. In this context, an input sample consists of a matrix representation X of a flow with/packets and the number of extracted fields d from a packet is considered, yielding $X \in \mathbb{R}^{t \times d}$. Namely, the $i^{th}$ packet in a given flow is $x_i \in \mathbb{R}^d$. Convolution operations are also defined by applying local kernels $w \in \mathbb{R}^{h \times w}$ on the input to extract spatially local correlations in the data. In terms of the 2D-CNN model, it contains Z number of consecutive two dimensional convolutional layers (with k kernels of size w×w) and max pooling, followed by two dense hidden layers of sizes 64 and 32, respectively, and a Softmax classifier at the end (FIG. 7). The 1D-CNN model has a similar architecture to the 2D-CNN, but instead, the convolution kernels have a fixed kernel width equal to the input sample width (i.e., h×d) (FIG. 8). Further, the MW-1D-CNN model (FIG. 9) mixes the outputs of various kernel heights h to capture the features. In turn, the output of the first layer of the proposed model is given by $c_i = f(w \cdot x_{i:i+h-1} + b)$, where $x_{i:i+h-1}$ defines the notation for a sequence of packets $x_i, x_{i+1}, \ldots, x_{i+h-1}$, b representing the bias, and f denoting the non-linear activation function. The filter is applied to each 2D sample instance to produce a feature map $c=[c_1, \ldots, c_{t-h+1}]$. Subsequently, max pooling is applied over the feature map c, taking the value max c. Kernels w of different window heights h (h=[2, 4, 6, ..., $h_{max}$]) were used to enable the capture of varying dynamics specific to darknet packet flows (FIG. 9).

Two random forest (RF) models are also devised. The first was constructed based on raw packet features. The second operates on statistical features. Feature statistics, such as the 5-tuple {min, 1-quantile, median, 3-quantile, max} of each field in flows of packets, may be defined, which overall may produce, for instance, 85 features. These statistics can be considered as an estimation of the probability distribution function related to each field of the packet sequence in each flow.

IoT Botnets: Features' Extraction and Campaign Inference

Following the binary classification of IoT-generated scanning activities while filtering out non-IoT sources by employing the developed model, a thorough investigation was conducted on each individual flow's characteristics FlowIP. Such flows may be comprised of at least 500 (t≥500) sequential packets, originating from a particular unsolicited IoT device. The corresponding feature set may be extracted from aggregated flows $F_{IP}$=<$Ports_{IP}$, $\pi_{IP}$, $Flag_{IP}$, $ARR_{IP}$>. $Ports_{IP}$ is the grouping of the targeted transport protocols paired with their associated ports in ascending order (e.g., $Ports_{IPx}$={TCP:23, TCP:80, TCP:8080}). In turn, $\pi_{IP}$ is the corresponding discrete probability distribution function which represents the frequency of appearance of each of these ports within the given flow of packets (e.g., $\pi_{IPx}$=[0.15, 0.70, 0.15]). This is relevant since IoT devices typically possess a limited supply of resources. As a result, in the midst of conducting illicit scanning activities, they are often allocated to different ports and weighted based on the expected return. $Flag_{IP}$ is Boolean, holding a value 1 if the IoT device conducting the scanning has the signature tcpSeq==dstIP and 0 otherwise. This inference provides insights about a Mirai-like behavior, possibly indicating a variant or a code-reuse practice. Lastly, the Address Repetition Ratio, or $ARR_{IP}$, is the ratio of the total number of packets sent by a source IP address over the number of unique destination IP addresses, and is defined as $$ARR_{IP} = \frac{|Flow_{IP}|}{|\{dstIP|dstIP \in Flow_{IP}\}|}.$$

Such scenarios as an $ARR_{IP}$ greater than one are a consequence of the sending of multiple packets to a particular destination in order to compensate for packet loss and/or the probing of multiple ports at each destination. Note that, each instance of the same probing campaign will exhibit an equivalent $ARR_{IP}$ due to the underlying IoT orchestrated probing machinery.

Minimum number of packets (t) for robust feature estimation. To derive an accurate estimation of the discrete probability distribution π, statistical analysis is performed to compute a suitable t. By generating a lower bound on the number of packets, a minimum error of 5% within a confidence level of 0.5 can be guaranteed. Note that within the /8 network telescope, scan packets arrive with a random probability of 1/256, resembling the random sampling procedure. The population of scan packets originated by a compromised IoT device is considered, and a simple random sampling mechanism is adopted, as shown in equation (8), to derive a lower bound on the sample size (equivalently, the number of received packets within the network telescope 150). The method herein is thus used to estimate the minimum sample size necessary to find the lower bound. By leveraging the requirements of a population proportion interval, the estimation is performed at a 1–α confidence level, margin of error E and a planned proportion estimate p. By selecting more than no samples, the probability that the actual error is larger than E is assured to be not more than a small value α, i.e., Pr(|p−P|≥E)=α; where $z_{\alpha/2}$ is the 100(1−α/2) percentile of the standard normal distribution.

$$n_0 = \frac{z_{\alpha/2}^2 p(1-p)}{E^2} \quad \text{Equation 8}$$

Since the product p(1−p) increases as p moves toward 0.5, a conservative estimation of the sample size is obtained by choosing p=0.5, regardless of the actual estimated value of p. Therefore, using a 0.5 planned portion estimate, the sample size needed to achieve a 5% margin of error at a 95% confidence level is computed at 385. In this disclosure, the number of packets selected may equal 500 (≥385) to significantly minimize the risk of errors in the extracted features, namely π, to avoid subsequent issues in clustering and campaign detection.

Clustering mechanism. The IP addresses of the IoT scanners are hierarchically divided into separate groups $G_i$ based on the given $Ports_{IP}$, $Flag_{IP}$ and $ARR_{IP}$ of their feature set $F_{IP}$. Upon completion, members of each group $G_i$ are clustered to identify those scanning for the same set of ports but with a different probability distribution function π. This observation enables leveraging hierarchical agglomerative clustering, which determines the proximity matrix by calculating the distance between every pair of probability distribution functions {$\pi_{IP}$|IP∈$G_i$} based upon the Jensen-Shannon Divergence (JSD) distance metric. JSD, defined in equation 9, estimates the distance between two discrete distribution functions, and is the symmetrized version of the well-known Kullback-Leibler Divergence (KLD).

$$JSD(\pi_i \| \pi_j) = \frac{1}{2} KLD(\pi_i \| M) + \frac{1}{2} KLD(\pi_j \| M) \quad \text{Equation 9}$$

Where M=½ ($\pi_i+\pi_j$) and $$KLD(P\|Q) = -\sum_i P(i) \log \frac{Q(i)}{P(i)}$$

for discrete PDFP and Q.

Hierarchical agglomerative clustering is selected because, based on statistical analysis, the estimated π values are within the specific distance from the actual distribution (cluster centers) with high confidence. Therefore, it can correctly identify centers by merging close samples and executing a bottom-up approach. In addition, other clustering methods (such as k-means) assume equal cluster sizes which is not correct in the context of IoT campaigns, while density-based techniques (such as DBSCAN) are only suitable when the density of the data is non-uniform and the clusters can be shaped arbitrarily. As noted, hierarchical agglomerative clustering operates in a bottom-up fashion. Each observation forms its own cluster and begins moving up the distance-based hierarchy, subsequently merging with the clusters. To designate appropriate consolidation, a distance threshold (e.g. 0.05) may be used in which merging only occurs if the distance between the two given cluster centers falls beneath the distance threshold.

Empirical Evaluation

The evaluation was executed using 3.6 TB of darknet traffic that was collected throughout a 24-hour period on Dec. 13, 2018. This data is provided by the Center for Applied Internet Data Analysis (CAIDA) /8 network telescope. While this specific dataset per se cannot be shared as is, interested readers can request access to CAIDA's real-time darknet data through DHS IMPACT.

Results of the Darknet Sanitization Model

By executing the proposed model of Section 3.1, the distribution of malicious and misconfiguration traffic with respect to the number of packets was found to be 88.21% and 11.79%, while the distribution of source IP addresses was 26.17% and 73.83%, respectively, as shown in Table 7. Validation of such outcome revealed that close to 90% of the misconfiguration traffic defines packets that hit the /8 network telescope 150 only once, while the remaining appeared to be malformed packets. Further, it can be observed that even though misconfiguration traffic is relatively low (11.79%), it is responsible for a large proportion of the source IP addresses (73.83%). These findings shed more light on the problematic nature of misconfiguration traffic with regards to Internet measurements via network telescopes and emphasize the effectiveness of the proposed pre-processing model.

TABLE 7

Distribution of malicious and misconfiguration traffic in the/8 network telescope dataset

|  | Malicious | Misconfiguration |
|---|---|---|
| Traffic | 88.21% | 11.79% |
| Sources | 26.17% | 73.83% |

In terms of runtime, the implementation may rely heavily on the Linux-derived libpcap C++ library while running on an Ubuntu 18.04 system. Testing this model on a machine with a quad core Intel i7-8550 at 1.80 GHz processor and 16 GB of RAM, the developed approach processed 8 GB files containing close to 67.5 million packets with an average 636 second execution time, consuming close to 11.6 GB of RAM. Runtimes can be considerably improved by using SSD storage (since most of the delay was I/O related) and adopting multithreading.

Results of Dataset Preparation

Regarding the data collection and dataset preparation steps of Section 3.2, and by immediately scanning back about 1.7 M Internet scanners inferred through the network telescope, about 25.84% of them were found to have at least one open port. Further, amongst the total 543,392 gathered banners, the majority were HTTP (54.11%), FTP (11.10%), SSL Certificate (10.50%), TELNET (10.19%), RTSP (7.00%), and CWMP (2.60%). Between 45,184 IoT and 7,763 non-IoT devices were distinguished to generate the training dataset. At this juncture, the label and corresponding metadata were incorporated into t×d training and test data matrices of IoT and non-IoT devices. The training dataset was shuffled and then normalization was performed by way of the Min-Max method. Subsequently, the mean was computed and removed. To evaluate the proposed model, it was trained using a prepared dataset captured in November 2018 and then tested using the dataset from December 2018. The one month gap between the training and test datasets ensured that there exists no correlation between them for a sound evaluation. The test dataset consisted of 34,974 IoT and 7,193 non-IoT sources.

Evaluating the IoT Classification Models

Exemplary CNN models may be implemented in Keras. To address the problem of class imbalance within the training dataset, cost-sensitive learning was applied. The number of epochs may be 30 to avoid over-fitting. Further, a search on sub-spaces of hyper-parameters was performed as presented in Table 8, leveraging Tree-structured Parzen Estimator (TPE) in Hyperas, and selected the best model (out of 100 trials) with regards to the loss. Exemplary RF models may be implemented and trained using the scikit-learn package. The best model in this example was retrieved based upon random search (using the RandomizedSearchCV method) in the search space as summarized in Table 9. In Tables 8 and 9, parameter ranges are reported with the begin: step: end format. For evaluating these exemplary CNN models, an NVIDIA Geforce RTX 2070 GPU was used with 8 GB of memory, 2304 CUDA cores and 288 Tensor cores to accommodate for parallelization.

TABLE 8

Tuned hyperparameters of the selected CNN models

| Parameters | Space | 2D-CNN | 1D-CNN | MW-1D-CNN |
|---|---|---|---|---|
| Optimizer | SGD, Adam, RMSProp | RMSProp | RMSProp | RMSProp |
| Num. of kernels (k) | 32, 64, 128 | 32 | 128 | 64 |
| Kernel size (w × w) | (2, 2), (3, 3) | (2, 2) | — | — |
| Kernel height (h) | 2, 4, 8, 16, 32, 64 | — | 64 | — |
| Max kernel height($h_{max}$) | 40:10:80 | — | — | 80 |
| Pool size (p) | 2, 3 | 2 | 3 | — |
| Batch size | 128, 256 | 128 | 256 | 256 |
| Activations | Relu, Sigmoid, Tanh | Sigmoid | Tanh | Sigmoid |
| Dropout | U(0.1, 0.3) | 0.195 | 0.296 | 0.298 |
| learning rate | 0.001 | 0.001 | 0.001 | 0.001 |
| Num. CNN layers (L) | 1:1:4 | 4 | 3 | — |

TABLE 9

Tuned hyperparameters of the RF models

| Parameters | Space | RF on raw fields | RF on Quantiles |
|---|---|---|---|
| Num. estimators | 20:20:100 | 60 | 60 |
| Max depth | 4:4:20 | 12 | 12 |
| Min samples leaf | 2:10:102 | 52 | 52 |
| Min sample split | U(2, 10) | 6 | 4 |
| Bootstrap | True, False | False | False |
| Criterion | Gini Entropy | Entropy | Gini |

To compare the performance of the different models, standard machine learning metrics such as precision, recall, F-measure and AUC-ROC for the IoT class were used.

Precision is the ratio of correctly classified IoT devices over all the instances that have been designated as IoT using the proposed model $$\left(\text{precision} = \frac{tp}{tp+fp}\right).$$

Recall is the ratio of correctly classified IoT devices over the total number that is actually existing within the test data $$\left(\text{recall} = \frac{tp}{tp+fn}\right)$$

Recall demonstrates the model's ability to find all relevant cases within a given dataset, whereas precision gives the model's ability to designate only the actual relevant cases as relevant. In order to bring these two metrics together, often F-measure is employed which takes the weighted average of precision and recall, i.e., the harmonic mean $$\left(F \text{ measure} = 2 \cdot \frac{(\text{precision} \cdot \text{recall})}{(\text{precision} + \text{recall})}\right).$$

The Area Under the Receiver Operating Characteristic Curve (AUC-ROC) is a threshold-independent performance measurement for classification. It measures the entire two-dimensional area underneath the receiver operating characteristic (ROC) curve (i.e., true positive rate vs false positive rate at all classification thresholds) from (0,0) to (1,1).

Figure 10:
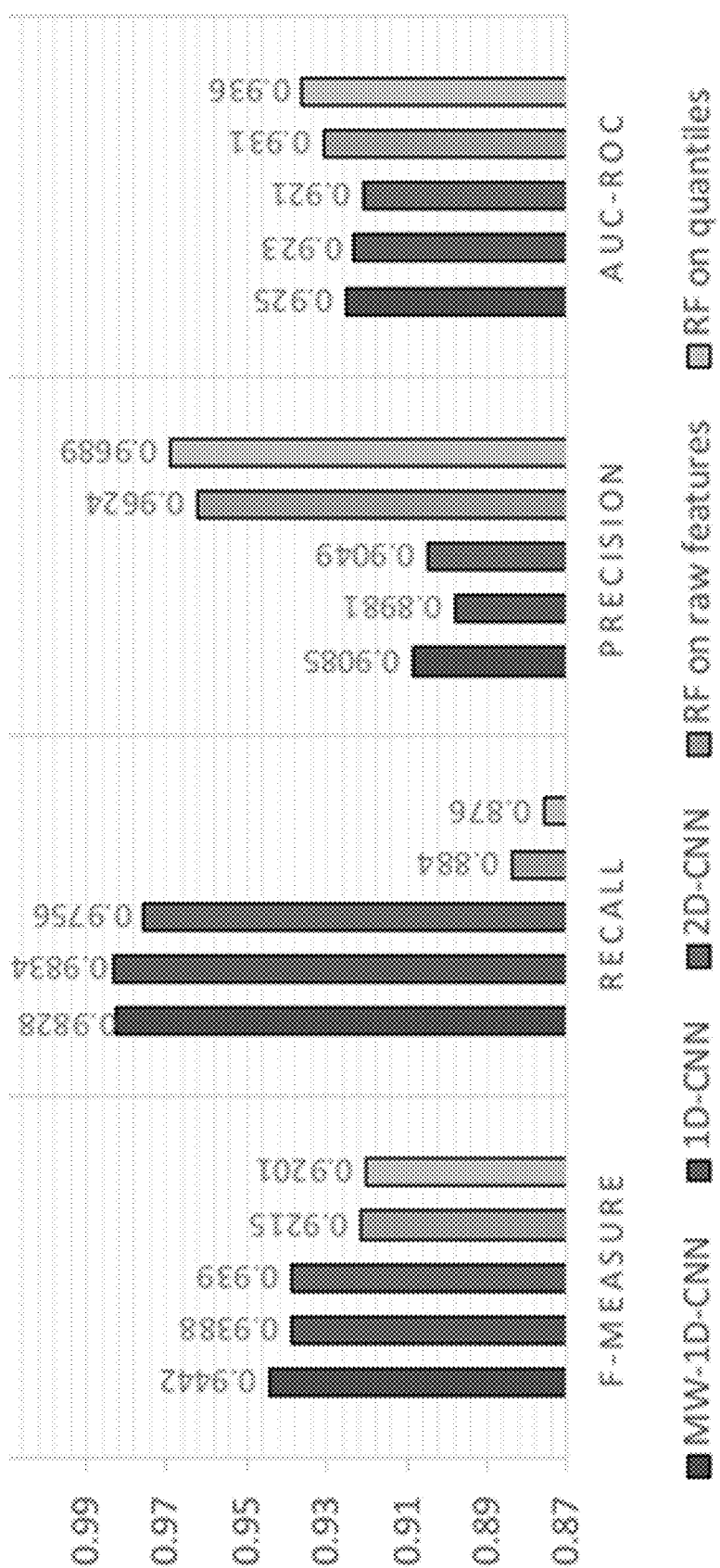
FIG. 10 illustrates performance metrics of the devised models.
Figure 11:
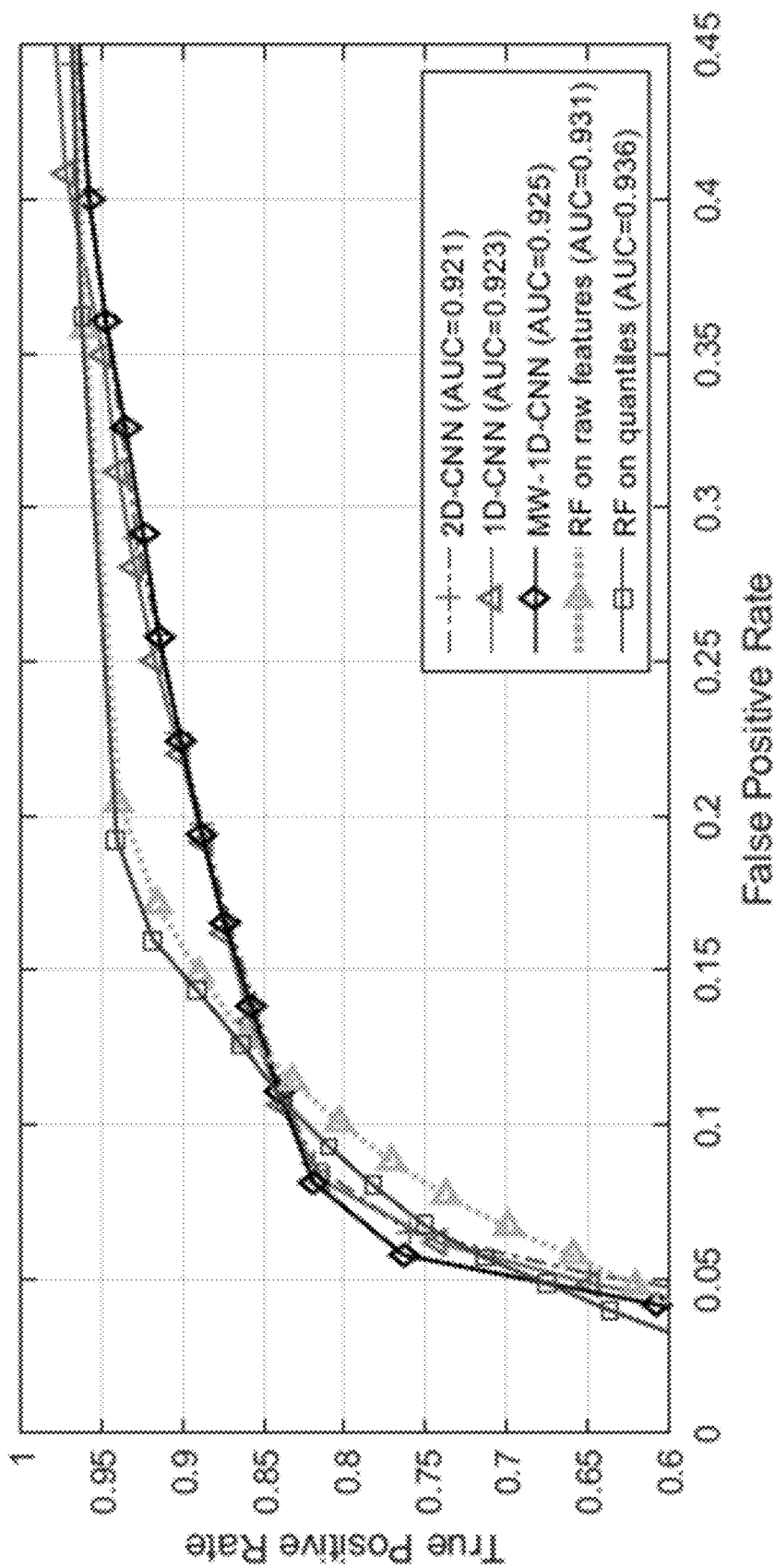
FIG. 11 illustrates AUC-ROC curves to evaluate the devised models.

The results are reported in FIGS. 10 and 11. It is of note that the AUC-ROC score for the RF model trained on quantiles is slightly higher than that of the other models. Further, both FIGS. 10 and 11 reveal that the CNN-based models result in higher recall and lower precision scores in contrast to the RF models. The outcome also shows that the multi-window 1D-CNN (MW-1D-CNN) outperforms the 1D-CNN and the 2D-CNN; this is quite expected, since packet fields (unlike image pixels) lack temporal or spatial relationships with one another. Therefore, moving the kernels over the horizontal dimension would not lead to better learning. Furthermore, the multi-window 1D-CNN can capture varying dynamics given that only a portion of the scan packets actually hit the /8 darknet.

Feature Importance

Figure 12:
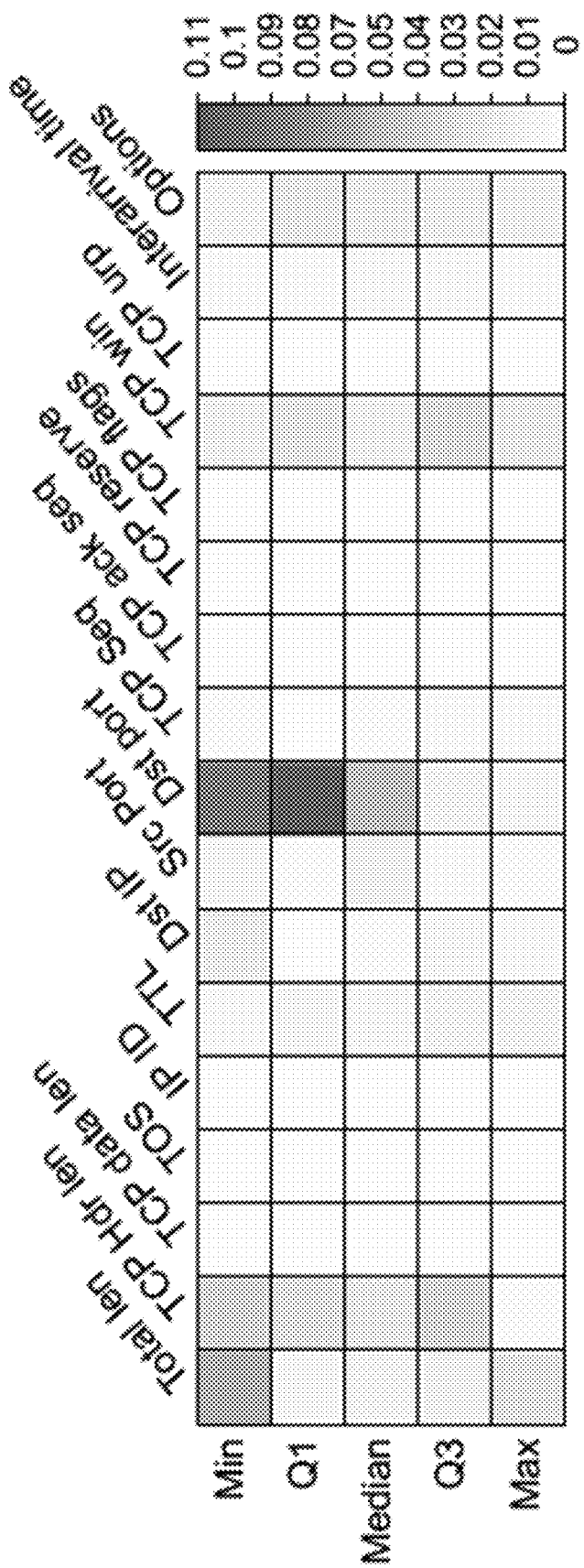
FIG. 12 illustrates ranking of the features' importance.

To shed light on which features were most decisive in the learning process, and given that the RF models performed the highest, the features' scores (derived from the RF model on quantiles) are illustrated in FIG. 12. As expected, the distribution of destination ports (Dst port) which typically reveals the scans' intentions plays the most noteworthy role for fingerprinting IoT devices. This is closely followed by other fields such as the total packet length (Total len) and the total header length (TCP Hdr len), in addition to the TCP/IP stack and OS-related fields including the TCP window size, option fields and the TTL.

Effect of Number of Packets (t) on the Classifiers

Figure 13:
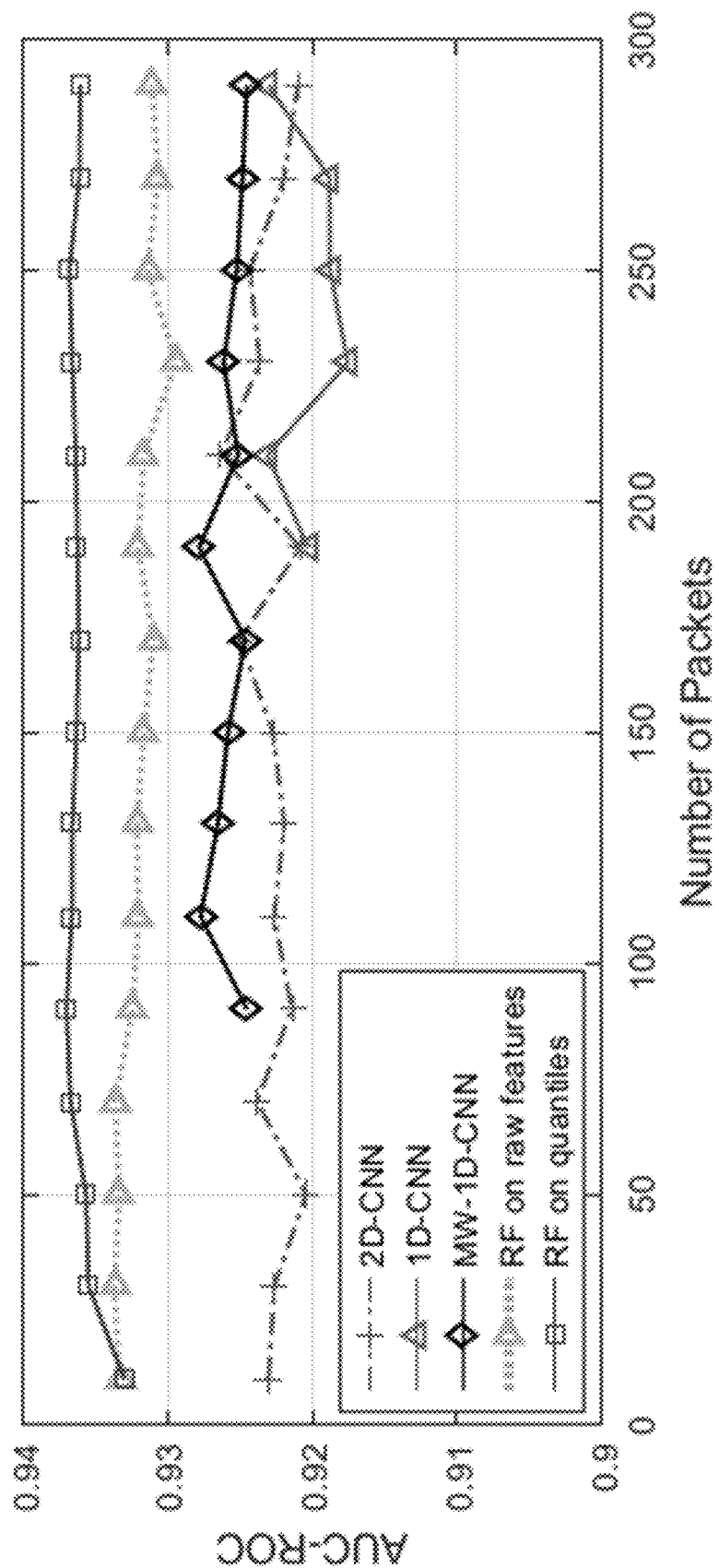
FIG. 13 illustrates the effect of packet number (t) on AUC-ROC.
Figure 14:
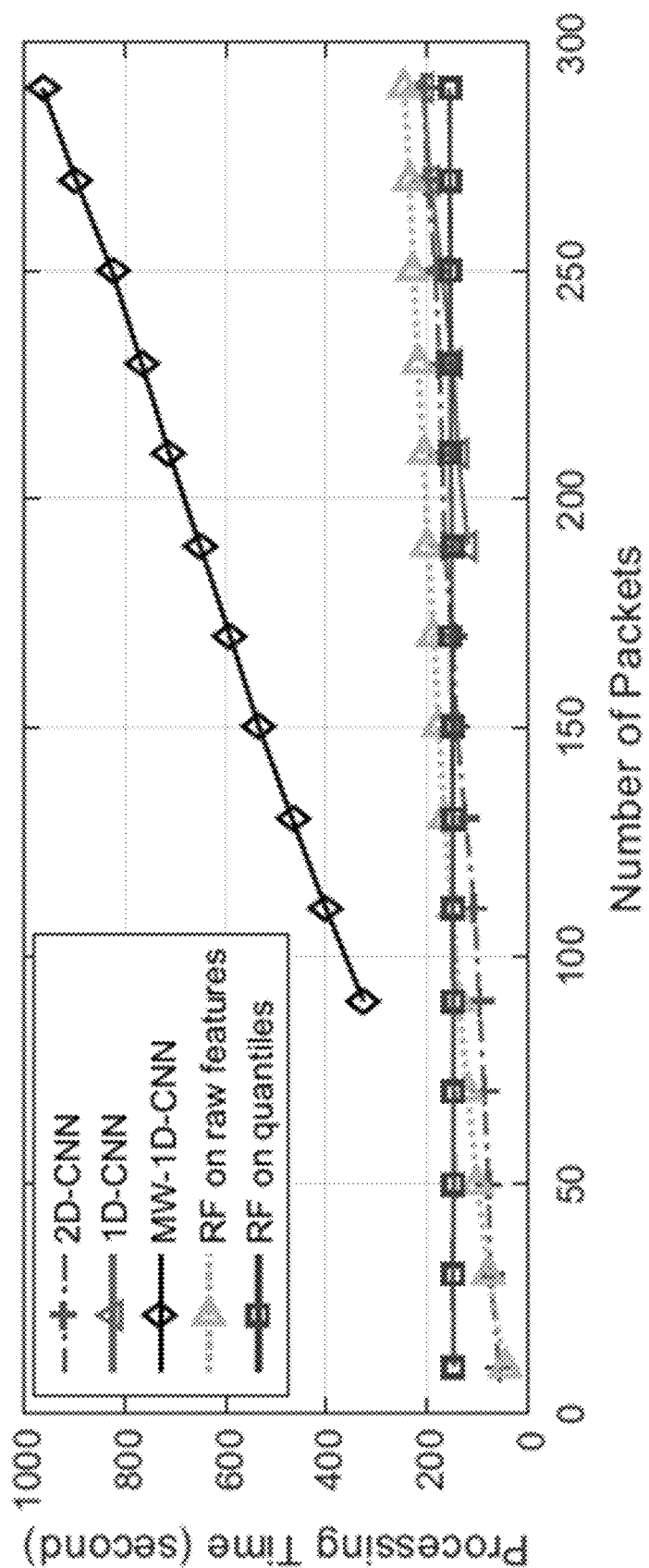
FIG. 14 illustrates the effect of packet number (t) on processing time.

FIGS. 13 and 14 illustrate the impact of the number of packets within the input sample $X \in \mathbb{R}^{t \times d}$ on the AUC-ROC and processing time (loading and training data). To quantify the effect for each value of t, the training process is executed 10 times using parameters taken from the best models, retrieved from Tables 8 and 9. Although it is expected that increasing the number of packets will increase the total amount of information to be processed, subsequently increasing a model's performance, it is not consistently proven. Reviewing the results in FIG. 13, when a RF model is trained using raw features, adding an increasing amount of packet data will eventually confuse the model, lowering the AUC-ROC of the RF model. In contrast, when a RF model is trained on quantiles, increasing the amount of input packet data actually lead to an improvement in the AUC-ROC of the model, with diminishing returns. In addition, it can be seen that changing t has no significant trending effect on the AUC-ROC of CNN-based models.

FIG. 14 reveals that an increased sample size, containing a larger number of packets, will generally increase the processing time. This observation is most evidently perceived in the MW-1D-CNN model, whose high complexity leads to a significant increase in processing time as the sample size is increased. However, an increased sample size leads to a slight decrease in processing time for a quantile-trained RF model. Ultimately, the results depict that maximum AUC is achieved, in this example, through training an RF model with t=90. Furthermore, the non-RF models have an acceptable performance and AUC value at t=90. Therefore, to facilitate future implementations and experimentation, t=90 is found to be a suitable choice for efficient and accurate classification.

Inferring and Characterizing Compromised IoT Devices and Campaigns

Given the aforementioned classification results, the MW-1D-CNN model (FIG. 9) was selected in this example since it provided the highest true positive rate while limiting the false positive rate to around 0.08 (FIG. 11). The model was further re-trained on recent data from December 2018 to accompany for any evolving dynamics.

By applying the binary classifier on 24 hours of darknet data of December 13th, the model was capable of fingerprinting 441,766 out of the 1,787,718 unique scanners to be originating from compromised IoT devices. Although previous works solely considered those with a Mirai signature as IoT-related, it was inferred that, in fact, they make up less than 25% of the IoT scanner population that the proposed model was able to uncover, leaving a whopping 75% to go about their malicious activities without any semblance of an adequate attribution.

TABLE 10

Top countries hosting infected IOT devices

| Country | (%) |
| --- | --- |
| Brazil | 41.93 |
| Iran | 10.17 |
| China | 5.14 |
| Russian | 3.59 |
| Egypt | 3.36 |
| India | 2.47 |
| Turkey | 2.32 |
| Taiwan | 2.13 |
| Vietnam | 1.91 |
| Argentina | 1.83 |
| Greece | 1.70 |
| Italy | 1.60 |
| United States | 1.42 |
| Indonesia | 1.25 |
| Mexico | 1.24 |
| Ukraine | 1.21 |
| Korea (south) | 1.07 |
| United Kingdom | 0.83 |
| Thailand | 0.72 |
| Spain | 0.66 |

Table 10 summarizes the location of these exploited devices, where Brazil (41.93%) was found to be hosting a significant portion, followed by Iran (10.17%), China (5.14%), Russia (3.59%), Egypt (3.36%), India (2.47%) and Turkey (2.32%).

Furthermore, the top three ISPs hosting the largest number of compromised IoT devices were Vivo (134, 021), TE Data (11, 804) and Iran Telecom Co. (9, 912).

While the extensive presence of IoT scanners alone gives pause for concern, a relatively significant proportion residing within the telecommunication and ISP sectors is rather expected as shown in Table 11; conversely, their existence within sectors including but not limited to critical sectors is quite alarming. In Table 11, critical sectors which appear in lists provided by the U.S. Department of Homeland Security (DHS) and the European Union (EU) are highlighted in bold. Amongst the inferred instances, quite a few were found to be located within that of medical infrastructures (87), government entities (86), manufacturing realms (99), and commercial businesses (38).

Routers (53.64%) and IP Camera/DVRs (28.93%) continue to be the most frequently infected devices.

Moreover, the most commonly targeted ports based upon the number of scanning packets generated by the compromised IoT devices are reported in Table 12. The top targeted ports include 23 (41.9%), 80 (23.9%), 8080 (19.7%), 5555 (4.9%), 81 (3.2%), 2323 (1.7%) and 22 (1.3%). Intriguingly, the presence of non-IoT targeted ports such as 2480 (OrientDB), 5984 (CouchDB), 3389 (RDP), 7001 (Oracle), 5900 (VNC) and 2004 (Drupal), as well as that of uncommonly used IoT ports 32764 (router backdoor), 37215 (UPnP in SOHO routers) and 52869 (UPnP in wireless chipsets) were identified. Set {23, 80, 8080} is the most prevalent target port combination; 54% of devices actually only scan this port combination.

TABLE 12

TCP port distribution determined by quantifying the number of compromised IoT scan packets received by each included port. Bold text (other than for column titles) highlight unconventional, rarely probed ports and services

| Port | Service | (%) | Port | Service | (%) | Port | Service | (%) |
|---|---|---|---|---|---|---|---|---|
| 23 | Telnet | 41.912 | 8181 | HTTP-alt | 0.114 | 83 | HTTP-alt | 0.028 |
| 80 | HTTP | 23.917 | 88 | HTTP-alt | 0.057 | 443 | HTTPS | 0.025 |
| 8080 | HTTP-alt | 19.784 | 21 | FTP | 0.056 | 3389 | RDP | 0.023 |
| 5555 | ADB | 4.995 | 7547 | TR-064 | 0.053 | 8090 | HTTP-alt | 0.018 |
| 81 | HTTP-alt | 3.288 | 8081 | HTTP-alt | 0.050 | 8089 | HTTP-alt | 0.018 |
| 2323 | Telnet-alt | 1.705 | 8888 | HTTP-alt | 0.047 | 139 | SMB | 0.006 |
| 22 | SSH | 1.391 | 37215 | UPnP | 0.045 | 7001 | WebLogic | 0.005 |
| 9000 | MCTP | 0.470 | 2480 | OrientDB | 0.041 | 52869 | UPnP | 0.005 |
| 445 | SMB | 0.315 | 5984 | CouchDB | 0.040 | 8291 | Winbox | 0.004 |
| 5358 | Telnet | 0.238 | 82 | HTTP-alt | 0.029 | 1433 | MS-SQL | 0.004 |
| 8000 | HTTP-alt | 0.197 | 8001 | HTTP-alt | 0.029 | 5900 | VNC | 0.003 |
| 2222 | SSH | 0.165 | 8088 | HTTP-alt | 0.028 | 2004 | Drupal | 0.003 |
| 8443 | HTTP | 0.121 | 84 | HTTP-alt | 0.028 | 1900 | UPnP | 0.002 |
| 32764 | Linksys Vuln. | 0.117 | 85 | HTTP-alt | 0.028 | Other | — | 0.596 |

TABLE 11

Top Sectors hosting infected IoT devices

| Sector | Count |
|---|---|
| Telecommunications | 175,642 |
| Internet Service Provider | 82,238 |
| Private Service | 1,319 |
| Internet Hosting Services | 780 |
| Education | 485 |
| Internet Colocation Services | 314 |
| Data Services | 99 |
| Health | 87 |
| Government | 86 |
| Manufacturing | 74 |
| Finance | 57 |
| Lodging | 44 |
| Professional Service | 38 |
| Transportation | 29 |

Along those lines, a lengthy list of 50 identified vendors reveals a broad range of manufactures and device types that IoT botnets demonstrate preference for exploitation. Amongst them, MikroTik (14,090), Aposonic (2,222), Huawei (732), Foscam (594) and Hikvision (417) are the topmost five targeted by the tagged compromised devices.

Inferring and reporting on orchestrated IoT botnets. Among the 441,766 IoT scanners that were detected on Dec. 13, 2018, based on the results noted above, those that sent fewer than 500 packets were filtered out to exclude any of those that can degrade the estimation of the probability distribution function $\pi$.

Subsequently, the exemplary respective features were extracted and the exemplary clustering method described above was executed. In roughly 40,000 scan flows, less than 0.01% of packets were witnessed in each scan flow arriving at specific UDP ports (e.g., 5998, 43922, 48715, 31869 etc.). After analyzing such occurrences, it was deduced they resulted from associated bugs or attacks on P2P networks such as BitTorrent; an observation that is also consistent with other works. As a result, in order to avoid the ill-effects of uncorrelated incidents, the identified packets were removed prior to clustering. Regarding the inferred campaigns, the proposed approach detected over 350 orchestrated IoT botnets. Since the size of each IoT probing campaign translates to its given severity, those botnets possessing more than 300 coordinated IoT bots are summarized in Table 13 in order by campaign ID number. Interestingly, in solely considering IoT scanners that targeted the set of ports {23, 80, 8080}, 30 distinct botnets with differing distributions, Flag (i.e., Mirai-like signature/behavior), and ARR, were detected.

TABLE 13

Orchestrated IoT botnets in the wild

| ID | Ports | Flag | ARR | # Bots $\pi$ | Crypto-Miners | Compromised Devices |
|---|---|---|---|---|---|---|
| 1 | 23, 80, 8080 | | 1 | 139,858 [0.33 0.33 0.34] | Coinhive, xmrMiner | MikroTik, Hikvision, Foscam, Vivotek, Huawei, Aposonic, Intelbras, Ubiquiti, Netgear, Mitrastar, Askey, Archer |
| 2 | 23, 80, 8080 | | 1 | 55,139 [0.294 0.295 0.411] | Coinhive, xmrMiner | MikroTik, Hikvision, Intelbras, TP-LINK, D-Link, Huawei, ZTE, Foscam, QNAP, ZyXEL, Cisco, SERCOMM, Vivotek |
| 3 | 23, 2323 | ✓ | 1 | 36,464 [0.90.1] | Coinhive | Huawei, Aposonic, Foscam, Hikvision, Mikrotik, Cisco, TP-LINK, CIG Shanghai, ZTE, Ubiquiti |
| 4 | 80 | ✓ | 1 | 12,895 [1.] | Coinhive, xmrMiner | Huawei, Hikvision, MikroTik, AvTech, ZTE, Foscam, Cisco, Ubiquiti, NUUO |
| 5 | 5555 | ✓ | 1 | 11,050 [1.] | xmrMiner | Huawei, TP-Link, Hikvision, Aposonic, Fos-cam , MikroTik, Sagemcom, iGate, VNPT, Trendchip |
| 6 | 23, 81 | | 1 | 9,805 [0.495 0.505] | xmrMiner | Aposonic, Foscam, Huawei, Hikvision, ZTE, Lilin, Sagemcom, Netgear |
| 7 | 23, 80, 8080 | | 2 | 7,610 [0.171 0.650 0.179] | Coinhive, xmrMiner | MikroTik, TP-LINK, Hikvision, AvTech, Fos-cam, D-Link |
| 8 | 23 | ✓ | 1 | 7,200 [1.] | Coinhive, xmrMiner | Huawei, Hikvision, TP-Link, AvTech, TP-LINK, Aposonic, ZEM800, ZTE |
| 9 | 23, 80, 8080 | | 1 | 5,971 [0.242 0.244 0.514] | xmrMiner | MikroTik, ZTE, Hikvision, TP-LINK, Foscam |
| 10 | 23 | | 3 | 5,491 [1.] | | DZS, Foscam, MikroTik, Synology, ZyXEL, Hikvision |
| 11 | 80, 8080 | | 1 | 5,162 [0.492 0.508] | Coinhive, xmrMiner | MikroTik, Foscam, Hikvision, Huawei, TP-LINK, Ubiquiti |
| 12 | 23 | | 1 | 4,689 [1.] | Coinhive | D-LINK, Hikvision, Aposonic, MikroTik, Broadcom, ASUS, AVM, Netgear |
| 13 | 23, 80, 8080 | | 1 | 4,468 [0.442 0.032 0.526] | Coinhive, xmrMiner | MikroTik, TP-LINK, Hikvision, D-Link |
| 14 | 23 | | 4 | 3,911 [1.] | | GPON (DZS), Hikvision, Huawei, MikroTik, Dasan, Foscam, Mercusys |
| 15 | 22, 2222 | ✓ | 1 | 3,783 [0.897 0.103] | Coinhive, xmrMiner | QNAP, Huawei, Hikvision, ASUS, Foscam, SERCOMM, MikroTik, Intelbras, Ubiquiti |
| 16 | 23, 2323, 5555 | ✓ | 1 | 3,545 [0.249 0.032 0.719] | xmrMiner | Zy XEL, MikroTik, Avtech. Broadcom, Fos-cam, TP-LINK, Hikvision, D-Link |
| 17 | 23, 2323 | ✓ | 1 | 2,727 [0.967 0.033] | Coinhive | Huawei, ZTE, Hikvision, MikroTik, Aposonic, ZEM800, Foscam |
| 18 | 23 | | 2 | 2,146 [1.] | | TP-LINK, Hikvision |
| 19 | 23, 32764, 80, 8000, 8080, 8081, 8089, 8090, 81, 8181, 8443, 8888, 9000 | ✓ | 1 | 2,140 [0.034 0.122 0.153 0.02 0.154 0.02 0.019 0.02 0.068 0.123 0.122 0.022 0.121] | | NUUO, Foscam, Hikvision, Huawei, AVM, MikroTik, Aposonic |
| 20 | 23, 8080 | | 1 | 1,591 [0.48 0.52] | Coinhive, xmrMiner | MikroTik, Hikvision, D-Link, TP-LINK |
| 21 | 23, 80, 8080 | | 1 | 1,286 [0.384 0.319 0.298] | Coinhive, xmrMiner | MikroTik, SERCOMM, Foscam |
| 22 | 80, 8080 + rnd | | 1 | 1,247 [0.45 0.45] | | MikroTik |
| 23 | 23, 81 | | 1 | 1,191 [0.095 0.905] | | Aposonic, Foscam, Hikvision |
| 24 | 23, 80, 8080 | | 1 | 1,083 [0.226 0.5 0.274] | Coinhive, xmrMiner | MikroTik, D-Link, Foscam, Aposonic |
| 25 | 23, 5358 | | 1 | 1,059 [0.5 0.5] | | Hikvision, Foscam, Intelbras |
| 26 | 23, 2480, 5555, 5984, 80, 8080 + rnd | ✓ | 1 | 783 [0.126 0.120 0.134 0.121 0.128 0.1211 | | Foscam, Huawei, Aposonic, Hikvision |
| 27 | 80, 8080 | | 3 | 756 [0.814 0.186] | xmrMiner | MikroTik, TP-LINK |
| 28 | 443, 80, 8000, 8001, 8080, 8081, 8088, 81, 82, 83, 84, 85, 88, 8888 | ✓ | 1 | 723 [0.071 0.071 0.071 0.071 0.071 0.071 0.071 0.072 0.072 0.072 0.071 0.072 0.071 0.072] | | Synology, Hikvision |

TABLE 13-continued

Orchestrated IoT botnets in the wild

| ID | Ports | Flag | ARR | # Bots | π | Crypto-Miners | Compromised Devices |
|---|---|---|---|---|---|---|---|
| 29 | 23, 2323 | ✓ | 1 | 691 | [0.794 0.206] | | Huawei, Aposonic, Hikvision |
| 30 | 23, 9000 | | 1 | 677 | [0.49 0.51] | | Sagemcom, SERCOMM, Hikvision, Cisco, Huawei, Aposonic, AVM, Mikrotik, Foscam |
| 31 | 23 | | 5 | 642 | [1.] | | ZTE, Hikvision, Foscam, MikroTik, Netgear |
| 32 | 80 | | 1 | 616 | [1.] | Coinhive, xmrMiner | MikroTik, Hikvision, Huawei |
| 33 | 23, 80, 8080 | | 1 | 544 | [0.15 0.3 0.55] | xmrMiner | MikroTik, Huawei, ZTE, Hikvision, Vivotek, Foscam, Aposonic |
| 34 | 23, 81 | | 1 | 541 | [0.291 0.709] | | Aposonic, Huawei, Hikvision, Foscam, TP-LINK" |
| 35 | 23, 445, 80, 8080 | | 1 | 376 | [0.3142 0.0587 0.3155 0.3115] | Coinhive, xmrMiner | MikroTik, Aposonic |
| 36 | 23, 7547, 80, 8080, 8291 | | 1 | 340 | [0.334 0.002 0.33 0.331 0.002] | Coinhive, xmrMiner | MikroTik, Hikvision |

Figure 15:
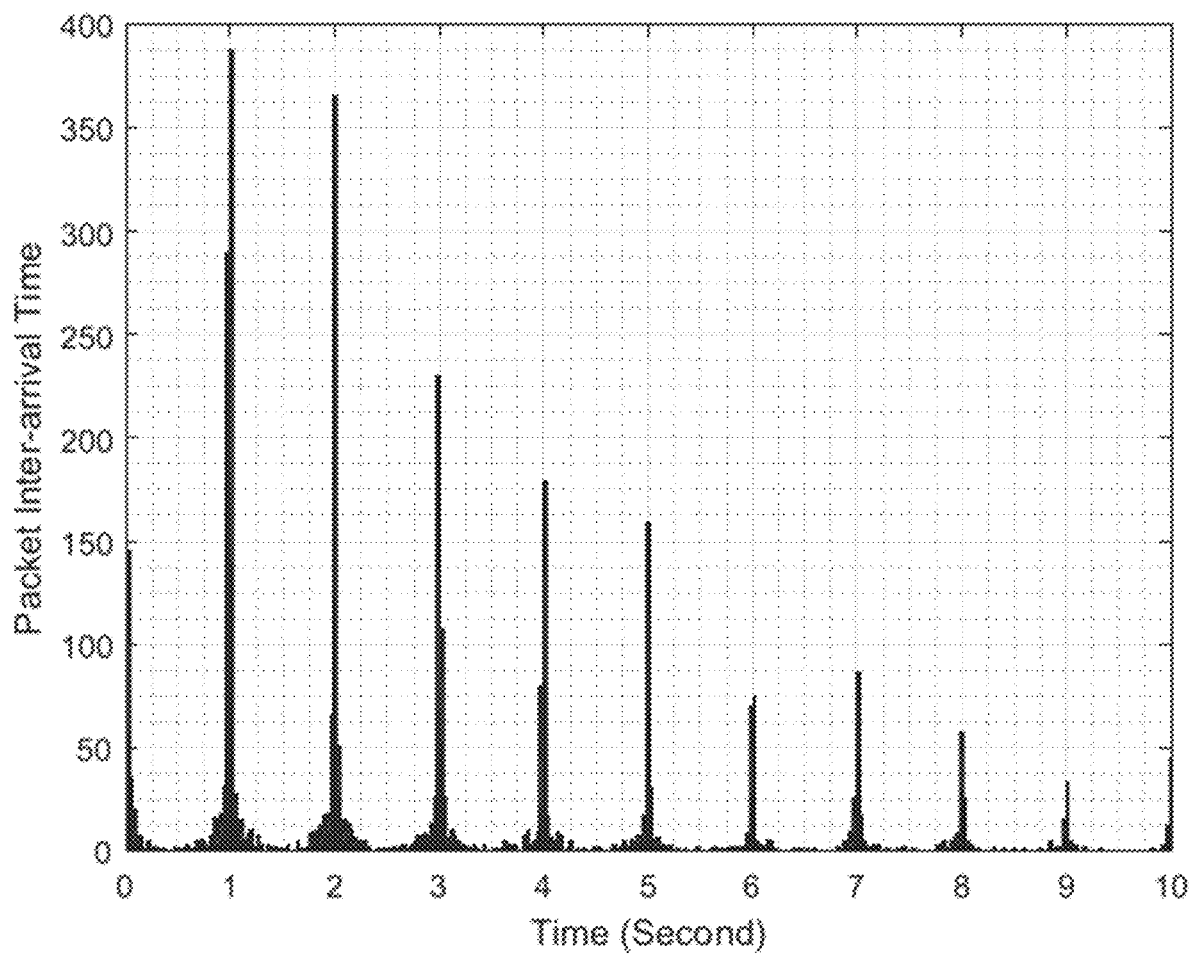
FIG. 15 illustrates a sample histogram of class 1. Originated from an IoT device in campaign 6.
Figure 16:
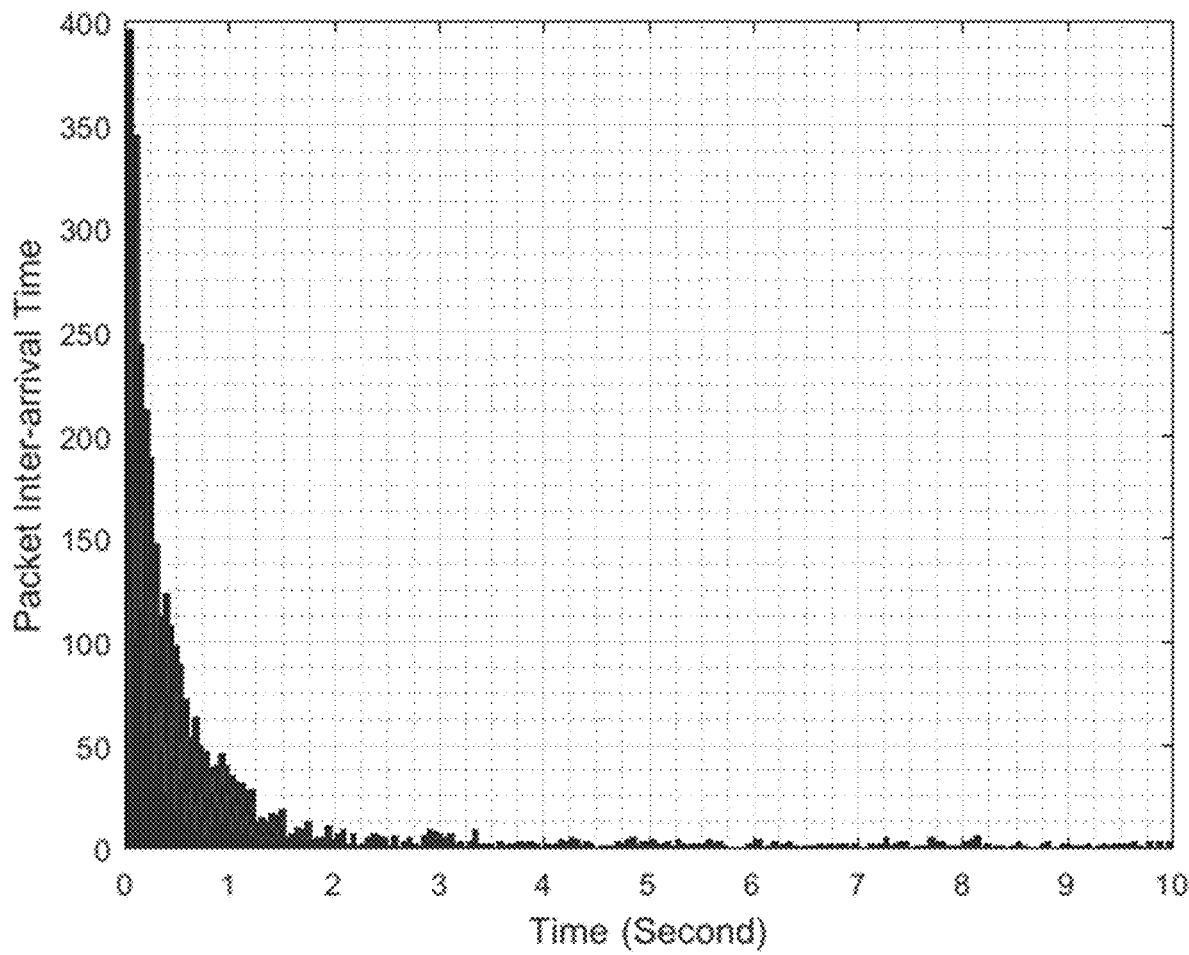
FIG. 16 illustrates a sample histogram of class 2. Originated from an IoT device in campaign 4.
Figure 17:
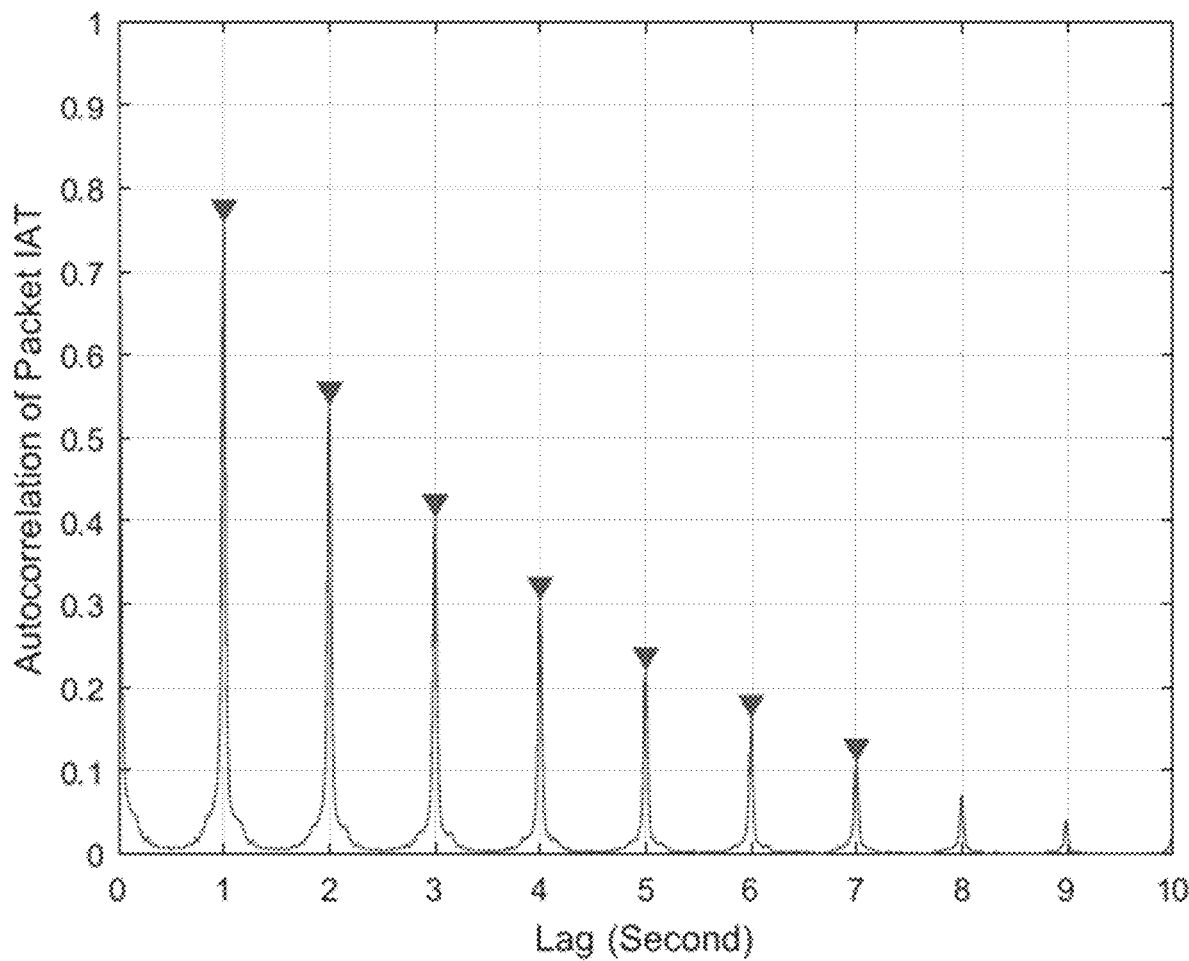
FIG. 17 illustrates the autocorrelation of the histogram of class 1, campaign 6.
Figure 18:
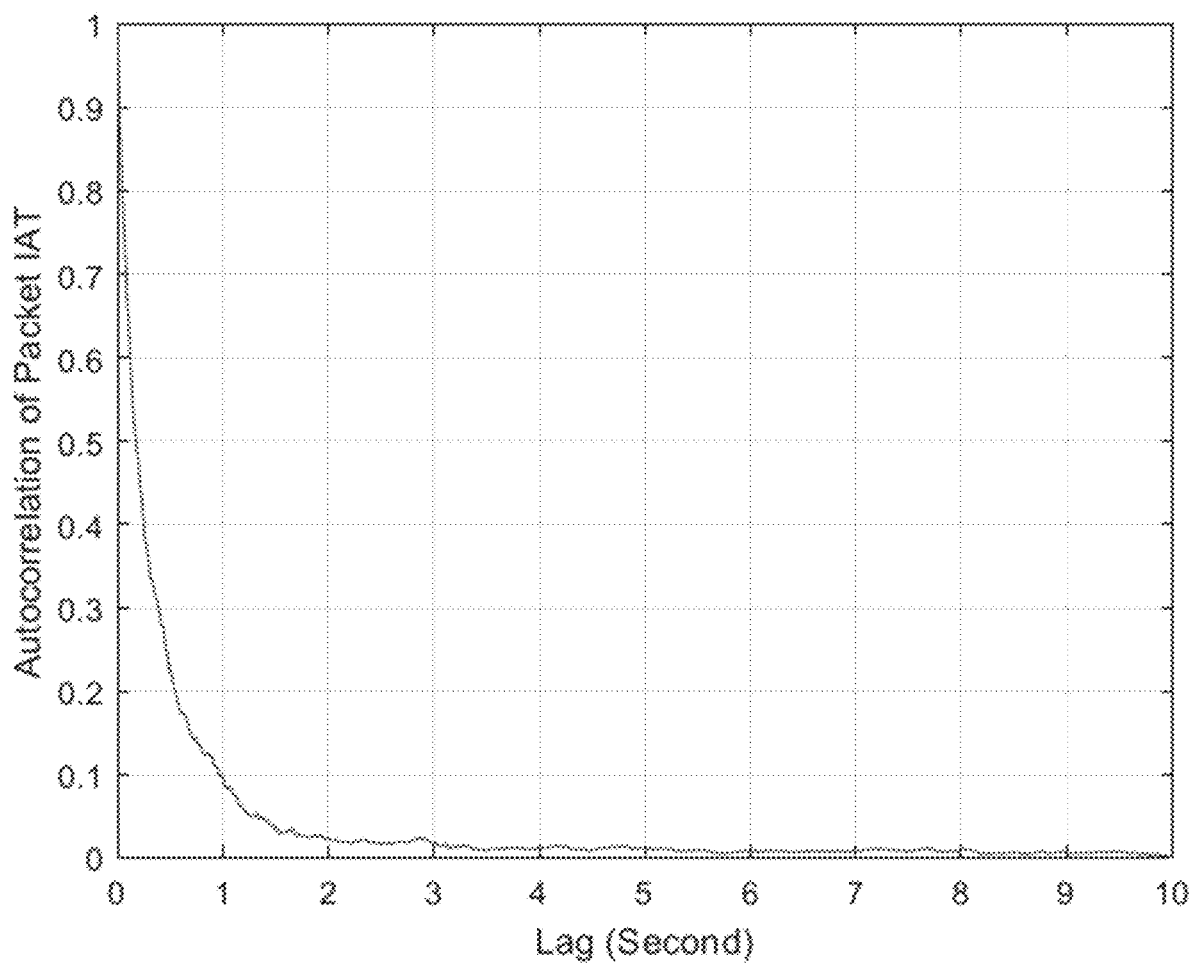
FIG. 18 illustrates the autocorrelation on the histogram of class 2, campaign 4.
Figure 19:
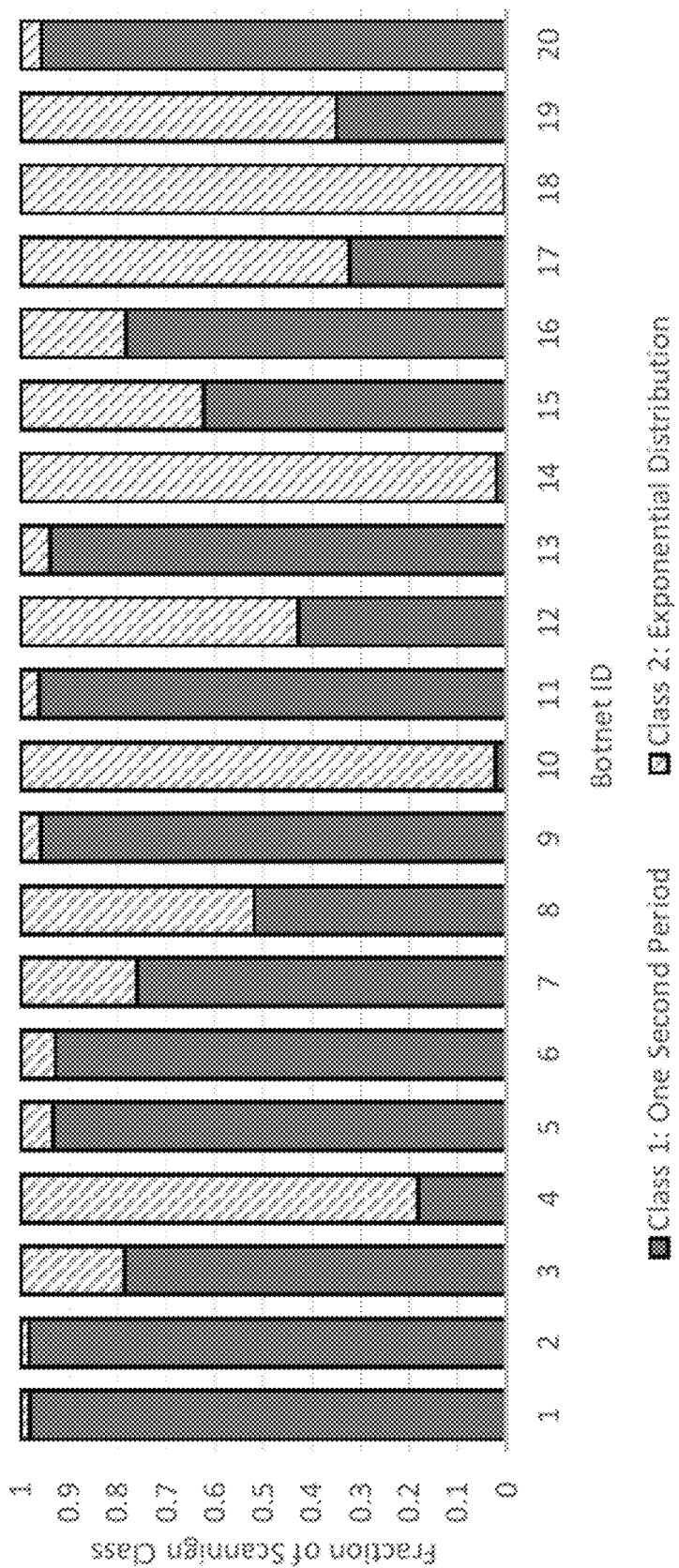
FIG. 19 illustrates the fraction of the derived scanning practices within the top populated campaigns.

Packet inter-arrival time analysis generated from the inferred botnets. Following the investigation of scan-based behaviors of the inferred compromised IoT devices, two separate classes of unique scan traits were deduced. Class 1 includes devices that present periodic behavior in the time series of their packet Inter-Arrival Time (IAT). For rate limiting purposes, such devices seem to generate a fixed number of packets then wait exactly 1 second to re-confirm their desired scanning rate (in packets per second (pps)). This leads to high peaks in their histograms of packet IATs as seen in FIG. 15. In contrast, the members of the Class 2 do not portray any related periodic behavior when analyzing their packet IAT. FIG. 16 portrays the IAT of the packets generated by the IoT devices of Class 2, demonstrating an exponential distribution. To detect the aforementioned behaviors, the histogram of packet IATs is first calculated and then the peaks with an auto-correlation coefficient are identified (FIGS. 17 and 18). To reveal the population of such inferred classes in the context of the identified probing campaigns, FIG. 19 illustrates the fraction of scanning classes in each campaign.

Figure 20:
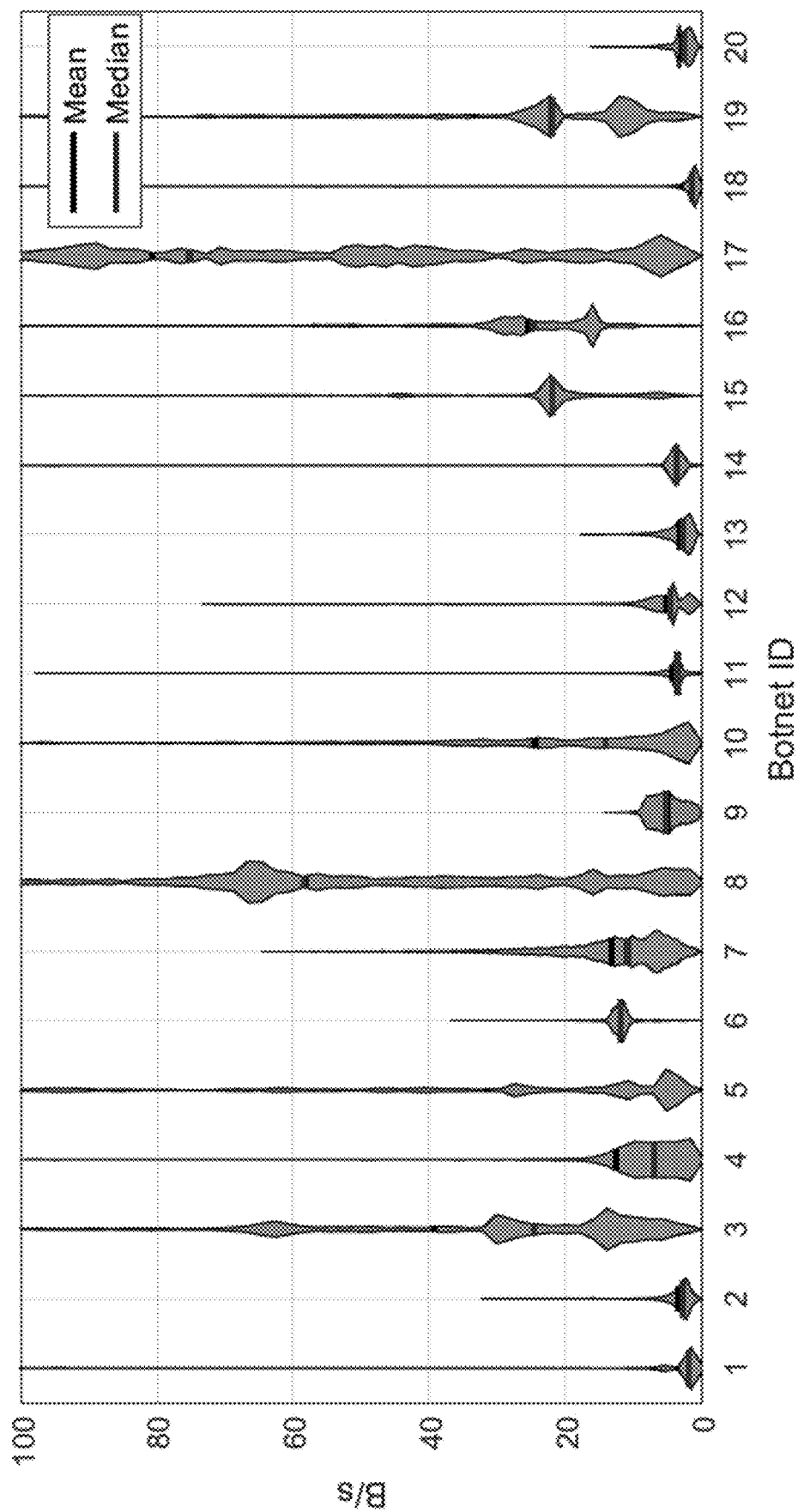
FIG. 20 depicts a Violin illustration of the top 20 populated campaigns' scanning rated as observed on the /8 network telescope.

Scan rate analysis of the inferred IoT botnets. FIG. 20 presents the distribution of scanning rates extracted from the inferred IoT botnets, as perceived by the network telescope 150. Campaigns in which their scan rates follow a normal distribution with a single peak and a narrow width (such as #1, #2, #6, #11, #14, #15, #18 and #20 of Table 13) were found to be exhibiting strong rate limiting policies regardless of their identified scanning class. In contrast, the rates of botnets #3, #8 and #17 are distributed over a wider range, showing no artificial rate limiting behaviors. In fact, this inference matches the released source code of the Mirai malware (which botnet #3 is attributed to), demonstrating the lack of rate limiting practices. For classes that were discovered to have no artificial rate limiting usages, each individually-compromised device sent a maximized number of scan packets based on their processing power and throughput. By focusing on the scanning rates' distributions of the inferred campaigns coupled with their population of scanning classes (FIG. 19), some facts can be deduced about the purity of the clustered campaigns. This enabled further scrutiny of such campaigns to determine if they contain a singular or multiple botnets. Note that IAT-related features were not included during the clustering mechanism of a previous section. With this in mind, the identified campaigns looking for Class 1 scan traits (those employing rate limiting practices) were further examined while their rates' distributions showing negative outcomes related to following a single normal distribution. The outcome, for instance, showed that although botnet #5 was identified as possessing Class 1 scan traits, its distribution of scanning rate shows 3 distinct peaks. Therefore, it is postulated that there may be three unique botnets that were misidentified within a single cluster. Nevertheless, this misidentification of multiple botnets in a single campaign is expected for campaigns with a single target port (and eventually π=[1]), similar to campaign #5.

Figure 21:
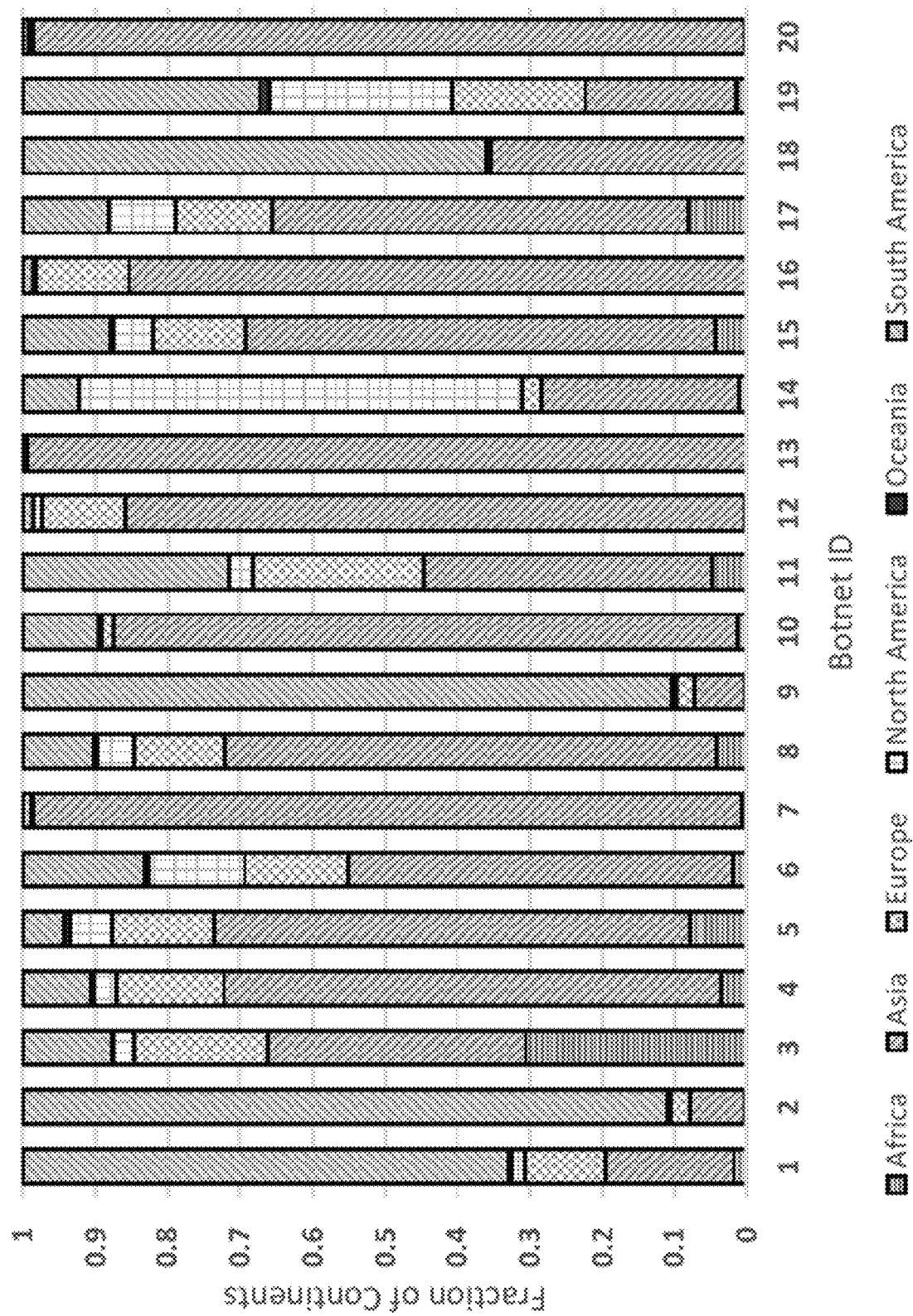
FIG. 21 illustrates the geo-distribution of the top 20 populated campaigns over different continents.
Figure 22:
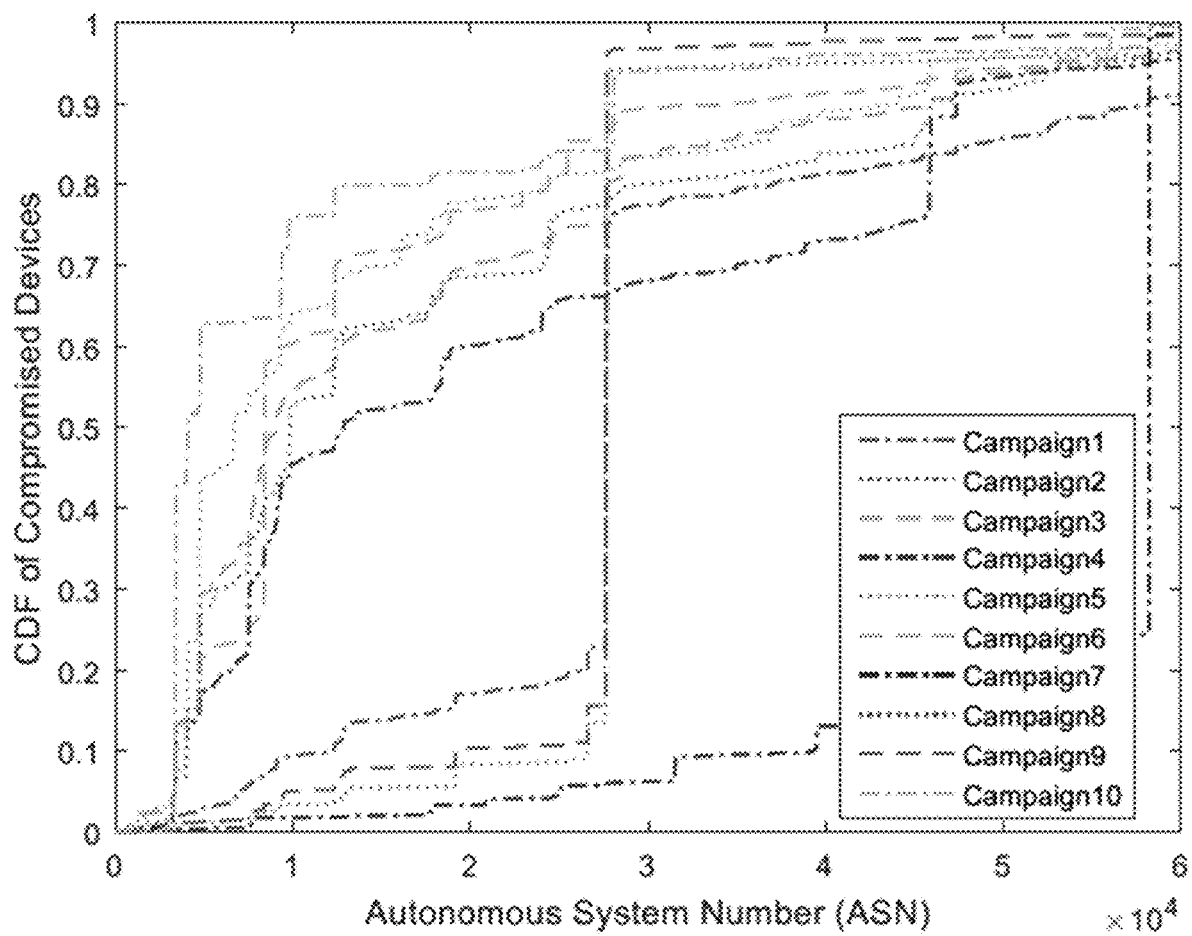
FIG. 22 illustrates the cumulative distribution of the populated campaigns 1-10 over different Autonomous Systems.
Figure 23:
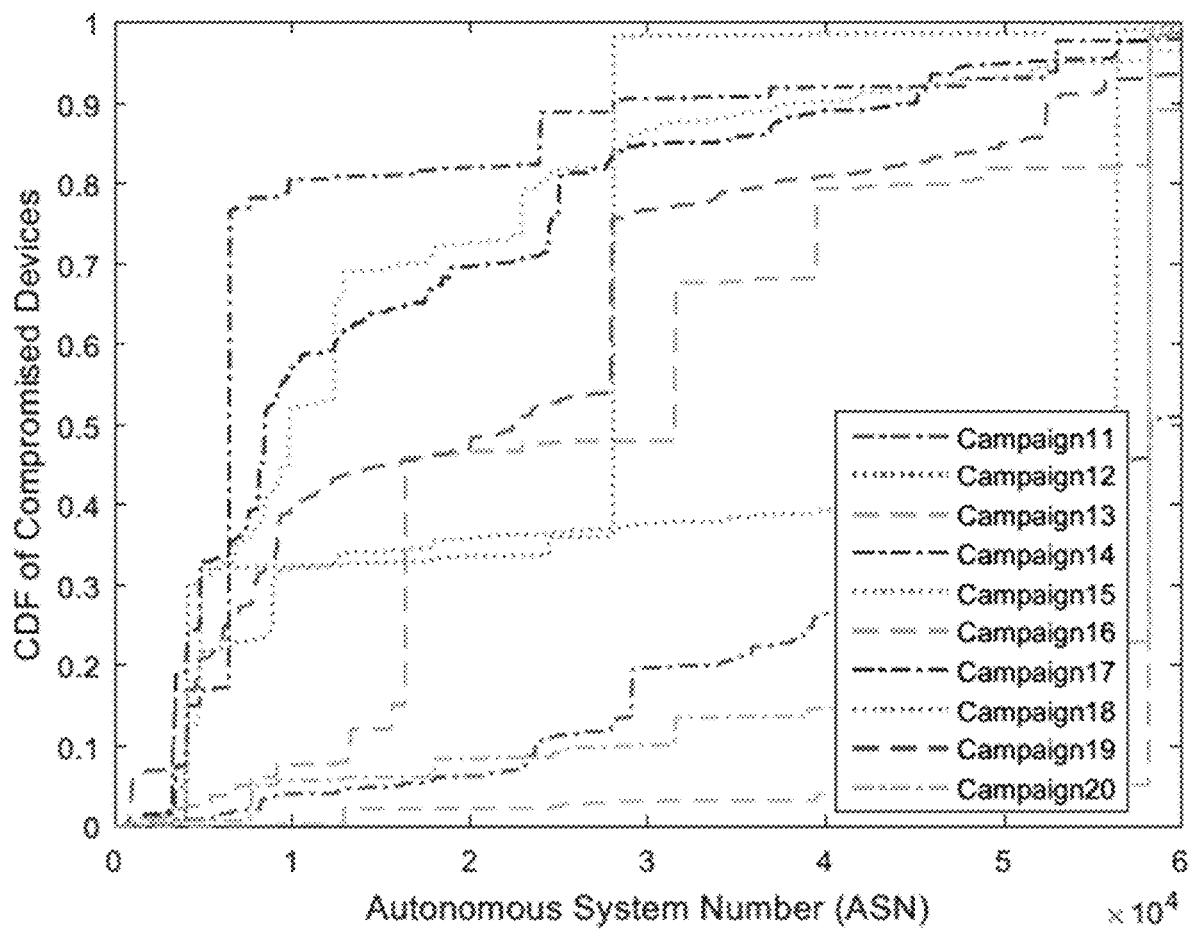
FIG. 23 illustrates the cumulative distribution of the populated campaigns 11-20 over different Autonomous Systems.

Geo-distributions of the inferred IoT botnets. By examining the geo-distribution characteristics of the identified botnets, significant differences were observed. FIG. 21 depicts the geo-distribution of the most populated campaigns generating scan events from multiple continents. Indeed, geo-distribution characteristics are likely a direct result of the popularity differences related to the adopted device types and manufacturers, which is known to be unique to each region. Since botnets leverage definitive attack vectors, they are typically customized to target specific vendors; coherently, the vendor's popularity will also attract botnets, which is reflected in the concentration of such popular devices/bots in certain geo-locations. For further analysis, FIGS. 22 and 23 display the cumulative distribution of campaigns over Autonomous Systems (AS). Despite a few cases with highly similar distributions (e.g., #2 and #9 in FIG. 22), other botnets are discovered to have a larger difference between distributions, as shown in FIG. 23. Furthermore, amidst the inferred campaigns, there exist campaigns whose geo-distributions do not comply with that of the global distribution of infections (Table 10). For instance, with respect to campaigns #7, #13, #24 and #27, over 98% of infected IoT devices are located in Iran. Campaign #30 has upwards of 50% and 10% of compromised IoT devices located in USA and UK, respectively. Further, campaign #28 shows a 40% infection rate in North America, and a 21% infection rate in Europe. Spread across multiple geographic regions, these campaigns contradict the global distribution of infections.

Figure 24:
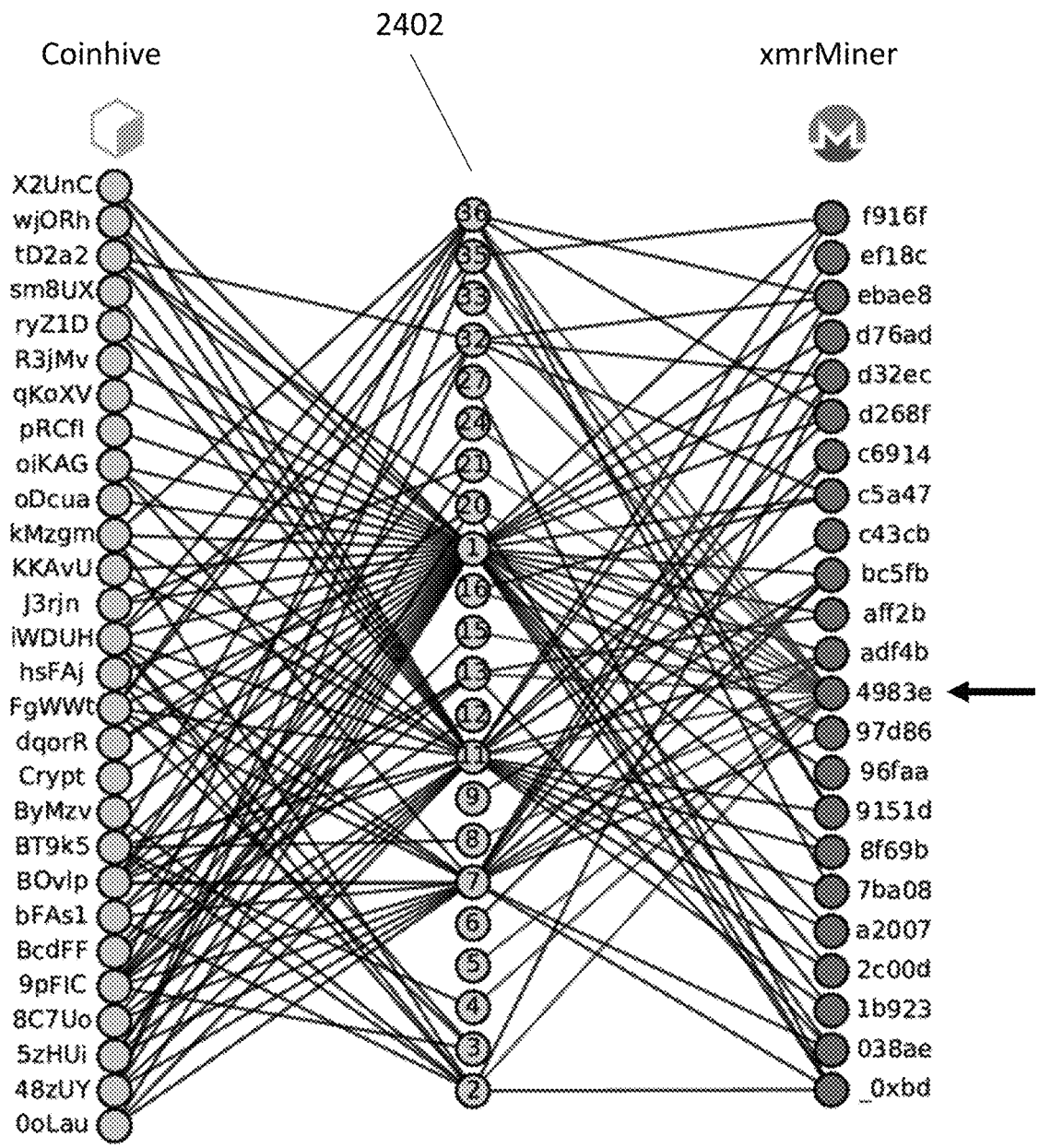
FIG. 24 illustrates a 3-partite graph of discovered cryptomining-related keys within each campaign.

IoT botnets with cryptojacking capability. Aside from the dominant monetization method for IoT botnets performing DDOS attacks, cryptojacking has emerged as a critical IoT botnet capability. In essence, compromised routers have become responsible for injecting JavaScript crypto-currency miners into the HTTP pages requested by devices on their network. JavaScript miners such as Coinhive and xmrMiner strive for Monero altcoin in particular. To this end, the responses to HTTP requests derived from the IoT scanners were examined, tagging those that contain the xmrMiner or Coinhive JavaScript modules, and exporting their corresponding keys. By doing so 1,134 xmrMiner and 923 Coinhive instances were discovered with 23 and 30 distinct keys, respectively, depicted also in FIG. 24. The campaign ID number (2402) for the campaigns is also shown. The campaigns designated as containing members with crypto-jacking capabilities are highlighted in Table 13. The relation of crypto-mining keys appearing in each campaign is illustrated using a 3-partite graph as in FIG. 24. The graph was analyzed to find the number of components to uncover any further relations between the campaigns. Interestingly, the graph is connected. This demonstrates that salient connections exist between all the campaigns involved in cryptojacking activities.

In addition, large campaigns were uncovered maintaining crypto-miner instances with and without the presence of Mirai-like signatures. Moreover, 943 out of 1,134 devices, belonging to a total of 18 campaigns (#1, #2, #4, #5, #7, #8, #11, #13, #15, #16, #19, #20 #21, #24, #32, #33, #35 and #36), share the same xmrMiner-related key "4983e34ef01b4b579725b3a228e59e79" (the node marked by the arrow in FIG. 24). In other words, large portions of significant IoT campaigns could be reported to be attributed to the same "player" (i.e. a hijacker). Additionally, upon exploring the key within Censys, 54,743 Mikrotiks were also shown to possess it. In total, these campaigns equate to approximately 250,000 compromised IoT devices, or 54% of all the identified compromised devices.

A closer look at other campaigns of interest. Campaign #3 with 36,464 bots was inferred to be targeting ports 23 and 2323 with a proportion of 9:1, which is the same as instructed within the Mirai released code. Another interesting observation pertains to botnet #26 (of Table 13) where packets to random TCP and UDP ports were sent in addition to targeting the defined set of ports of {23, 2480, 5555, 5984, 80, 8080}. Additionally, this campaign targeted port 2480 (OrientDB) and 5984 (CouchDB), as well as other common IoT-related ports including 23, 5555 (ADB) and 8080. Upon further analysis, this behavior could be attributable to the infamous Hide and Seek botnet.

For port 32764 which is related to a backdoor vulnerability, the proposed IoT botnet clustering approach revealed a campaign of substantial size (ID #19 in Table 13), consisting of 2,140 active IoT scanners with the signature of <{23, 32764, 80, 8000, 8080, 8081, 8089, 8090, 81, 8181, 8443, 8888, 9000}, Flag=1, ARR=1>. No previously reported botnet families that scan such ports were discovered. As a result, it was postulated that this campaign is either new or specific ports have been recently added to the target list of a previously known IoT botnet. Another aspect is that this is the only large campaign that exploited a relatively significant number of NUUO products, which is a common indicator of the Reaper IoT botnet. The JenX botnet, which scans ports 37215 and 52869, was also disclosed. Moreover, a botnet with <{2004, 80, 8080, 81}, Flag-0, ARR=2> was also discovered and consisted of 35 coordinated IoT scanners, all of which compromised QNAP NAS. This campaign strongly resembles the Muhstik botnet, with the exception of the substitution of port 7001 with 81 in the target port set.

With the prevalence of IoT botnets, port 5555 (Android debug bridge) has become a popular target port. 23 IoT botnets were found that include port 5555 as part of their target set. Based on the reports on ADB miner and the similarity of its scanning module to Mirai, the inferred large IoT botnet (#5 in Table 13) can be attributed to Mirai or its variant Fbot. Additionally, xmrMiner instances were found with the same previously noted key (of FIG. 24) in the latter campaign and in campaign #16. Based off the set of target ports pertaining to campaign #25 (port 23, 5358), it seems to be highly likely attributed to that of the Hajime IoT botnet. In total, this campaign possessed 1,059 active IoT scanners (made up of IP cameras/DVRs).

A note on Industrial Control Systems (ICS). It is also possible to infer an IoT botnet of 25 bots with the signature <{102, 8888, 993}, Flag=0, ARR=1>, probing Siemens S7 (heavily used in SCADA systems), IEC 61850 and ICCP (both are mostly used in utility/electric substations) on port 102. To provide additional insights, each of the identified compromised IoT devices was actively scanned for ICS open ports on TCP and UDP 102 (S7), 502 (MODBUS), 20000 (DNP3), 47808 (BACNET) and 1911 (FOX) and found 100, 101, 465, 70 and 85 devices with open ports, respectively. Close to 40 devices were inferred as having simultaneously all the above-mentioned ICS ports open, which were thought to be related to ICS honeypots. Nevertheless, the appearance of compromised IoT devices within ICS setups is alarming.

With the continuous adoption of the IoT paradigm in critical infrastructure and consumer sectors, their security and privacy concerns are becoming quite serious, leading to devastating consequences. This disclosure compliments current IoT-centric research by offering a macroscopic, generic and passive methodology to infer Internet-scale compromised IoT devices and to report on ongoing IoT botnets. The disclosure initially introduces a novel darknet-specific sanitization model that contributes to the field of Internet measurements at large. Subsequently, by devising a binary classifier based upon a CNN in conjunction with active measurements, the disclosed invention is capable of fingerprinting compromised IoT devices by solely operating on darknet traffic. Consequently, by automating the generation of signatures related to the ports being probed coupled with their distribution in addition to other simplistic yet effective features, the approach provides the capability to infer ongoing orchestrated botnets. The results demonstrate the significant security issue with the IoT paradigm by exposing more than 400,000 exploited IoT devices during only a 24-hour period, some of which have been deployed in critical sectors such medical and manufacturing. Additionally, the outcome provides evidence-based indicators related to ongoing IoT botnets such as those of Mirai, Hide and Seek, and Reaper, to name a few. More interestingly, the results demonstrate evolving IoT botnets with cryptojacking capabilities, where many of those seem to be attributed to the same mastermind by exposing the same employed key.

Figure 25:
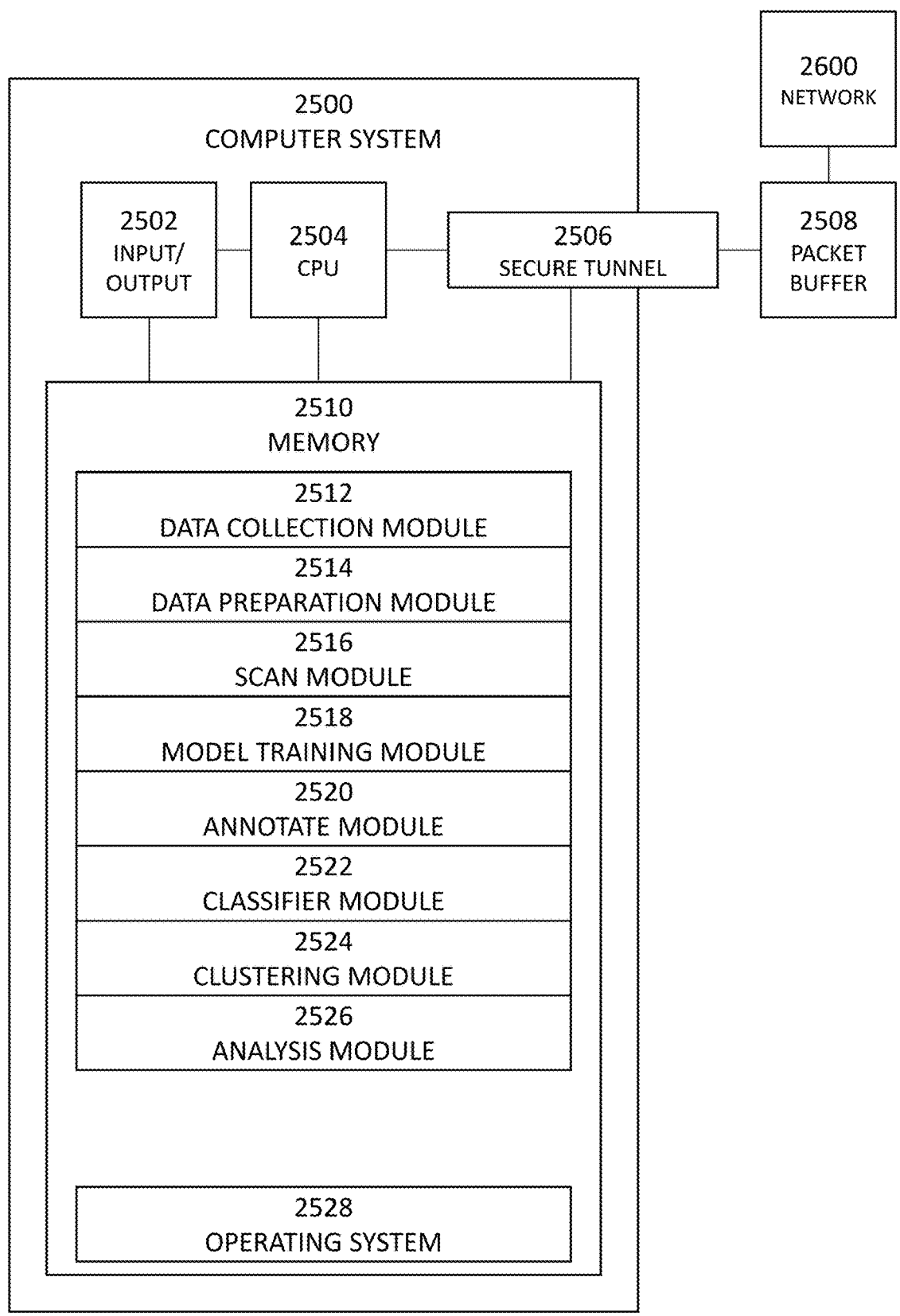
FIG. 25 illustrates a block diagram of an embodiment of the disclosure.

The following description is best understood with reference to FIG. 25. In an embodiment, a computer system 2500 may comprise an input/output section 2502, for instance a mouse, keyboard, a trackball, a touchscreen, and the like to allow a user to input data. An output section may comprise a monitor, speakers, and other devices which display information or provide the user with information, results, or analysis from the computer system. The computer system may connect over a secure tunnel 2506 with a network telescope as noted above. This connection may include a packet buffer 2508 for storing information from the network 2600. The computer system may comprise memory 2510 and a central processing unit 2504. In the memory 2510, there may be modules, routines, or algorithms designed to process or manipulate the data received from the network

2600 or from the I/O module 2502. These modules may comprise a data collection module 2512, a data preparation module 2514, a scan module 2516, a model training module 2518, an annotate module 2520, a classifier module 2522, a clustering module 2524, and an analysis module 2526, though other modules may be readily apparent to those skilled in the art. In addition the computer system 2500 may have stored in memory an operating system 2528 to facilitate interaction amongst the computer system's components and also with outside systems.

Many operating systems 2528, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. Thus, it is impossible for any program to damage the execution of any of the other programs running on the system. However, the programs have no way to exchange any information except through the operating system (or by reading files stored on the file system).

Multi-process computing is similar to multi-tasking computing, as the terms task and process are often used interchangeably, although some operating systems make a distinction between the two. The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer system 2500 through any type of network 2600, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The diagrams in the Figures illustrate the architecture, function-

What is claimed is:

1. A system comprising:
a network telescope for:
capturing a first set and a second set of unsolicited data packets sent by a first set of devices; and
probing the first set of devices for additional information;
a computer system for:
identifying a first subset of the first set of unsolicited data packets which originate from misconfigured devices of the first set of devices;
filtering out the first subset of the first set of unsolicited data packets from the first set of unsolicited data packets;
identifying a second subset of the first set of unsolicited data packets as originating from malicious devices of the first set of devices;
training a machine learning model to classify the malicious devices as Internet-of-Things (IoT) devices or non-IoT devices;
identifying a first subset of the second set of unsolicited data packets which originate from the misconfigured devices of the first set of devices;
filtering out the first subset of the second set of unsolicited data packets which originate from the misconfigured devices;
identifying a second subset of the second set of unsolicited data packets as originating from the malicious devices of the first set of devices;
applying the trained machine learning model to classify the malicious devices as IoT devices or non-IoT devices;
extracting features of the IoT devices to identify compromised IoT devices;
analyzing the compromised IoT devices and a method used to compromise the IoT devices, to generate analysis associated with the compromised IoT devices and the method used to compromise the IoT devices; and
communicating to a user the generated analysis.

2. The system of claim 1, wherein the machine learning model comprises at least one of a random forest model, a convolutional neural network, or a multi-window convolutional neural network.

3. The system of claim 1, wherein analyzing the compromised IoT devices comprises clustering of the IoT devices by at least one of k-means clustering, density based clustering, or agglomerative, hierarchical clustering.

4. The system of claim 1, wherein probing for additional information comprises probing the first set of devices for at least one of an open port, an application banner, a banner response, a banner identification, a banner-based identification of a device, a scanning module, a probing rate, a location of an Internet Protocol (IP) address of a device, and an IP header field.

5. The system of claim 1, wherein identifying a first subset of the first set of unsolicited data packets which originate from misconfigured devices and identifying a first subset of the second set of unsolicited data packets which originate from the misconfigured devices further comprises:
counting a number of unsolicited data packets which arrive from an Internet Protocol (IP) address within a predefined duration;
defining a device at the IP address as a malicious device, if the number of unsolicited data packets sent from the IP address within the predefined duration is greater than or equal to a predefined threshold; and defining a device at the IP address as a misconfigured device, if the number of unsolicited data packets sent from the IP address within the predefined duration is less than the predefined threshold.

6. The system of claim 5, wherein the predefined duration is 300 seconds and wherein the predefined threshold is 64.

7. The system of claim 5, wherein identifying unsolicited data packets which originate from misconfigured devices further comprises:
 calculating a probability that a misconfigured device will send the predefined threshold of unsolicited data packets to the network telescope within the predefined duration.

8. The system of claim 1, wherein training the machine learning model further comprises accessing at least one of a database of IoT devices, a database of keywords related to IoT devices, a database of key characters related to IoT devices, a database of known compromised IoT devices and a database of known methods of compromising an IoT device.

9. The system of claim 1, wherein analyzing the compromised IoT devices and a method used to compromise the IoT devices comprises analyzing at least one of a targeted port, a header, a banner field, an Internet Protocol (IP) address, an inter-packet arrival time, and a location.

10. The system of claim 1, wherein analyzing the compromised IoT devices and a method used to compromise the IoT devices further comprises:
 calculating, based on a set number of sequential data packets from a compromised IoT device, a probability density function of a frequency of appearance of a port of a compromised IoT device or of a port in the method used to compromise an IoT device; and
 calculating an address repetition ratio based on a total number of data packets sent by a compromised IoT device or sent by the method used to compromise an IoT device divided by a number of unique destination Internet Protocol (IP) addresses.

11. A method using a network telescope and a computer system comprising the steps of:
 capturing, at the network telescope, a first set and a second set of unsolicited data packets sent by a first set of devices;
 probing, at the network telescope, the first set of devices for additional information;
 identifying, at the computer system, a first subset of the first set of unsolicited data packets which originate from misconfigured devices of the first set of devices;
 filtering out, at the computer system, the first subset of the first set of unsolicited data packets from the first set of unsolicited data packets;
 identifying, at the computer system, a second subset of the first set of unsolicited data packets as originating from malicious devices of the first set of devices;
 training, at the computer system, a machine learning model to classify the malicious devices as Internet-of-Things (IoT) devices or non-IoT devices;
 identifying, at the computer system, a first subset of the second set of unsolicited data packets which originate from the misconfigured devices of the first set of devices;
 filtering out, at the computer system, the first subset of the second set of unsolicited data packets which originate from the misconfigured devices;
 identifying, at the computer system, a second subset of the second set of unsolicited data packets as originating from the malicious devices of the first set of devices;
 applying, at the computer system, the trained machine learning model to classify the malicious devices as IoT devices or non-IoT devices;
 extracting, at the computer system, features of the IoT devices to identify compromised IoT devices;
 analyzing, at the computer system, the compromised IoT devices and a method used to compromise the IoT devices, to generate analysis associated with the compromised IoT devices and the method used to compromise the IoT devices; and
 communicating, at the computer system, to a user the generated analysis.

12. The method of claim 11, wherein the machine learning model comprises at least one of a random forest model, a convolutional neural network, or a multi-window convolutional neural network.

13. The method of claim 11, wherein analyzing the compromised IoT devices comprises clustering of the IoT devices by at least one of k-means clustering, density based clustering, or agglomerative, hierarchical clustering.

14. The method of claim 11, wherein probing for additional information comprises probing the first set of devices for at least one of an open port, an application banner, a banner response, a banner identification, a banner-based identification of a device, a scanning module, a probing rate, a location of an Internet Protocol (IP) address of a device, and an IP header field.

15. The method of claim 11, identifying a first subset of the first set of unsolicited data packets which originate from misconfigured devices and identifying a first subset of the second set of unsolicited data packets which originate from the misconfigured devices further comprises:
 counting a number of unsolicited data packets which arrive from an Internet Protocol (IP) address within a predefined duration;
 defining a device at the IP address as a malicious device, if the number of unsolicited data packets sent from the IP address within the predefined duration is greater than or equal to a predefined threshold; and
 defining a device at the IP address as a misconfigured device, if the number of unsolicited data packets sent from the IP address within the predefined duration is less than the predefined threshold.

16. The method of claim 15, wherein the predefined duration is 300 seconds and wherein the predefined threshold is 64.

17. The method of claim 15, wherein identifying unsolicited data packets which originate from misconfigured devices further comprises:
 calculating the probability that a misconfigured device will send the predefined threshold of unsolicited data packets to the network telescope within the predefined duration.

18. The method of claim 11, wherein training the machine learning model further comprises accessing at least one of a database of IoT devices, a database of keywords related to IoT devices, a database of key characters related to IoT devices, a database of known compromised IoT devices and a database of known methods of compromising an IoT device.

19. The method of claim 11, wherein analyzing the compromised IoT devices and a method used to compromise the IoT devices comprises analyzing at least one of a targeted port, a header, a banner field, an Internet Protocol (IP) address, an inter-packet arrival time, and a location.

20. The method of claim 11, wherein analyzing the compromised IoT devices and a method used to compromise the IoT devices further comprises:

calculating, based on a set number of sequential data packets from a compromised IoT device, a probability density function of a frequency of appearance of a port of a compromised IoT device or of a port in the method used to compromise an IoT device; and calculating an address repetition ratio based on a total number of data packets sent by a compromised IoT device or sent by the method used to compromise an IoT device divided by a number of unique destination Internet Protocol (IP) addresses.

\* \* \* \* \*